United States Patent
Cheng et al.

(10) Patent No.: US 12,399,999 B2
(45) Date of Patent: *Aug. 26, 2025

(54) IOT DEVICE RISK ASSESSMENT

(71) Applicant: Palo Alto Networks, Inc., Santa Clara, CA (US)

(72) Inventors: Gong Cheng, Sunnyvale, CA (US); Mayuresh Ektare, Santa Clara, CA (US); Mei Wang, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/342,950

(22) Filed: Jun. 9, 2021

(65) Prior Publication Data
US 2021/0303699 A1 Sep. 30, 2021

Related U.S. Application Data

(63) Continuation of application No. 16/538,787, filed on Aug. 12, 2019, now Pat. No. 11,087,005, which is a continuation of application No. 15/357,989, filed on Nov. 21, 2016, now Pat. No. 10,380,348.

(51) Int. Cl.
*G06F 21/57* (2013.01)
*H04L 9/40* (2022.01)

(52) U.S. Cl.
CPC ........ *G06F 21/577* (2013.01); *H04L 63/0227* (2013.01); *H04L 63/1425* (2013.01)

(58) Field of Classification Search
CPC .............. G06F 21/577; H04L 63/0227; H04L 63/1425; H04L 63/1433; H04W 4/70
See application file for complete search history.

(56) References Cited

U.S. PATENT DOCUMENTS

| | | |
|---|---|---|
| 6,142,682 A | 11/2000 | Skogby |
| 6,877,146 B1 | 4/2005 | Teig |
| 8,146,133 B2 | 3/2012 | Moon |
| 8,159,966 B1 | 4/2012 | Mabee |
| 8,331,229 B1 | 12/2012 | Hu |
| 8,671,099 B2 | 3/2014 | Kapoor |
| 8,683,598 B1 | 3/2014 | Cashin |
| 8,850,588 B2 | 9/2014 | Kumar |
| 8,863,276 B2 | 10/2014 | Giblin |

(Continued)

FOREIGN PATENT DOCUMENTS

| | | |
|---|---|---|
| CA | 2904463 | 10/2020 |
| CN | 101719899 | 6/2010 |

(Continued)

OTHER PUBLICATIONS

Author Unknown, Cisco Encrypted Traffic Analytics, Feb. 10, 2021.

(Continued)

*Primary Examiner* — Robert B Leung
(74) *Attorney, Agent, or Firm* — Van Pelt, Yi & James LLP

(57) ABSTRACT

An Internet of Things (IoT) device profile applicable to an IoT device is determined. Data packets transmitted to and from the IoT device are analyzed. A risk level of the IoT device is determined based at least in part on the data packet analysis. A determination is made that the risk level exceeds a threshold and a remedial action is taken in response.

23 Claims, 24 Drawing Sheets

(56) References Cited

U.S. PATENT DOCUMENTS

| | | |
|---|---|---|
| 8,874,550 B1 | 10/2014 | Soubramanien |
| 8,891,528 B2 | 11/2014 | Moriarty |
| 8,898,788 B1 | 11/2014 | Aziz |
| 8,973,088 B1 | 3/2015 | Leung |
| 9,038,178 B1 | 5/2015 | Lin |
| 9,112,895 B1 | 8/2015 | Lin |
| 9,324,119 B2 | 4/2016 | Singh |
| 9,378,361 B1 | 6/2016 | Yen |
| 9,516,053 B1 | 12/2016 | Muddu |
| 9,548,987 B1 | 1/2017 | Poole |
| 9,584,536 B2 | 2/2017 | Nantel |
| 9,600,571 B2 | 3/2017 | Shaashua |
| 9,609,003 B1 | 3/2017 | Chmielewski |
| 9,614,742 B1 | 4/2017 | Zhang |
| 9,661,011 B1 | 5/2017 | Van Horenbeeck |
| 9,692,784 B1 | 6/2017 | Nenov |
| 9,774,604 B2 | 9/2017 | Zou |
| 9,800,603 B1 | 10/2017 | Sidagni |
| 9,807,110 B2 | 10/2017 | Harlacher |
| 9,824,356 B2 | 11/2017 | Kurian |
| 9,891,907 B2 | 2/2018 | Searle |
| 9,894,085 B1 | 2/2018 | Dmitriyev |
| 9,910,874 B1 | 3/2018 | Jamail |
| 9,961,096 B1 | 5/2018 | Pierce |
| 9,984,344 B2 | 5/2018 | Singh |
| 9,985,982 B1 | 5/2018 | Bartos |
| 10,038,700 B1 | 7/2018 | Duchin |
| 10,043,591 B1 | 8/2018 | Laborde |
| 10,122,747 B2 | 11/2018 | Mahaffey |
| 10,129,118 B1 | 11/2018 | Ghare |
| 10,191,794 B2 | 1/2019 | Smith |
| 10,204,312 B2 | 2/2019 | Singh |
| 10,212,176 B2 | 2/2019 | Wang |
| 10,212,178 B2 | 2/2019 | Cheng |
| 10,229,269 B1 | 3/2019 | Patton |
| 10,237,875 B1 | 3/2019 | Romanov |
| 10,320,613 B1 | 6/2019 | Cam-Winget |
| 10,348,739 B2 | 7/2019 | Greenspan |
| 10,459,827 B1 | 10/2019 | Aghdaie |
| 10,489,361 B2 | 11/2019 | Sisk |
| 10,489,714 B2 | 11/2019 | Lee |
| 10,511,620 B2 | 12/2019 | Schwartz |
| 10,623,389 B2 | 4/2020 | Childress |
| 10,630,728 B2 | 4/2020 | Ghosh |
| 10,764,315 B1 | 9/2020 | Carroll |
| 10,862,911 B2 | 12/2020 | Dezent |
| 10,885,393 B1 | 1/2021 | Sirianni |
| 10,887,306 B2 | 1/2021 | Gupta |
| 11,005,839 B1 | 5/2021 | Shahidzadeh |
| 11,070,568 B2 | 7/2021 | Ektare |
| 11,115,799 B1 | 9/2021 | Du |
| 11,115,823 B1 | 9/2021 | Heiland |
| 11,310,247 B2 | 4/2022 | Manadhata |
| 11,455,641 B1 | 9/2022 | Shahidzadeh |
| 11,477,202 B2 | 10/2022 | De Knijf |
| 2004/0243835 A1 | 12/2004 | Terzis |
| 2005/0044406 A1 | 2/2005 | Stute |
| 2005/0281291 A1 | 12/2005 | Stolfo |
| 2006/0095970 A1 | 5/2006 | Rajagopal |
| 2006/0265397 A1 | 11/2006 | Bryan |
| 2007/0094725 A1 | 4/2007 | Borders |
| 2008/0059536 A1 | 3/2008 | Brock |
| 2009/0180391 A1 | 7/2009 | Petersen |
| 2010/0054278 A1 | 3/2010 | Stolfo |
| 2010/0284282 A1 | 11/2010 | Golic |
| 2011/0022812 A1 | 1/2011 | Van Der Linden |
| 2011/0087626 A1 | 4/2011 | Yeleshwarapu |
| 2011/0239267 A1 | 9/2011 | Lyne |
| 2012/0065749 A1 | 3/2012 | Hunter |
| 2012/0102543 A1 | 4/2012 | Kohli |
| 2012/0174221 A1 | 7/2012 | Han |
| 2012/0240185 A1 | 9/2012 | Kapoor |
| 2013/0086261 A1 | 4/2013 | Lim |
| 2013/0173621 A1 | 7/2013 | Kapoor |
| 2013/0247190 A1 | 9/2013 | Spurlock |
| 2013/0305357 A1 | 11/2013 | Ayyagari |
| 2013/0305358 A1 | 11/2013 | Gathala |
| 2014/0006479 A1 | 1/2014 | Maloo |
| 2014/0157405 A1 | 6/2014 | Joll |
| 2014/0244834 A1 | 8/2014 | Guedalia |
| 2014/0281912 A1 | 9/2014 | Doi |
| 2014/0325670 A1 | 10/2014 | Singh |
| 2014/0337862 A1 | 11/2014 | Valencia |
| 2015/0039513 A1 | 2/2015 | Adjaoute |
| 2015/0055623 A1 | 2/2015 | Li |
| 2015/0161024 A1 | 6/2015 | Gupta |
| 2015/0172303 A1 | 6/2015 | Humble |
| 2015/0199610 A1 | 7/2015 | Hershberg |
| 2015/0229654 A1 | 8/2015 | Perier |
| 2015/0256431 A1 | 9/2015 | Buchanan |
| 2015/0262067 A1 | 9/2015 | Sridhara |
| 2015/0271192 A1 | 9/2015 | Crowley |
| 2015/0293954 A1 | 10/2015 | Hsiao |
| 2015/0295945 A1 | 10/2015 | Canzanese, Jr. |
| 2015/0324559 A1 | 11/2015 | Boss |
| 2015/0356451 A1 | 12/2015 | Gupta |
| 2016/0006815 A1 | 1/2016 | Dong |
| 2016/0028750 A1 | 1/2016 | Di Pietro |
| 2016/0036819 A1 | 2/2016 | Zehavi |
| 2016/0048984 A1 | 2/2016 | Frigo |
| 2016/0119372 A1 | 4/2016 | Borlick |
| 2016/0128043 A1 | 5/2016 | Shuman |
| 2016/0164721 A1 | 6/2016 | Zhang |
| 2016/0173446 A1 | 6/2016 | Nantel |
| 2016/0173495 A1 | 6/2016 | Joo |
| 2016/0182497 A1 | 6/2016 | Smith |
| 2016/0196558 A1 | 7/2016 | Mercille |
| 2016/0210556 A1 | 7/2016 | Ben Simhon |
| 2016/0212099 A1 | 7/2016 | Zou |
| 2016/0218949 A1 | 7/2016 | Dasgupta |
| 2016/0261465 A1 | 9/2016 | Gupta |
| 2016/0267406 A1 | 9/2016 | Bodo |
| 2016/0267408 A1 | 9/2016 | Singh |
| 2016/0277435 A1 | 9/2016 | Salajegheh |
| 2016/0301707 A1 | 10/2016 | Cheng |
| 2016/0301717 A1 | 10/2016 | Dotan |
| 2016/0337127 A1 | 11/2016 | Schultz |
| 2016/0352685 A1 | 12/2016 | Park |
| 2016/0366141 A1 | 12/2016 | Smith |
| 2016/0366181 A1 | 12/2016 | Smith |
| 2016/0381030 A1 | 12/2016 | Chillappa |
| 2017/0006028 A1 | 1/2017 | Tunnell |
| 2017/0006135 A1 | 1/2017 | Siebel |
| 2017/0011406 A1 | 1/2017 | Tunnell |
| 2017/0013005 A1 | 1/2017 | Galula |
| 2017/0055913 A1 | 3/2017 | Bandyopadhyay |
| 2017/0063774 A1 | 3/2017 | Chen |
| 2017/0063889 A1 | 3/2017 | Muddu |
| 2017/0063905 A1 | 3/2017 | Muddu |
| 2017/0085580 A1 | 3/2017 | Thanos |
| 2017/0093915 A1 | 3/2017 | Ellis |
| 2017/0118237 A1 | 4/2017 | Devi Reddy |
| 2017/0118240 A1 | 4/2017 | Devi Reddy |
| 2017/0124660 A1 | 5/2017 | Srivastava |
| 2017/0126704 A1 | 5/2017 | Nandha Premnath |
| 2017/0149813 A1 | 5/2017 | Wright |
| 2017/0180380 A1 | 6/2017 | Bagasra |
| 2017/0180399 A1 | 6/2017 | Sukhomlinov |
| 2017/0188242 A1 | 6/2017 | Ghosh |
| 2017/0200061 A1 | 7/2017 | Julian |
| 2017/0214701 A1 | 7/2017 | Hasan |
| 2017/0230467 A1* | 8/2017 | Greenspan ............ H04W 12/08 |
| 2017/0232300 A1 | 8/2017 | Tran |
| 2017/0235585 A1 | 8/2017 | Gupta |
| 2017/0235783 A1 | 8/2017 | Chen |
| 2017/0242414 A1 | 8/2017 | Coote |
| 2017/0244737 A1 | 8/2017 | Kuperman |
| 2017/0251007 A1 | 8/2017 | Fujisawa |
| 2017/0272554 A1 | 9/2017 | Kwan |
| 2017/0279685 A1 | 9/2017 | Mota |
| 2017/0289168 A1 | 10/2017 | Bar |
| 2017/0289184 A1 | 10/2017 | Subramanian |
| 2017/0331671 A1 | 11/2017 | Olsson |
| 2017/0331906 A1 | 11/2017 | Choi |

(56) References Cited

U.S. PATENT DOCUMENTS

| | | |
|---|---|---|
| 2017/0339178 A1 | 11/2017 | Mahaffey |
| 2017/0344407 A1 | 11/2017 | Jeon |
| 2017/0346677 A1 | 11/2017 | Suryanarayana |
| 2018/0007055 A1 | 1/2018 | Infante-Lopez |
| 2018/0007058 A1 | 1/2018 | Zou |
| 2018/0012227 A1 | 1/2018 | Tunnell |
| 2018/0018684 A1 | 1/2018 | Orr |
| 2018/0027006 A1 | 1/2018 | Zimmermann |
| 2018/0027020 A1 | 1/2018 | Pallas |
| 2018/0039555 A1 | 2/2018 | Salunke |
| 2018/0054449 A1 | 2/2018 | Nandha Premnath |
| 2018/0078843 A1 | 3/2018 | Tran |
| 2018/0115574 A1 | 4/2018 | Ridley |
| 2018/0117446 A1 | 5/2018 | Tran |
| 2018/0117447 A1 | 5/2018 | Tran |
| 2018/0124096 A1 | 5/2018 | Schwartz |
| 2018/0139227 A1 | 5/2018 | Martin |
| 2018/0144139 A1 | 5/2018 | Cheng |
| 2018/0173881 A1 | 6/2018 | Oberheide |
| 2018/0191729 A1 | 7/2018 | Whittle |
| 2018/0191746 A1 | 7/2018 | De Knijf |
| 2018/0191755 A1 | 7/2018 | Monaco |
| 2018/0191848 A1 | 7/2018 | Bhattacharya |
| 2018/0205793 A1 | 7/2018 | Loeb |
| 2018/0212768 A1 | 7/2018 | Kawashima |
| 2018/0234302 A1 | 8/2018 | James |
| 2018/0234519 A1 | 8/2018 | Boyapalle |
| 2018/0248902 A1 | 8/2018 | Dănilă-Dumitrescu |
| 2018/0255084 A1 | 9/2018 | Kotinas |
| 2018/0261070 A1 | 9/2018 | Stevens |
| 2018/0264347 A1 | 9/2018 | Tran |
| 2018/0285234 A1 | 10/2018 | Degaonkar |
| 2018/0293387 A1 | 10/2018 | Bar-El |
| 2018/0295148 A1 | 10/2018 | Mayorgo |
| 2018/0302440 A1 | 10/2018 | Hu |
| 2018/0349598 A1 | 12/2018 | Harel |
| 2018/0349612 A1 | 12/2018 | Harel |
| 2018/0351972 A1 | 12/2018 | Yu |
| 2018/0357556 A1 | 12/2018 | Rai |
| 2018/0375887 A1 | 12/2018 | Dezent |
| 2019/0019249 A1 | 1/2019 | Bhattacharjee |
| 2019/0081961 A1 | 3/2019 | Bansal |
| 2019/0089747 A1 | 3/2019 | Wang |
| 2019/0098028 A1 | 3/2019 | Ektare |
| 2019/0098058 A1 | 3/2019 | Ikegami |
| 2019/0109717 A1 | 4/2019 | Reddy |
| 2019/0121978 A1 | 4/2019 | Kraemer |
| 2019/0138512 A1 | 5/2019 | Pourmohammad |
| 2019/0182278 A1 | 6/2019 | Das |
| 2019/0253319 A1 | 8/2019 | Kampanakis |
| 2019/0268267 A1 | 8/2019 | Pignataro |
| 2019/0268305 A1 | 8/2019 | Xu |
| 2019/0296979 A1 | 9/2019 | Gupta |
| 2019/0349426 A1 | 11/2019 | Smith |
| 2019/0361917 A1 | 11/2019 | Tran |
| 2019/0373007 A1 | 12/2019 | Salunke |
| 2019/0373472 A1 | 12/2019 | Smith |
| 2019/0387399 A1 | 12/2019 | Weinberg |
| 2020/0036603 A1 | 1/2020 | Nieves |
| 2020/0074085 A1 | 3/2020 | Cheng |
| 2020/0076846 A1 | 3/2020 | Pandian |
| 2020/0076853 A1 | 3/2020 | Pandian |
| 2020/0117690 A1 | 4/2020 | Tran |
| 2020/0156654 A1 | 5/2020 | Boss |
| 2020/0162278 A1 | 5/2020 | Delaney |
| 2020/0162503 A1 | 5/2020 | Shurtleff |
| 2020/0177485 A1 | 6/2020 | Shurtleff |
| 2020/0177589 A1 | 6/2020 | Mangalvedkar |
| 2020/0195679 A1 | 6/2020 | Du |
| 2020/0211721 A1 | 7/2020 | Ochoa |
| 2020/0213146 A1 | 7/2020 | Kodam |
| 2020/0285457 A1 | 9/2020 | Meriac |
| 2020/0285997 A1 | 9/2020 | Bhattacharyya |
| 2020/0366717 A1 | 11/2020 | Chaubey |
| 2020/0409957 A1 | 12/2020 | Zhang |
| 2021/0058430 A1 | 2/2021 | Novak |
| 2021/0203615 A1 | 7/2021 | Roy |
| 2021/0360406 A1 | 11/2021 | Heiland |
| 2022/0060491 A1 | 2/2022 | Achleitner |
| 2022/0086071 A1 | 3/2022 | Sivaraman |
| 2022/0138634 A1 | 5/2022 | Covell |
| 2022/0159020 A1 | 5/2022 | Wang |
| 2022/0210065 A1 | 6/2022 | Khanna |
| 2022/0210066 A1 | 6/2022 | Khanna |
| 2023/0049886 A1 | 2/2023 | Sesha |

FOREIGN PATENT DOCUMENTS

| | | |
|---|---|---|
| CN | 102025577 | 7/2012 |
| CN | 102291430 | 11/2013 |
| CN | 107862468 | 3/2018 |
| CN | 104837158 | 5/2018 |
| CN | 108650133 | 10/2018 |
| CN | 105659633 | 4/2020 |
| CN | 107135093 | 5/2020 |
| CN | 108306911 | 12/2020 |
| EP | 3136297 | 3/2017 |
| EP | 3576373 | 12/2019 |
| JP | 2016532957 | 10/2016 |
| JP | 2018513467 | 5/2018 |
| JP | 2019536144 | 12/2019 |
| JP | 2020503784 | 1/2020 |
| KR | 20170059546 | 5/2017 |
| WO | 2019218874 | 11/2019 |

OTHER PUBLICATIONS

Arash Fasihi, Rule Based Inference and Action Selection Based on Monitoring Data in IoT, Dec. 1, 2015.

Cramer et al., Detecting Anomalies in Device Event Data in the IoT, Proceedings of the 3td International Conference on Internet of Things, Big Data and Security, Mar. 21, 2018, pp. 52-62.

Midi et al., Kalis—A System for Knowledge-driven Adaptable Intrusion Detection for the Internet of Things, 2017 IEEE 37th International Conference on Distributed Computing Systems, pp. 656-666.

Al-Shaer et al., Design and Implementation of Firewall Policy Advisor Tools, 2002.

Al-Shaer et al., Firewall Policy Advisor for Anomaly Discovery and Rule Editing, Integrated Network Management VIII, 2003.

Martin et al., Requirements and Recommendations for CWE Compatibility and CWE Effectiveness, Version 1.0, Jul. 28, 2011.

National Electrical Manufacturers Association, Manufacturer Disclosure Statement for Medical Device Security, HIMSS/NEMA Standard HN Jan. 2013, 2013.

Blackstock et al., IoT Interoperability: A Hub-based Approach, 2014, IEEE International Conference on the Internet of Things (IoT), pp. 80-84.

Fredj et al., A Scalable IoT Service Search Based on Clustering and Aggregation, 2013 IEEE International Conference on Green Computing and Communication and IEEE Internet of Things and IEEE Cyber, Physical and Social Computing, pp. 1-8.

International Application No. PCT/US2016/025661, International Search Report and Written Opinion mailed Jul. 7, 2016.

Li et al., A Distributed Consensus Algorithm for Decision Making in Service-Oriented Internet of Things, Old Dominion University, ODU Digital Commons, 2014.

Liu et al., A Lightweight Anomaly Mining Algorithm in the Internet of Things, 2014 IEEE 5th International Conference on Software Engineering and Service Science, 2014, pp. 1142-1145.

Miloslavskaya et al., Ensuring Information Security for Internet of Things, 2017, IEEE 5th International Conference of Future Internet of Things and Cloud, pp. 62-69.

Nguyen et al., A Software-Defined Model for IoT Clusters: Enabling Applications on Demand, Faculty of Engineering and IT, University of Technology Sydney, Australia, IEEE Xplore, Apr. 23, 2018.

Sivanathan et al., Classifying IoT Devices in Smart Environments Using Network Traffic Characteristics, IEEE, TMC, No. 8, pp. 1745-1759, Aug. 2018.

(56) References Cited

OTHER PUBLICATIONS

Sivanathan et al., Detecting Behavioral Change of IoT Devices Using Clustering-Based Network Traffic Modeling, IEEE LCN 2019, Mar. 30, 2020.
Sivanathan et al., Inferring IoT Device Types from Network Behavior Using Unsupervised Clustering, IEEE ICN 2019, Oct. 2019.
Hirofumi Nakakoji, et al., "Study of the Incident Tendency Detection Method on Frequency Analysis," Technical Report of IEICE, Japan, The Institute of Electronics, Information and Communication Engineers (IEICE), Jul. 14, 2005, vol. 105, No. 193, pp. 83-88.
Charyyev et al., Locality-Sensitive IoT Network Traffic Fingerprinting for Device Identification, IEEE Internet of Things Journal, 2020, vol. 8, No. 3, pp. 1272-1281.
Du et al., A Lightweight Flow Feature-Based IoT Device Identification Scheme, Security and Communication Networks, 2022.
Zhao et al., A Few-Shot Learning Based Approach to IoT Traffic Classification, IEEE Communications Letters, 2021.
Charu C. Aggarwal, Outlier Analysis, Feb. 10, 2013, Retrieved from the Internet, URL:https://web.archive.brg/web/20130210212057/http://charuaggarwal.net/outlierbook.pdf.
Chen et al., A Model-Based Validated Autonomic Approach to Self-Protect Computing Systems, IEEE Internet of Things Journal, Oct. 2014, pp. 446-460, vol. 1, No. 5.
Meidan et al., ProfilIoT: A Machine Learning Approach for IoT Device Identification Based on Network Traffic Analysis, In Proceedings of the Symposium on Applied Computing (SAC'17), Apr. 3-7, 2017, pp. 506-509.
Fahim et al., Anomaly detection, analysis and prediction techniques in IoT environment: A systematic literature review, IEEE Access, vol. 7, 2019, pp. 81664-81681.
Nassif et al., Machine learning for anomaly detection: A systematic review, IEEE Access, vol. 9, 2021, pp. 78658-78700.
Liu et al., Noise removal in the presence of significant anomalies for industrial IoT sensor data in manufacturing, IEEE Internet of Things Journal, vol. 7, No. 8, Aug. 2020, pp. 7084-7096.
Liu et al., Deep anomaly detection for time-series data in industrial IoT: A communication-efficient on-device federated learning approach, IEEE Internet of Things Journal, vol. 8, No. 8, Apr. 15, 2021, pp. 6348-6358.
Pahl et al., All eyes on you: Distributed Multi-Dimensional IoT microservice anomaly detection, 14th International Conference on Network and Service Management (CNSM), IEEE, 2018, pp. 72-80.
Miettinen et al., IoT Sentinel Demo: Automated Device-Type Identification for Security Enforcement in IoT, IEEE 37th International Conference on Distributed Computing Systems (ICDCS), Jun. 5-8, 2017, pp. 2177-2184, https://ieeexplore.ieee.org/document/7980220.

\* cited by examiner

| ☐ Active | Risk ▶ | Type | Device Name | IP Address | Device Profile | Category | Applications | Data | Last Activity |
|---|---|---|---|---|---|---|---|---|---|
| ☐ ⊹ | ◖ | IoT | | | | Physical Security | 5 | 66.2 KB | Sep 1, 2016, 17:23 |
| ☐ ♦ | ◖ | IoT | | | | Camera | 9 | 90.36 GB | Oct 18, 2016, 14:31 |
| ☐ ♦ | ◖ | IoT | | | | Physical Security | 8 | 896.0 KB | Oct 18, 2016, 14:31 |
| ☐ ♦ | ◖ | IoT | | | | Smart Building | 3 | 21.8 KB | Oct 18, 2016, 14:14 |
| ☐ ♦ | ◖ | IoT | | | | Smart Building | 9 | 6.20 MB | Oct 18, 2016, 14:29 |

Inventory (5)
Active Filters: New Filter ✎ ✕
Risk Level
[ High ✕ ]

From October 17, 2016 To October 18, 2016

FIG. 21

| Inventory (5) | Activity Summary (7 days) | | |
|---|---|---|---|
| Active Filters: New | Inbound Connections | | OPEN PORTS (372) ⌄ |
| Risk Level | | Internal | External |
| High ✕ | Volume | ↑ 1.39 MB | ↑ 488.3 KB |
| | Connection Source IP/Domains | ↑ 5 (5 New) | ↑ 1384 (1334 New) |
| ☐ Active  Risk ▼ | Protocols | ↑ 3 (3 New) | ↑ 5 (2 New) |
| ☐ ╫ ◐ | Encryption | 0 | 0 |
| ☐ ● ◐ | Outbound Connections | | |
| ☐ ● ◐ | | Internal | External |
| ☐ ● ◐ | Volume | ↑ 858.4 KB | ↑ 150.4 KB |
| ☐ ● ◐ | Connection Destination IP/Domains | ↑ 4 (4 New) | ↑ 132 (126 New) |
| | Protocols | ↑ 2 (2 New) | ↑ 6 (2 New) |
| | Encryption | 0 | 0 |

IOT DEVICE RISK ASSESSMENT

CROSS-REFERENCE TO RELATED APPLICATIONS

This application is a continuation of U.S. patent application Ser. No. 16/538,787, filed Aug. 12, 2019 and entitled IoT DEVICE RISK ASSESSMENT, which is a continuation of U.S. patent application Ser. No. 15/357,989 filed Nov. 21, 2016 and entitled "IoT Device Risk Assessment," now U.S. Pat. No. 10,380,348, each of which is hereby incorporated by reference herein.

BRIEF DESCRIPTION OF THE DRAWINGS

FIG. 21 depicts a screenshot of a presentation of risk assessment data to a user.

FIG. 22 depicts a screenshot of another presentation of risk assessment data to a user.

DETAILED DESCRIPTION

Figure 1:
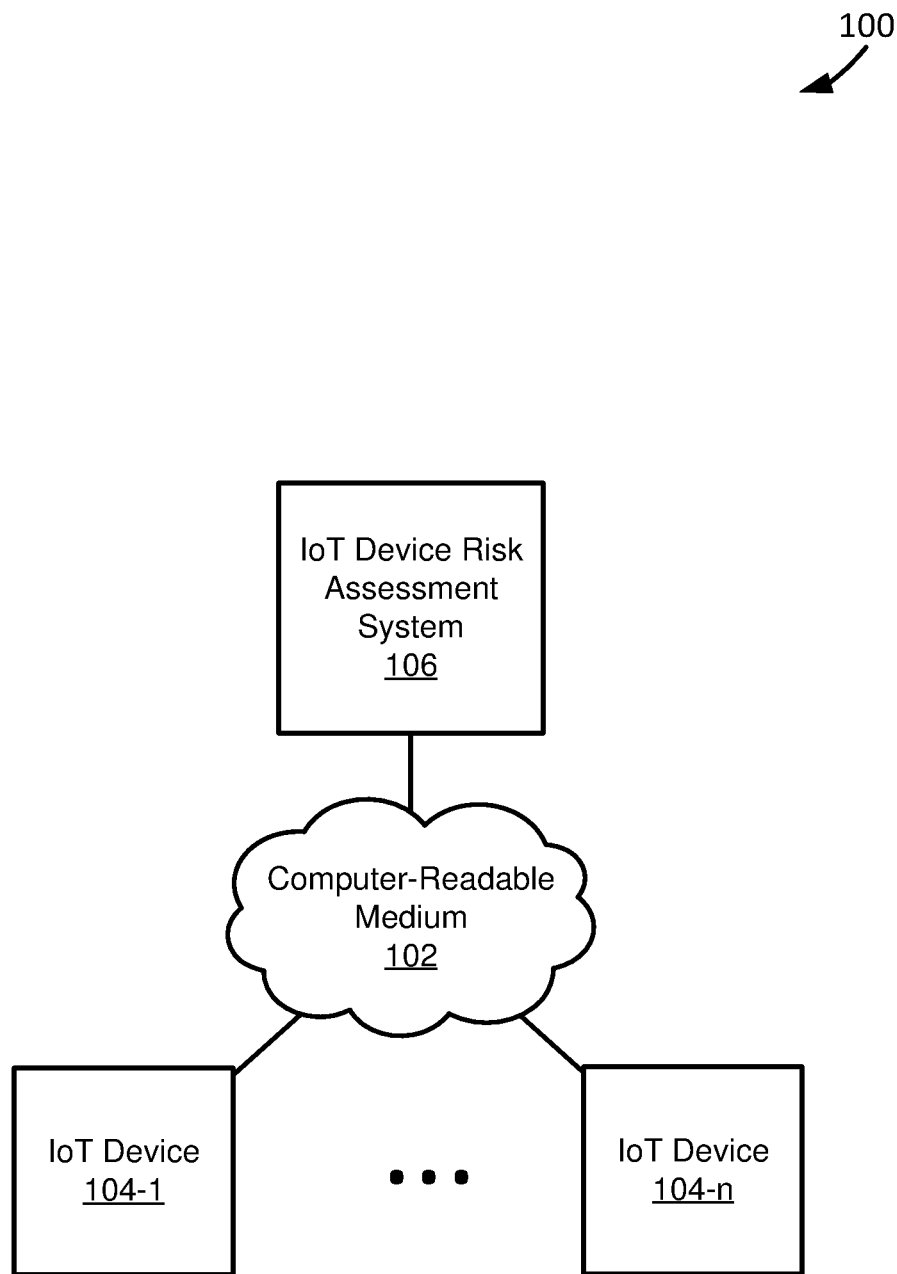
FIG. 1 depicts a diagram of an example of a system for performing risk assessment for IoT devices.

FIG. 1 depicts a diagram 100 of an example of a system for performing risk assessment for Internet of things devices (referred to as "IoT devices"). The system of the example of FIG. 1 includes a computer-readable medium 102, IoT device 104-1 . . . 104-n (hereinafter referred to as "IoT devices 104") coupled to the computer-readable medium 102, and an IoT device risk assessment system 106.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the IoT devices 104 are intended to represent devices with wired or wireless interfaces through which the IoT devices 104 can send and receive data over wired and wireless connections. Examples of IoT devices include thermostats, mobile devices, biological managers, sensory devices, and functionality performing devices. The IoT devices 104 can include unique identifiers which can be used in the transmission of data through a network. Unique identifiers of the IoT devices 104 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the IoT devices 104 can include applicable communication interfaces for receiving and sending data according to an applicable wireless device protocol. Examples of applicable wireless device protocols include Wi-Fi, ZigBee®, Bluetooth®, and other applicable low-power communication standards.

In a specific implementation, the IoT devices 104 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the IoT devices 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In the example of FIG. 1, the IoT device risk assessment system 106 is intended to represent a system that functions to determine risk levels of IoT devices. A risk for an IoT device, as used in this paper, indicates a level or levels of vulnerability in a network an IoT device introduces in accessing network services through the network. For example, a risk for an IoT device can include how likely an IoT device is to be used as part of a denial of service attack for a network. In another example, a risk for an IoT device can include how likely an IoT device is to introducing viruses within a network used by the IoT device to access network services. An IoT device with a high risk level corresponds to the IoT device increasing the vulnerability of a network when it accesses services through the network. A network in which an IoT device introduces vulnerability forming the basis for determining a risk of an IoT device can include all or a portion of a LAN used by the IoT device in accessing network services. For example, a network in which an IoT device introduces vulnerability can include a LAN formed by a plurality of IoT devices including the IoT device. Further in the example, the LAN formed by the plurality of IoT devices including the IoT device can include a portion or all of an enterprise or personal network.

In a specific implementation, at least a portion of the IoT device risk assessment system 106 is implemented remote from IoT devices for which the system determines risk levels. For example, at least a portion of the IoT device risk assessment system 106 can be implemented as cloud based systems. Portions of the IoT device risk assessment system 106 implemented remote from IoT devices can transmit and receive data to and from the IoT devices through virtual private network (hereinafter "VPN") tunnels. For example, the IoT device risk assessment system 106 can receive outbound network traffic sent from IoT devices over a VPN tunnel. Additionally, VPN tunnels through which the IoT device risk assessment system 106 can send and receive data can be maintained using dedicated networking equipment. For example, the IoT device risk assessment system 106 can send and receive data to and from IoT devices using dedicated routers for communicating with the IoT devices.

In a specific implementation, the IoT device risk assessment system 106 is implemented, at least in part, through a local agent. A local agent, as used in this paper, is a physical device locally coupled to IoT devices for use in transmitting data to and from the IoT devices. Depending upon implementation-specific or other considerations, the IoT device risk assessment system 106 can include either or both a wired and a wireless communication interface for transmitting data to and from IoT devices over either or both a wired communication channel and a wireless communication channel. The IoT device risk assessment system 106 can be, at least in part, a device provided by an Internet service provider directly purchased by a consumer and acting as a conduit between networks. Depending upon implementation or other considerations, the IoT device risk assessment system 106 can be implemented as part of a private cloud. A private cloud implementing the IoT device risk assessment system 106, at least in part, can be specific to an entity.

In a specific implementation, the IoT device risk assessment system 106 functions to determine risk levels of IoT devices according to IoT device risk factors. IoT device risk factors include applicable characteristics of an IoT device and an IoT device in operation used in determining a risk level of an IoT device. For example, IoT device risk factors can include whether an IoT device is operating according to either or both known and discovered vulnerabilities. IoT device risk factors can include applicable operational characteristics of an IoT device in accessing network services through a network. For example, IoT device risk factors can include a number of open ports used by an IoT device in accessing network services. In another example, IoT device risk factors can include a number of open ports not used by an IoT device accessing network services through other open ports.

In a specific implementation, the IoT device risk assessment system 106 functions to determine risk levels of IoT devices according to IoT device risk factors related to device characteristics of the IoT device. Device characteristics of an IoT device include applicable characteristics of an IoT device itself. For example, device characteristics of an IoT device include a device type of an IoT device, applications, operating systems, and firmware used by an IoT device, a version of applications, operating systems, and firmware used by an IoT device, and security risks associated with a device itself, e.g. based on device type of the device. For example, if an IoT device is utilizing an out of data operating system, then the IoT device risk assessment system 106 can determine the IoT device is at a higher risk level.

In a specific implementation, the IoT device risk assessment system 106 functions to determine risk levels of IoT devices according to IoT device risk factors related to applications used by IoT devices in accessing network services. Applications used by IoT devices in accessing network services can include applications residing, at least in part, at an IoT device and capable of being executed as part of the IoT device accessing network services. For example, an application used by an IoT device in accessing network services can include an application executing at the IoT device using data transmitted to and from the IoT device as part of the IoT device accessing network services. IoT device risk factors related to applications used by IoT devices in accessing network services can include a number of applications used by an IoT device in accessing network services and characteristics of applications used by an IoT device in accessing network services. For example, IoT device risk factors related to applications used by an IoT device in accessing network services can include a number of applications executing at an IoT device at a specific time or during a specific time duration.

In a specific implementation, characteristics of an application forming IoT device risk factors used in determining risk levels of IoT devices include a risk reputation of the application. A risk reputation of an application can include a level or levels of vulnerability an application introduced in one or plurality of networks based on past operation of IoT devices in using the application to access network services through the one or plurality of networks. For example, if an application was used to infect IoT devices within a network with a virus, then a risk reputation of the application can indicate or reflect that the application was used to infect IoT devices within a network.

In a specific implementation, the IoT device risk assessment system 106 functions to determine risk levels of IoT devices according to IoT device risk factors related to protocols used by IoT devices in accessing network services. Protocols can include applicable protocols used in providing IoT devices access to network services. For example, protocols can include infrastructure protocols, identification protocols, transport protocols, discovery protocols, data protocols, device management protocols, semantic protocols, and multi-layer framework protocols. IoT device risk factors related to protocols used by IoT devices in accessing network services can include a number of differed protocols used by an IoT device in accessing network services and characteristics of protocols used by an IoT device in accessing network services. For example, IoT device risk factors related to protocols used by an IoT device in accessing network services can include a number of protocols used by an IoT device in accessing network services at a specific time or during a specific time duration.

In a specific implementation, characteristics of a protocol forming IoT device risk factors used in determining risk levels of IoT devices include a risk reputation of the protocol. A risk reputation of a protocol can include a level or levels of network vulnerability introduced to one or plurality of networks based on past operation of IoT devices in using the protocol to access network services through the one or plurality of networks. For example, if an IoT device accessing network services according to a specific protocol was used to spread a virus within a network, then a risk reputation of the protocol can indicate or reflect that a virus was spread through a network using an IoT device accessing network services according to the protocol.

In a specific implementation, the IoT device risk assessment system 106 functions to determine risk levels of IoT devices according to IoT device risk factors related to network activeness of an IoT device in accessing network services. IoT device risk factors related to network activeness include applicable characteristics of an IoT device indicating how active the IoT device is in accessing network services. Example IoT device risk factors related to network activeness include a number of other IoT devices or hosts, e.g. remote hosts, an IoT device is communicating with in accessing network services, a number of connections an IoT device has established in accessing network services, a frequency at which an IoT device communicates with a specific number of other IoT devices or hosts, a frequency at which an IoT device has established a specific number of connections in accessing network services, an amount of bandwidth an IoT device is consuming in accessing network services, and a frequency at which an IoT device is consuming a specific amount of bandwidth. For example, if the IoT device risk assessment system 106 determines an IoT device is communicating with a number of hosts above a threshold number of hosts in accessing network services, then the IoT device risk assessment system 106 can determine the IoT device is at a high risk level.

In a specific implementation, the IoT device risk assessment system 106 functions to determine risk levels of IoT devices according to IoT device risk factors related to network communication characteristics of the IoT devices in accessing network services. IoT device risk factors related to network communication characteristics of IoT devices in accessing network services include applicable characteristics of IoT devices in communicating through a network to access network services. For example, IoT device risk factors related to network communication characteristics include whether an IoT device is communicating internally, e.g. with hosts or other IoT devices through a LAN, whether an IoT device is communicating externally, e.g. with remote hosts or remote IoT devices through a WAN or the Internet, whether an IoT device is communicating in an outbound communication session, e.g. a communication session in which the IoT device initiates communication, and whether an IoT device is communicating in an inbound communication session, e.g. a communication session in which another IoT device or host initiates communication with an IoT device. For example, the IoT device risk assessment system 106 can set a risk level of a first IoT device communicating internally in an outbound communication session lower than a set risk level of a second IoT device communicating externally in an inbound communication session.

In a specific implementation, network communication characteristics forming IoT device risk factors used in determining risk levels of IoT devices include a risk reputation of a host or another IoT device communicating with an IoT device as part of accessing network services. A risk reputation of another IoT device is communicating with as part of accessing network services can be a risk level assigned to the another network device based on IoT device risk factors. For example, if an IoT device is communicating internally with another IoT device through a LAN, then a risk reputation of the another IoT device can be a risk level assigned to the another IoT device using IoT device risk factors. Additionally, a risk reputation of a host or another IoT device can include a level or levels of vulnerability a host or another IoT device introduced in one or plurality of networks based on past operation of IoT devices communicating with the host or another IoT device in accessing network services through the one or plurality of networks. For example, if IoT device external communication with a remote host caused a network to undergo an attack, then a risk reputation of the remote host can indicate that external communication with the remote host caused an attack on a network.

In a specific implementation, the IoT device risk assessment system 106 functions to determine risk levels of IoT devices according to IoT device risk factors related to security characteristics of data traffic in providing IoT devices network service access. Security characteristics of data traffic in providing IoT devices network service access include applicable characteristics related to security of data traffic, e.g. whether data traffic transmitted to and from an IoT device is encrypted or sent through network tunnels. For example, if an IoT device is sending and receiving encrypted data in accessing network services, then the IoT device risk assessment system 106 can determine that the IoT device has a low risk level.

In a specific implementation, the IoT device risk assessment system 106 functions to determine risk levels of IoT devices according to IoT device risk factors related to operational performance deviations of IoT devices. Operational performance deviations of IoT devices include ways in which IoT devices, in operation, deviate from regular IoT device behaviors, as indicated by device profiles of IoT devices. Regular IoT device behavior includes typical behavior exhibited by IoT devices in operation. Regular IoT device behavior can include typical IoT device behavior of a specific IoT device, typical IoT device behavior of IoT devices of a specific type, and typical IoT device behavior of a group of IoT devices. For example, regular IoT device behavior can include typical IoT device behavior of a group of IoT devices within an enterprise network. In another example, regular IoT device behavior can include typical IoT device behavior of a group of IoT devices at a physical location. An example of an operational performance deviation of an IoT device is an IoT device communicating with a remote host other IoT devices within the enterprise network of the IoT device refrain from communicating with, as indicated by typical IoT device behavior of the other IoT devices within the enterprise network.

In a specific implementation, the IoT device risk assessment system 106 functions to maintain device profiles for IoT devices. Device profiles can be used to determine risk levels of IoT devices, e.g. by analyzing IoT device risk factors of IoT devices indicated by the device profiles. A device profile for an IoT device includes either or both characteristics of the IoT device and characteristics of how the IoT device functions in operation. For example a device profile can include a type of device of an IoT device, a maker of an IoT device, a module of an IoT device, firmware on an IoT device, an operating system of an IoT device, applications executing at or capable of being executed at an IoT device, an entity or an organization associated with an IoT device, a physical location of an IoT device, a network location of an IoT device, uses of an IoT device, characteristics of an IoT device actually operating, patterns of an IoT device in operating. In maintaining IoT device profiles, the IoT device risk assessment system 106 can cluster IoT devices together, thereby associating IoT device profiles with each other, for use in determining risk levels of IoT devices. For example, the IoT device risk assessment system 106 can group IoT devices of the same type in an enterprise network together for use in determining a risk level of an IoT device of the type in the enterprise network based on device profiles of the grouped IoT devices.

In a specific implementation, the IoT device risk assessment system 106 functions to maintain an instance of an IoT device as part of an IoT device profile. An instance of an IoT device includes either or both characteristics of an IoT device and characteristics of how a device is operating at a specific time. For example, if an IoT device begins communicating internally with another IoT device, then an instance of the IoT device can indicate that the IoT device is communicating internally with another IoT device. The IoT device risk assessment system 106 can use one or a plurality of instances of IoT devices to determine operational performance deviations of the IoT devices. For example, if a plurality of instances of an IoT device indicate an IoT device is communicating with a host which the IoT device does not normally communicate with, as indicated by regular IoT device behavior, then the IoT device risk assessment system 106 can determine the IoT device is deviating in its operation.

In a specific implementation, the IoT device risk assessment system 106 functions to match an IoT device to a new device profile or otherwise create a new device profile for the IoT device based on instances of the IoT device. In matching an IoT device to a new device profile based on instances of the IoT device, the IoT device risk assessment system 106 can determine whether to actually match the IoT device to a new device profile using the instances of the IoT device. For example, if instances of an IoT device indicate the IoT device is continuing to deviate from regular IoT device behavior of the IoT device, or is otherwise behaving abnormally, then the IoT device risk assessment system 106 can determine to match the IoT device to a new device profile or create a new device profile for the IoT device. Additionally, in matching an IoT device to a new device profile based on instances of the IoT device, the IoT device risk assessment system 106 can determine a new device profile to match to the IoT device or otherwise create for the new IoT device. For example, if an instance of an IoT device indicates an IoT device is of a specific type, then the IoT device risk assessment system 106 can match the IoT device to an IoT device profile of an IoT device of the same type. In another example, the IoT device risk assessment system 106 can generate a new IoT device profile for an IoT device based on characteristics of the IoT device, as indicated by instances, before the IoT device began to deviate from regular IoT device behavior.

In a specific implementation, the IoT device risk assessment system 106 functions to maintain device profiles based on passive observation of IoT devices. In maintaining device profiles based on passive observation of IoT devices, the IoT device risk assessment system 106 can use IoT history data created from one or an applicable combination of event logs, system logs, and access logs. Event logs, system logs, and access logs used in creating IoT history data can be maintained by analyzing data packets transmitted to and from IoT devices. For example, event logs, system logs, and access logs used in creating IoT history data can be maintained by performing deep packet inspection on data packets transmitted to and from IoT devices.

In a specific implementation, the IoT device risk assessment system 106 functions to maintain device profile based on active probing of IoT devices. In maintaining device profiles based on active probing of IoT devices, the IoT device risk assessment system 106 can use IoT history data created by analyzing data traffic sent from an IoT device in response to probing of the IoT device. For example, if data sent from an IoT device in response to probing indicates an IoT device is susceptible to malware, as indicated by IoT history data, then the IoT device risk assessment system 106 can update a device profile of the IoT device to indicate the device is susceptible to malware. The IoT device risk assessment system 106 can maintain a device profile of an IoT device based on a vulnerability score assigned to the IoT device in response to proving of the vulnerability device. Specifically, the IoT device risk assessment system 106 can update a device profile of an IoT device to include a vulnerability score assigned to the IoT device and the vulnerability factors and IoT device performance resulting from probing that led to assignment of the vulnerability score to the IoT device.

In a specific implementation, the IoT device risk assessment system 106 functions to determine risk levels of IoT devices according to IoT device risk factors based on assessment weights. Assessment weights specify weights to give to different risk factors in determining a risk level for an IoT device. Additionally, assessment weights are specific to one or a plurality of IoT device risk factors. For example, an assessment weight can specify to weigh IoT risk factors related to applications used by an IoT device in accessing network services 20% in determining an overall risk level, e.g. a risk score, of the IoT device. A risk score determined for an IoT device can be used to assess IoT devices into different risk levels. For example, if a first IoT device is assigned a risk score of twenty and a second IoT device is assigned a risk score of eighty, then the first IoT device can be assessed into a low risk level, while the second IoT device can be assessed into a high risk level.

In a specific implementation, assessment weights applied to IoT device risk factors for use in determining risk levels of IoT devices, are dependent on characteristics of a network. Characteristics of a network include applicable features for describing a network in providing IoT devices access to network services. Examples of characteristics of a network include characteristics of other IoT devices within a network, as indicated by device profiles of the other IoT devices, physical locations of IoT devices within a network, and a network type of a network. In depending on characteristics of a network, assessment weights can vary between different IoT devices accessing network services through different networks. For example, if a first IoT device accesses network services through a first LAN serving a large amount of IoT devices, while a second IoT device accessed network services through a second LAN is serving a small amount of IoT device, then an assessment weight related to network activeness can be lower for the first IoT device than it is for the second IoT device.

In a specific implementation, in depending on characteristics of IoT devices as part of characteristics of a network, assessment weights vary between different IoT devices accessing network services through the same network. For example, a first IoT device of a first device type accessing network services through a LAN can have different assessment weights than a second IoT device of a different device type accessing network services through the same LAN. In another example, if a first IoT device in accessing network services through a LAN is communicating externally with a remote host while a second IoT device in accessing network services through the LAN is communicating internally, then an assessment weight for IoT device risk factors related to network communication characteristics can be greater for the first IoT device than it is for the second IoT device.

In a specific implementation, assessment weights applied to IoT device risk factors related to operational performance deviations of IoT devices are dependent on either or both specific behaviors an IoT device exhibited in deviating from regular IoT device behaviors or a degree to which an IoT device deviates from regular IoT device behaviors. For example, if in communicating with other IoT devices or hosts as part of accessing network services, an IoT device only deviates slightly from regular IoT device behaviors, then an assessment weight to apply IoT device risk factors related to operation performance deviations of IoT devices for the IoT can only be modified slightly for the IoT device. In another example, if in deviating from regular IoT device behavior, an IoT device exhibits vulnerabilities to outside attacks, then an assessment weight applied to IoT device risk factors related to operational performance deviations of IoT devices can be increased significantly.

In a specific implementation, the IoT device risk assessment system 106 functions to present risk assessment data to a user. Risk assessment data includes applicable data related to assessment of IoT devices into risk levels. Example risk assessment data includes determined risk levels of IoT devices, characteristics of IoT devices, identifications of IoT devices, determined risk scores for IoT devices, assessment weights, including values of the weights used to determine risk levels of IoT devices, and IoT device risk factors used to determine risk levels of IoT devices. For example, the IoT device risk assessment system 106 can present to a user risk levels assigned to IoT devices managed by a user. In another example, the IoT device risk assessment system 106 can present to a user identifications of all IoT devices managed by a user which are assigned to a risk level above a threshold risk level.

In a specific implementation, the IoT device risk assessment system 106 functions to present risk assessment data to a user either or both periodically and in a response to a stimulus. Examples of stimuli triggering presentation of risk assessment data include an IoT device of a user is assigned a risk level greater than a threshold risk level, a threshold number of IoT devices of a user are assigned a risk level greater than a threshold risk level, or a user requests a risk assessment report for their IoT devices. For example, if a threshold for informing a user risk levels assigned to their IoT devices is one hundred devices have been assigned to a high risk level, and one hundred IoT devices managed by a user are assigned to a high risk level, then the IoT device risk assessment system 106 can present identifications of the one hundred IoT devices assigned to the high risk level to the user.

In an example of operation of the example system shown in FIG. 1, the IoT device risk assessment system 106 generates device profiles for the IoT devices 104 based on characteristics of the IoT devices 104 in accessing network services. In the example of operation of the example system shown in FIG. 1, the IoT device risk assessment system 106 assigns the IoT devices 104 to risk levels according to IoT device risk factors and assessment weights based on the generated device profiles for the IoT devices 104. Additionally in the example of operation of the example system shown in FIG. 1, the IoT device risk assessment system 106 presents risk assessment data indicating the risk levels assigned to the IoT devices 104 to a user associated with the IoT devices 104.

Figure 2:
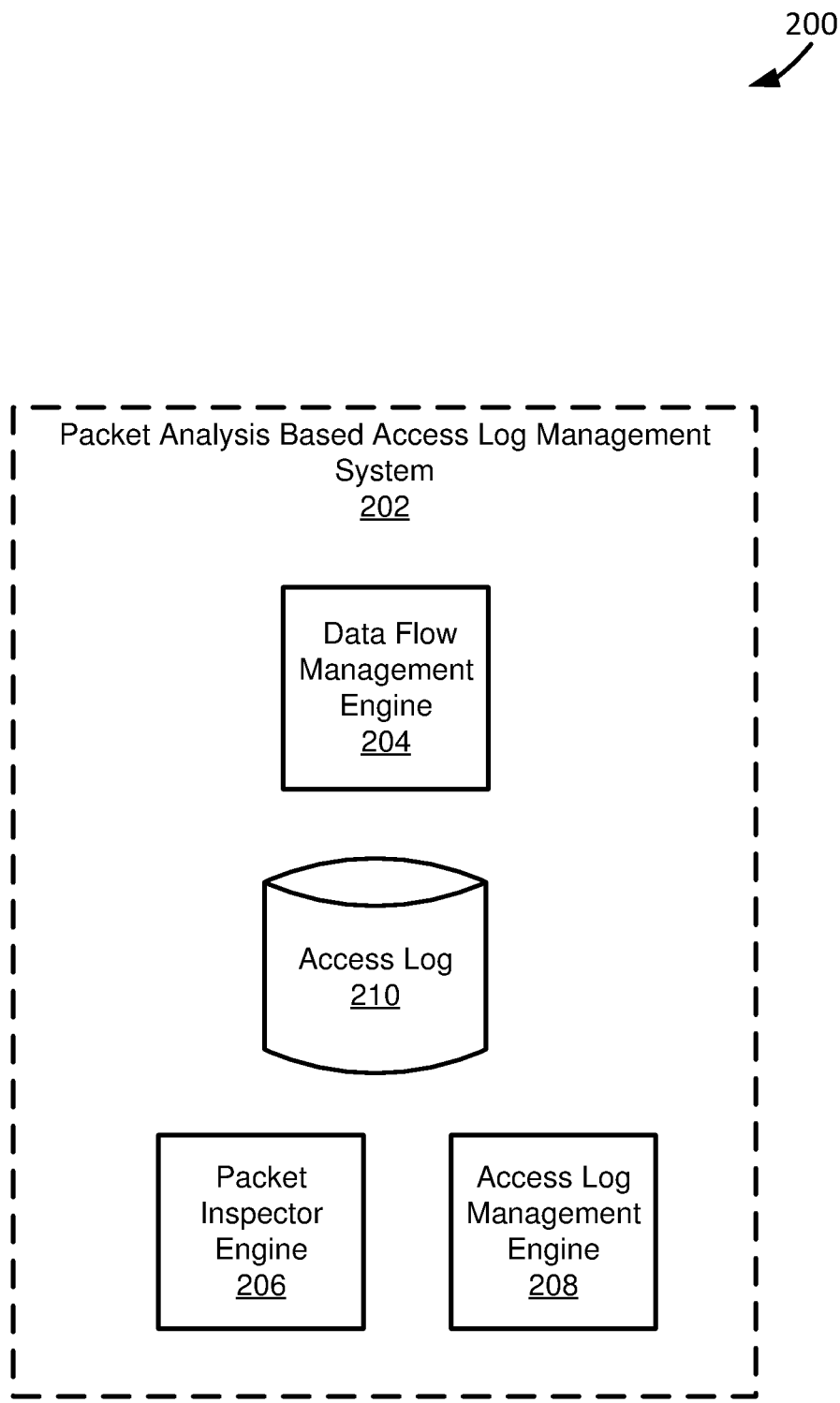
FIG. 2 depicts a diagram of an example packet analysis based access log management system.

FIG. 2 depicts a diagram 200 of an example packet analysis based access log management system 202. The packet analysis based access log management system 202 is intended to represent a system that functions to use packet analysis to manage access logs for IoT devices. The packet analysis based access log management system 202 can be implemented as part of an applicable system for assessing IoT device risk levels, such as the IoT device risk assessment systems described in this paper. An access log managed by the packet analysis based access log management system 202 can be used in assessing IoT device risk levels. For example, an access log maintained by the packet analysis based access log management system 202 can be used to develop device profiles for IoT devices for use in assessing risk levels for the IoT devices. An access log maintained by the packet analysis based access log management system 202 includes applicable information related to users utilizing IoT devices. For example, an access log can include an identification of a user who utilized an IoT device, times when the user accessed the IoT device, locations of the IoT device when it was accessed by a specific user, locations of the user when accessing the IoT device, characteristics of different types of access to the IoT device, e.g. remote access, and ways in which a specific user utilizes the IoT device to access network services, which can also be included as part of or maintained separately as an event log.

In a specific implementation, in maintaining an access log, the packet analysis based access log management system 202 can inspect packets at a location local with respect to IoT devices for which the packet analysis based access log management system 202 manages access logs. For example, the packet analysis based access log management system 202 can be implemented, at least in part, at a local appliance coupled to IoT devices, and subsequently inspect packets sent to and received from the IoT devices at the appliance. Alternatively, the packet analysis based access log management system 202 can inspect packets at a remote location with respect to IoT devices for which the packet analysis based access log management system 202 manages access logs. For example, the packet analysis based access log management system 202 can be implemented at a remote location from IoT devices, e.g. the cloud, and subsequently inspect packets sent to and received from the IoT devices at the remote location, e.g. in-line. When the packet analysis based access log management system 202 is implemented to inspect packets at a remote location with respect to IoT devices, the packet analysis based access log management system 202 can receive packets for inspection through VPN tunnels.

The packet analysis based access log management system 202 shown in the example of FIG. 2 includes a data flow management engine 204, a packet inspector engine 206, an access log management engine 208, and an access log datastore 210. The data flow management engine 204 functions to control the flow of data packets to and from IoT devices. In controlling the flow of data packets to and from IoT devices, the data flow management engine 204 can obtain data packets. In various implementations, the data flow management engine 204 can use packet sniffing to obtain data packets. For example, the data flow management engine 204 can analyze headers of data packets to determine which data packets to obtain for subsequent performance of packet inspection. Further, in controlling the flow of data packets to and from IoT devices, the data flow management engine 204 can forward the data packets to an appropriate destination. For example, if a data packet is addressed to a specific IoT device, then the data flow management engine 204 can forward the data packet to the specific IoT device. In various implementations, the data flow management engine 204 can forward data packets after the packets have been inspected. For example, the data flow management engine 204 can forward data packets after deep packet inspection has been performed on the data packets.

In a specific implementation, the data flow management engine 204 functions to manage forwarding of data packets through VPN tunnels. In managing forwarding of data packets through VPN tunnels, the data flow management engine 204 can forward data packets to appropriate destinations using VPN tunnels. For example, the data flow management engine 204 can forward a data packet using a VPN tunnel, by forwarding the data packet to an ultimate destination through dedicated networking equipment, e.g. routers, for VPN tunneling. In managing forwarding of data packets through VPN tunnels, the data flow management engine 204 can select specific data packets to forward using VPN tunnels. The data flow management engine 204 can select data packets to forward through VPN tunneling based, at least in part, on either or both an origin and a destination of the data packet. For example, the data flow management engine 204 can forward data packets sent from a specific IoT device through VPN tunneling. Further, the data flow management engine 204 can select data packets to forward through VPN tunneling based, at least in part, on either or both a packet type and data contained in data packets. For example, if a data packet relates to sensitive information of a user, then the data flow management engine 204 can forward the packet through VPN tunneling. Either or both a packet type and data contained in data packets can be determined by an applicable data packet analysis technique, e.g. deep packet inspection.

In a specific implementation, a portion of the data flow management engine 204 is implemented as a local appliance, with respect to IoT devices, and another portion of the data flow management engine 204 is implemented remote from the IoT devices, e.g. in the cloud. A locally implemented portion of the data flow management engine 204 can obtain data packets transmitted from IoT devices and transmit the data packets to a remotely implemented portion of the data flow management engine 204 for use in assessing IoT device risk levels. Additionally, a locally implemented portion of the data flow management engine 204 can obtain data packets transmitted from IoT devices and transmit the data packets to a remotely implemented portion of the data flow management engine 204 through VPN tunneling. Data packets transmitted from a locally implemented portion of the data flow management engine 204 to a remotely implemented portion of the data flow management engine 204 can be analyzed at the remote location, e.g. in the cloud, for use in assessing IoT device risk levels.

In a specific implementation, a remotely implemented portion of the data flow management engine 204 functions to obtain data packets destined to IoT devices and transmit the data packets to a locally implemented portion of the data flow management engine 204, for use in assessing risk levels of IoT devices. A remotely implemented portion of the data flow management engine 204 can obtain data packets destined to IoT devices and transmit the data packets to a remotely implemented portion of the data flow management engine 204 through VPN tunneling. Additionally, data packets transmitted from a remotely implemented portion of the data flow management engine 204 to a locally implemented portion of the data flow management engine 204 can be analyzed at either or both a remote location or a local location, for use in assessing risk levels of IoT devices.

In the example of FIG. 2, the packet inspector engine 206 is intended to represent an engine that functions to sniff packets sent to and from IoT devices for the purposes of assessing risk levels of the IoT devices. For example, the packet inspector engine 206 can analyze packets to determine a user of an IoT device. Depending upon implementation-specific or other considerations, the packet inspector engine 206 can perform deep packet inspection on packets sent to and from IoT devices. In performing deep packet inspection on packets sent to and from IoT devices, the packet inspector engine 206 can determine transaction data from payloads of data packets. Transaction data includes either or both types and subjects of data transmitted as part of a data packet. For example, transaction data of a data packet sent to a thermostat can include an instruction to increase the temperature at the thermostat. Transaction data determined by the packet inspector engine 206 can be used to build, at least in part, historical records for IoT devices. Historical records of IoT devices can be formed from an applicable combination of event logs, system logs, and access logs for IoT devices and used in assessing risk levels of IoT devices.

In a specific implementation, the packet inspector engine 206 functions to identify either or both destinations and sources of analyzed data packets. For example, the packet inspector engine 206 can determine an identification of a destination IoT device by analyzing a data packet destined for the IoT device. In another example, the packet inspector engine 206 can determine a source of a data packet destined to an IoT device. Identifications of either or both destinations and sources of analyzed data packets, as determined by the packet inspector engine 206, can be used, along with determined transaction data to generate historical records of IoT devices. The packet inspector engine 206 can select data packets to perform deep packet inspection on based on at least one of a source of data packets, a destination of data packets, a data packet type of data packets, and data within data packets. For example, all data packets from a particular source can have deep packet inspection performed on them by the packet inspector engine 206.

In the example of FIG. 2, the access log management engine 208 is intended to represent an engine that functions to maintain an access log of IoT devices for use in assessing IoT device risk levels. In managing an access log, the access log management engine 208 can create and update an access log to indicate an identification of a specific user interacting with or using an IoT device, when the user interacted with or used the IoT device, whether the user interacted with the IoT device from a remote location or not, and events in interacting with the IoT device, indicating a usage type of the IoT device by the user. An access log can be used to generate a subset of a historical record of an IoT device specific to a user, for use in establishing a regular behavior of a user in interacting with or utilizing a specific IoT device. For example, an access log can be used to establish that a user always interacts with a tablet at 8 o'clock in the evening on weeknights. Regular behavior of a user in interacting with or utilizing a specific IoT device can be used, at least in part, to assess a risk level of the IoT device.

In a specific implementation, the access log management engine 208 functions to maintain an access log for an IoT device based on analysis of data packets transmitted to and from the IoT device. For example, the access log management engine 208 can maintain an access log for an IoT device based on analysis of data packets transmitted to and from the IoT device as a user interacts with or utilizes an IoT device. Depending upon implementation-specific or other considerations, the access log management engine 208 can maintain an access log based on deep packet inspection of packets transmitted to and from an IoT device. For example, the access log management engine 208 can use transaction data identified through deep packet inspection of data packets to determine how a user is interacting with an IoT device, e.g. events in interacting with the IoT device. Further in the example, the access log management engine 208 can update an access log to indicate how the user interacted with the IoT device. In another example, the access log management engine 208 can use transaction data identified through deep packet inspection of data packets to determine how a user remotely interacts with an IoT device, e.g. events in interacting with the IoT device remotely.

In a specific implementation, the access log management engine 208 functions to maintain an access log for IoT devices using at least in part, event logs for the IoT devices. In various implementations, the access log management engine 208 can use transaction data identified through deep packet inspection of data packets to determine how a user is interacting with an IoT device, e.g. events in interacting with the IoT device, and an events log to maintain an access log. For example, the access log management engine 208 can compare events determined from transaction data identified through deep packet inspection with a pattern of events, indicated by an event log, to determine how a user is interacting with an IoT device and subsequently update an access log to indicate how the user is interacting with the IoT device. In another example, the access log management engine 208 can compare events determined from transaction data identified through deep packet inspection with a pattern of events associated with different users, indicated by an event log, to determine an identification of a user interacting with an IoT device.

In the example of FIG. 2, the access log datastore 210 is intended to represent a datastore that functions to store access log data indicating access logs for use in determining risk levels of IoT devices. Access log data stored in the access log datastore 210 can be maintained using packet analysis of data packets transmitted to and from IoT devices. Additionally, access log data stored in the access log datastore 210 can be maintained using events in interactions with IoT devices determined from transaction data identified through deep packet inspection of data packets transmitted to and from the IoT devices. Further, access log data stored in the access log datastore 210 can be maintained using, at least in part, an event logs for IoT devices.

In an example of operation of the system shown in the example of FIG. 2, the data flow management engine 204 obtains data packets destined to or sent from an IoT device. In the example of operation of the example system shown in FIG. 2, the packet inspector engine 206 uses deep packet inspection to identify transaction data describing user interactions with the IoT device from the obtained data packets. Further, in the example of operation of the example of operation of the example system shown in FIG. 2, the access log management engine 208 determines events related to user interaction with the IoT device from the transaction data and subsequently maintains an access log, stored as access log data in the access log datastore 210, based on the determined events. In the example of operation of the example system shown in FIG. 2, the access log, stored as the access log data in the access log datastore 210 is used in assessing IoT device risk levels.

Figure 3:
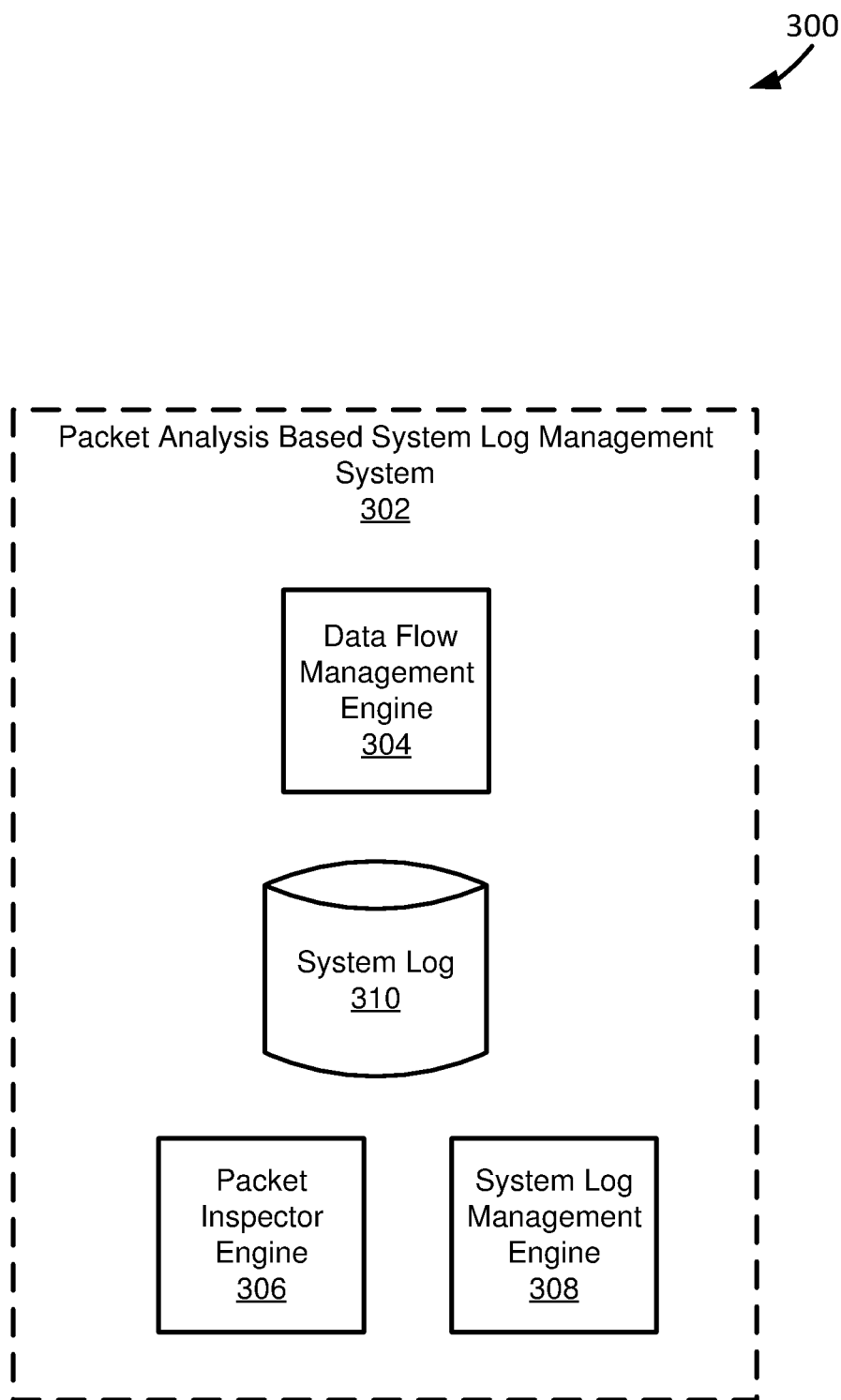
FIG. 3 depicts a diagram of an example packet analysis based system log management system.

FIG. 3 depicts a diagram 300 of an example packet analysis based system log management system 302. The packet analysis based system log management system 302 is intended to represent a system that functions to use packet analysis to manage system logs for IoT devices. Additionally, the packet analysis based system log management system 302 can be implemented as part of an applicable system for assessing IoT device risk levels, such as the IoT device risk assessment systems described in this paper. A system log managed by the packet analysis based system log management system 302 can be used in assessing IoT device risk levels. For example, a system log maintained by the system log management system 302 can be used to develop device profiles for IoT devices for use in assessing risk levels of the IoT devices. A system log maintained by the packet analysis based system log management system 302 can include applicable information relating to systems of managed IoT devices. For example, a system log can include applications and operating systems executed at an IoT device, and capabilities of an IoT device, e.g. whether an IoT device is capable of communicating with a remote source.

In a specific implementation, in maintaining a system log, the packet analysis based system log management system 302 can inspect packets at a location local with respect to IoT devices for which the packet analysis based system log management system 302 manages system logs. For example, the packet analysis based system log management system 302 can be implemented, at least in part, at a local appliance coupled to IoT devices, and subsequently inspect packets sent to and received from the IoT devices at the appliance. Alternatively, the packet analysis based system log management system 302 can inspect packets at a remote location with respect to IoT devices for which the packet analysis based system log management system 302 manages system logs. For example, the packet analysis based system log management system 302 can be implemented at a remote location from IoT devices, e.g. the cloud, and subsequently inspect packets sent to and received from the IoT devices at the remote location, e.g. in-line. When the packet analysis based system log management system 302 is implemented to inspect packets at a remote location with respect to IoT devices, the packet analysis based system log management system 302 can receive packets for inspection through VPN tunneling.

The packet analysis based system log management system 302 shown in the example of FIG. 3 includes a data flow management engine 304, a packet inspector engine 306, a system log management engine 308, and a system log datastore 310. The data flow management engine 304 is intended to represent an engine that functions according to an applicable engine for controlling the flow of data packets to and from IoT devices for purposes of determining risk levels of the IoT devices, such as the data flow management engines described in this paper. In controlling the flow of data packets to and from IoT devices, the data flow management engine 304 can obtain data packets. Further, in controlling the flow of data packets to and from IoT devices, the data flow management engine 304 can forward the data packets to an appropriate destination. For example, if a data packet is addressed to a specific IoT device, then the data flow management engine 304 can forward the data packet to the specific IoT device. In various implementations, the data flow management engine 304 can forward data packets after the packets have been inspected. For example, the data flow management engine 304 can forward data packets after deep packet inspection has been performed on the data packets.

In a specific implementation, the data flow management engine 304 functions to manage forwarding of data packets through VPN tunnels. In managing forwarding of data packets through VPN tunnels, the data flow management engine 304 can forward data packets to appropriate destinations using VPN tunnels. For example, the data flow management engine 304 can forward a data packet using a VPN tunnel, by forwarding the data packet to an ultimate destination through dedicated networking equipment, e.g. routers, for VPN tunneling. In managing forwarding of data packets through VPN tunnels, the data flow management engine 304 can select specific data packets to forward using VPN tunnels. The data flow management engine 304 can select data packets to forward through VPN tunneling based, at least in part, on either or both an origin and a destination of the data packet. For example, the data flow management engine 304 can forward data packets sent from a specific IoT device through VPN tunneling. The data flow management engine 304 can select data packets to forward through VPN tunneling based, at least in part, on either or both a packet type and data contained in data packets. For example, if a data packet relates to login information of a user, then the data flow management engine 304 can forward the packet through VPN tunneling. Either or both a packet type and data contained in data packets can be determined by an applicable data packet analysis techniques, e.g. deep packet inspection.

In a specific implementation, a portion of the data flow management engine 304 is implemented as a local appliance, with respect to IoT devices, and another portion of the data flow management engine 304 is implemented remote from the IoT devices, e.g. in the cloud. A locally implemented portion of the data flow management engine 304 can obtain data packets transmitted from IoT devices and transmit the data packets to a remotely implemented portion of the data flow management engine 304. Additionally, a locally implemented portion of the data flow management engine 304 can obtain data packets transmitted from IoT devices and transmit the data packets to a remotely implemented portion of the data flow management engine 304 through VPN tunneling. Data packets transmitted from a locally implemented portion of the data flow management engine 304 to a remotely implemented portion of the data flow management engine 304 can be analyzed at the remote location, e.g. in the cloud, for use in assessing IoT device risk levels.

In a specific implementation, a remotely implemented portion of the data flow management engine 304 functions to obtain data packets destined to IoT devices and transmit the data packets to a locally implemented portion of the data flow management engine 304, for use in assessing risk levels of IoT devices. A remotely implemented portion of the data flow management engine 304 can obtain data packets destined to IoT devices and transmit the data packets to a locally implemented portion of the data flow management engine 304 through VPN tunneling. Additionally, data packets transmitted from a remotely implemented portion of the data flow management engine 304 to a locally implemented portion of the data flow management engine 304 can be analyzed at either or both a remote location or a local location, for use in assessing risk levels of IoT devices.

In the example of FIG. 3, the packet inspector engine 306 is intended to represent an engine that functions according to an applicable engine for sniffing packets sent to and from IoT devices for the purposes of assessing risk levels of the IoT devices, such as the packet inspector engines described in this paper. For example, the packet inspector engine 306 can sniff packets to determine applications being executed at an IoT device which can subsequently be used to determine a risk level of an IoT device. In analyzing data packets, the packet inspector engine 306 can perform deep packet inspection on packets sent to and from IoT devices. In performing deep packet inspection on packets sent to and from IoT devices, the packet inspector engine 306 can determine transaction data of data packets. Transaction data determined by the packet inspector engine 306 can be used to build, at least in part, historical records for IoT devices. Historical records for IoT devices can be formed from an applicable combination of event logs, system logs, and access logs for IoT devices and used in assessing risk levels of IoT devices.

In a specific implementation, the packet inspector engine 306 functions to identify either or both destinations and sources of analyzed data packets. For example, the packet inspector engine 306 can determine an identification of a destination IoT device by analyzing a data packet destined for the IoT device. In another example, the packet inspector engine 306 can determine a source of a data packet destined to an IoT device. Identifications of either or both destinations and sources of analyzed data packets can be used, along with transaction data determined from the analyzed data packets, to generate historical records for IoT devices. The packet inspector engine 306 can select data packets to perform deep packet inspection on based on at least one of a source of data packets, a destination of data packets, a data packet type of data packets, and data within data packets. For example, all data packets from a particular source can have deep packet inspection performed on them by the packet inspector engine 306.

In the example of FIG. 3, the system log management engine 308 is intended to represent an engine that functions to maintain a system log for IoT devices for use in assessing risk levels of IoT devices. In managing a system log, the system log management engine 308 can create and update a system log to indicate one or an applicable combination of an identification of applications and operating systems executing or capable of being executed at an IoT device, versions of applications and operating systems executing or capable of being executed at an IoT device, applications and operating systems that have been executed at an IoT device, and times and locations of the IoT devices when the applications and operating systems were executed at an IoT device. A system log can be used to generate a historical record specific to an IoT device, for use in determining whether a normal application is being executed at an IoT device as part of regular IoT device behavior. For example, a system log can be used to establish that an IoT device usually executes specific applications which can subsequently be used to assess a risk level of the IoT device.

In a specific implementation, the system log management engine 308 functions to maintain a system log for an IoT device based on analysis of data packets transmitted to and from the IoT device. In maintaining a system log based on analysis of data packets, the system log management engine 308 can maintain a system log based on deep packet inspection of packets transmitted to and from an IoT device. For example, the system log management engine 308 can use transaction data identified through deep packet inspection of data packets to determine what applications are executing on an IoT device, e.g. through types of data transmitted from an IoT device. Further in the example, the system log management engine 308 can update a system log to indicate what applications are executing at an IoT device and times the applications are executing at the IoT device.

In the example of FIG. 3, the system log datastore 310 is intended to represent a datastore that functions to store system log data indicating system logs for use in assessing IoT device risk levels. System log data stored in the system log datastore 310 can be maintained using packet analysis of data packets transmitted to and from IoT devices. Additionally, system log data stored in the system log datastore 310 can be maintained using transaction data identified through deep packet inspection of data packets transmitted to and from the IoT devices. For example, system log data can be generated based on a determination of applications executing at an IoT device using transaction data identified through deep packet inspection of data packets transferred to and from the IoT device as part of executing the applications.

In an example of operation of the system shown in the example of FIG. 3, the data flow management engine 304 obtains data packets destined to or sent from an IoT device. In the example of operation of the example system shown in FIG. 3, the packet inspector engine 306 uses deep packet inspection to identify transaction data from the obtained data packets. Further, in the example of operation of the example system shown in FIG. 3, the system log management engine 308 determines applications executing at the IoT device from the transaction data and subsequently maintains a system log, stored as system log data in the system log datastore 310, indicating the applications executing at the IoT device and when the applications were executing at the IoT device. In the example of operation of the example system shown in FIG. 3, the system log, stored as the system log data in the system log datastore 310 is used in assessing IoT device risk levels.

Figure 4:
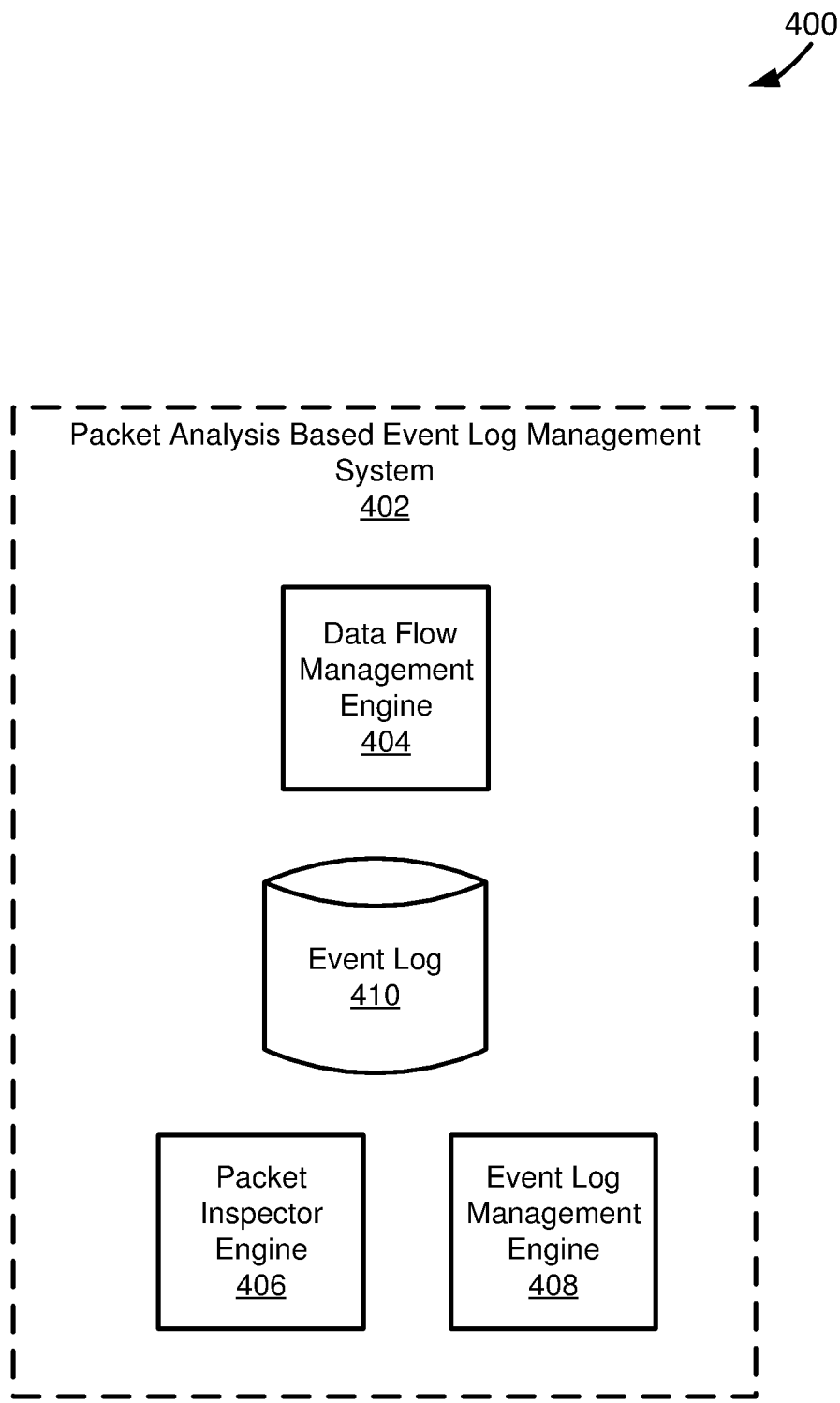
FIG. 4 depicts a diagram of an example packet analysis based event log management system.

FIG. 4 depicts a diagram 400 of an example packet analysis based event log management system 402. The packet analysis based event log management system 402 is intended to represent a system that functions to use packet analysis to manage event logs for IoT devices. Additionally, the packet analysis based event log management system 402 can be implemented as part of an applicable system for assessing IoT device risk levels, such as the IoT device rise assessment systems described in this paper. An event log managed by the packet analysis based event log management system 402 can be used in assessing risk levels of IoT devices. For example, an event log maintained by the packet analysis based event log management system 402 can be used to develop device profiles for IoT devices for use in assessing risk levels of the IoT devices. An event log includes events associated with IoT devices. Events can include applicable parameters related to operation of an IoT device, such as what data is sent to and from the IoT device, destinations and origins of data sent to and from the IoT device, identifications of the IoT device, geographic information relating to the IoT device, and interaction types corresponding to patterns of events. For example, an event log can include a pattern of events corresponding to a specific way in which an IoT device is being interacted with or otherwise functioning.

In a specific implementation, in maintaining an event log, the packet analysis based event log management system 402 can inspect packets at a location local with respect to IoT devices for which the packet analysis based event log management system 402 manages an event log. For example, the packet analysis based event log management system 402 can be implemented, at least in part, at a local appliance coupled to IoT devices, and subsequently inspect packets sent to and received from the IoT devices at the appliance. Alternatively, the packet analysis based event log management system 402 can inspect packets at a remote location with respect to IoT devices for which the packet analysis based event log management system 402 manages an event log. For example, the packet analysis based event log management system 402 can be implemented at a remote location from IoT devices, e.g. the cloud, and subsequently inspect packets sent to and received from the IoT devices at the remote location, e.g. in-line. When the packet analysis based event log management system 402 is implemented to inspect packets at a remote location with respect to IoT devices, the packet analysis based event log management system 402 can receive packets for inspection through VPN tunneling.

The packet analysis based event log management system 402 shown in the example of FIG. 4 includes a data flow management engine 404, a packet inspector engine 406, an event log management engine 408, and an event log datastore 410. The data flow management engine 404 is intended to represent an engine that functions according to an applicable engine for controlling the flow of data packets to and from IoT devices for purposes of determining risk levels of IoT devices, such as the data flow management engines described in this paper. In controlling the flow of data packets to and from IoT devices, the data flow management engine 404 can obtain data packets. Further, in controlling the flow of data packets to and from IoT devices, the data flow management engine 404 can forward the data packets to an appropriate destination. For example, if a data packet is addressed to a specific IoT device, then the data flow management engine 404 can forward the data packet to the specific IoT device. In various implementations, the data flow management engine 404 can forward data packets after the packets have been inspected. For example, the data flow management engine 404 can forward data packets after deep packet inspection has been performed on the data packets.

In a specific implementation, the data flow management engine 404 functions to manage forwarding of data packets through VPN tunnels. In managing forwarding of data packets through VPN tunnels, the data flow management engine 404 can forward data packets to appropriate destinations using VPN tunnels. For example, the data flow management engine 404 can forward a data packet using a VPN tunnel, by forwarding the data packet to an ultimate destination through dedicated networking equipment, e.g. routers, for VPN tunneling. In managing forwarding of data packets through VPN tunnels, the data flow management engine 404 can select specific data packets to forward using VPN tunnels. the data flow management engine 404 can select data packets to forward through VPN tunneling based, at least in part, on an either or both an origin and a destination of the data packet. For example, the data flow management engine 404 can forward data packets sent from a specific IoT device through VPN tunneling. Additionally, the data flow management engine 404 can select data packets to forward through VPN tunneling based, at least in part, on either or both a packet type and data contained in data packets. For example, if a data packet relates to login information of a user, then the data flow management engine 404 can forward the packet through VPN tunneling. Either or both a packet type and data contained in data packets can be determined by an applicable packet analysis technique, e.g. deep packet inspection.

In a specific implementation, a portion of the data flow management engine 404 is implemented as a local appliance, with respect to IoT devices, and another portion of the data flow management engine 404 is implemented remote from the IoT devices, e.g. in the cloud. A locally implemented portion of the data flow management engine 404 can obtain data packets transmitted from IoT devices and transmit the data packets to a remotely implemented portion of the data flow management engine 404. Additionally, a locally implemented portion of the data flow management engine 404 can obtain data packets transmitted from IoT devices and transmit the data packets to a remotely implemented portion of the data flow management engine 404 through VPN tunneling. Data packets transmitted from a locally implemented portion of the data flow management engine 404 to a remotely implemented portion of the data flow management engine 404 can be analyzed at the remote location, e.g. in the cloud, for use in assessing IoT device risk levels.

In a specific implementation, a remotely implemented portion of the data flow management engine 404 functions to obtain data packets destined to IoT devices and transmit the data packets to a locally implemented portion of the data flow management engine 404, for use in assessing risk levels of IoT devices. A remotely implemented portion of the data flow management engine 404 can obtain data packets destined to IoT devices and transmit the data packets to a locally implemented portion of the data flow management engine 404 through VPN tunneling. Additionally, data packets transmitted from a remotely implemented portion of the data flow management engine 404 to a locally implemented portion of the data flow management engine 404 can be analyzed at either or both a remote location or a local location, for use in assessing risk levels of IoT devices.

In the example of FIG. 4, the packet inspector engine 406 is intended to represent an engine that functions according to an applicable engine for sniffing packets sent to and from IoT devices for purposes of assessing risk levels of the IoT devices, such as the packet inspector engines described in this paper. For example, the packet inspector engine 406 can sniff packets to determine events occurring at IoT devices which can subsequently be used to determine a risk level of an IoT device. In analyzing data packets, the packet inspector engine 406 can perform deep packet inspection on packets sent to and from IoT devices. In performing deep packet inspection on packets sent to and from IoT devices, the packet inspector engine 406 can determine transaction data of data packets. Transaction data determined by the packet inspector engine 406 can be used to build, at least in part, historical records for IoT devices. Historical records for IoT devices can be formed from an applicable combination of event logs, system logs, and access logs for IoT devices and used in assessing risk levels of IoT devices.

In a specific implementation, the packet inspector engine 406 functions to identify either or both destinations and sources of analyzed data packets. For example, the packet inspector engine 406 can determine an identification of a destination IoT device by analyzing a data packet destined for the IoT device. In another example, the packet inspector engine 406 can determine a source of a data packet destined to an IoT device. Identifications of either or both destinations and sources of analyzed data packets can be used, along with transaction data determined from the analyzed data packets, to generate historical records for IoT devices.

The packet inspector engine 406 can select data packets to perform deep packet inspection on based on at least one of a source of data packets, a destination of data packets, a data packet type of data packets, and data within data packets. For example, all data packets from a particular source can have deep packet inspection performed on them.

In the example of FIG. 4, the event log management engine 408 is intended to represent an engine that functions to maintain an event log for IoT devices for use in assessing risk levels of IoT devices. In managing an event log, the event log management engine 408 can create and update an event log to indicate events occurring at an IoT device, times events occurred at the IoT device, and destinations and sources of data traffic related to events at an IoT device. An event log can be used to form part of a historical record of IoT devices. In various implementations, an event log can be used to generate a historical record specific to an IoT device, for use in determining normal operating behavior, e.g. regular IoT device behavior, of an IoT device. For example, an event log can be used to establish that an IoT device usually performs a specific function at a set time of day which can subsequently be used to assess a risk level of the IoT device.

In a specific implementation, the event log management engine 408 functions to maintain an event log for an IoT device based on analysis of data packets transmitted to and from the IoT device. In maintaining an event log based on analysis of data packets, the event log management engine 408 can maintain an event log based on deep packet inspection of packets transmitted to and from an IoT device. For example, the event log management engine 408 can use transaction data identified through deep packet inspection of data packets to determine what events are occurring at an IoT device, e.g. through types of data transmitted from an IoT device. Further in the example, the event log management engine 408 can update an event log to indicate what events are occurring at an IoT device and times the events are occurring at the IoT device.

In the example of FIG. 4, the event log datastore 410 is intended to represent a datastore that functions to store event log data indicating event logs for use in assessing IoT device risk levels. Event log data stored in the event log datastore 410 can be maintained using packet analysis of data packets transmitted to and from IoT devices. Additionally, event log data stored in the event log datastore 410 can be maintained using transaction data identified through deep packet inspection of data packets transmitted to and from the IoT devices. For example, event log data can be generated based on a determination of events occurring at an IoT device using transaction data identified through deep packet inspection of data packets transferred to and from the IoT device as part of occurrences of the events.

In an example of operation of the system shown in the example of FIG. 4, the data flow management engine 404 obtains data packets destined to or sent from an IoT device. In the example of operation of the example system shown in FIG. 4, the packet inspector engine 406 uses deep packet inspection to identify transaction data from the obtained data packets. Further, in the example of operation of the example system shown in FIG. 4, the event log management engine 408 determines events occurring at the IoT device from the transaction data and subsequently maintains an event log, stored as event log data in the event log datastore 410, indicating the events occurring at the IoT device and when the events occurred at the IoT device. In the example of operation of the example system shown in FIG. 4, the event log, stored as the event log data in the event log datastore 410 is used in assessing IoT device risk levels.

Figure 5:
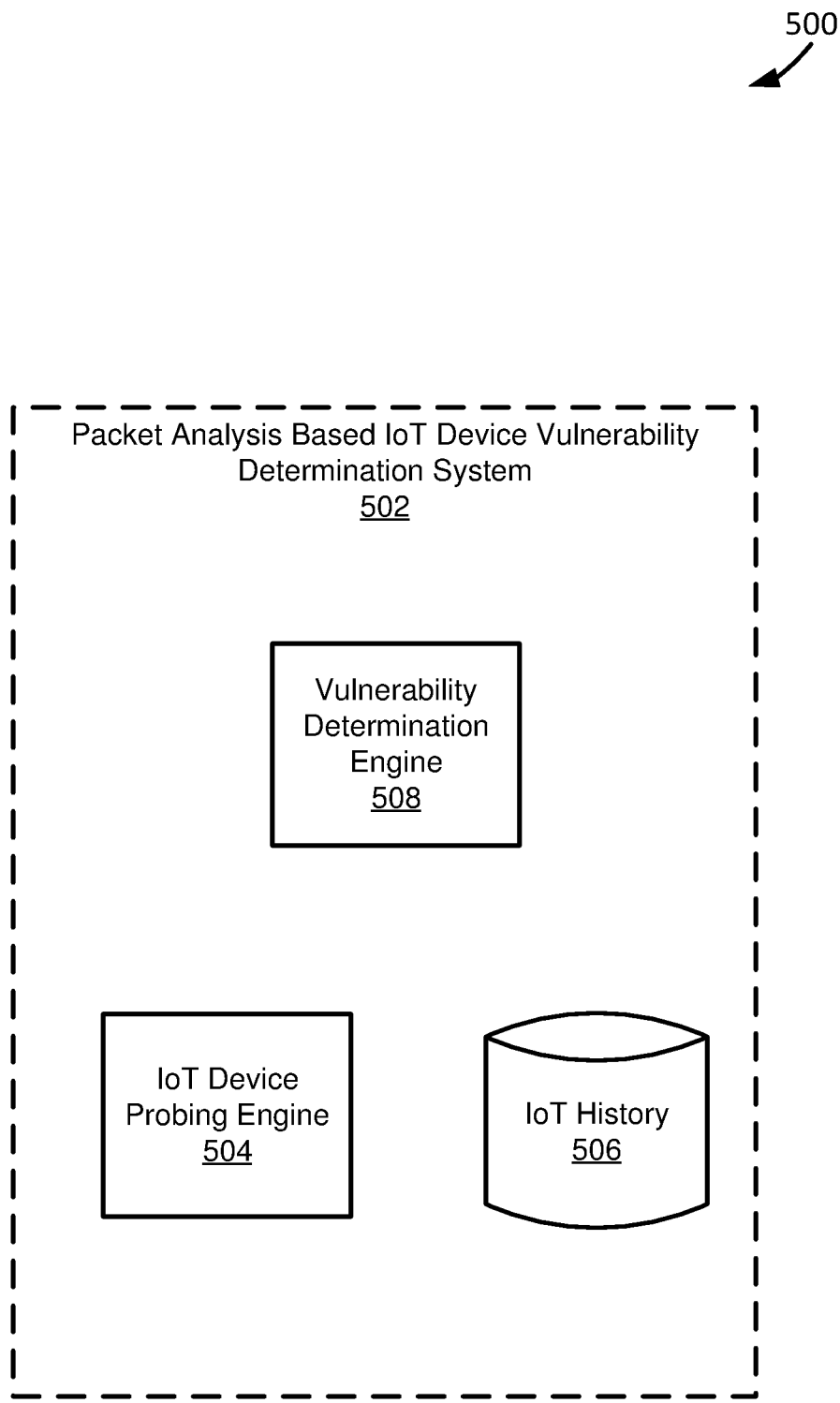
FIG. 5 depicts a diagram of an example of a packet analysis based IoT device vulnerability determination system.

FIG. 5 depicts a diagram 500 of an example of a packet analysis based IoT device vulnerability determination system 502. The packet analysis based IoT device vulnerability determination system 502 is intended to represent a system that functions to determine vulnerability of IoT devices based, at least in part, on packet inspection. The packet analysis based IoT device vulnerability determination system 502 can be implemented as part of an applicable system for assessing risk levels of IoT devices, such as the IoT device risk assessment systems described in this paper. Vulnerabilities of IoT devices determined by the packet analysis based IoT device vulnerability determination system 502 can be used in assessing risk levels of IoT devices. For example, if the packet analysis based IoT device vulnerability determination system 502 determines that an IoT device is vulnerable to a specific attack, then a risk level can be assessed to the IoT device based on the determined vulnerability of the IoT device to the specific attack.

In a specific implementation, the packet analysis based IoT device vulnerability determination system 502 functions to be implemented, at least in part, at a location local with respect to IoT devices for which the packet analysis based IoT device vulnerability determination system 502 determines vulnerabilities. For example, the packet based analysis IoT device vulnerability determination system 502 can be implemented, at least in part, at a local appliance coupled to IoT devices.

In a specific implementation, the packet analysis based IoT device vulnerability determination system 502 functions to determine device vulnerabilities at a remote location with respect to IoT devices. For example, the packet based IoT device vulnerability determination system can be implemented at a remote location from IoT devices, e.g. the cloud, and subsequently perform vulnerability analysis at the remote location.

The packet analysis based IoT device vulnerability determination system 502 shown in the example of FIG. 5 includes an IoT device probing engine 504, an IoT device history datastore 506, and a vulnerability determination engine 508. The IoT device probing engine 504 functions to probe an IoT device for purposes of determining vulnerability of the IoT device. Results of probing of an IoT device by the IoT device probing engine 504 can be used to determine a risk level of the IoT device. The IoT device probing engine 504 can probe an IoT device by sending data packets to the IoT device. For example, the IoT device probing engine 504 can send a packet for gaining access to an IoT device to see if either or both a user id and a password for accessing the IoT device has changed. Further in the example, if the IoT device probing engine 504 fails to gain access to an IoT device with either or both a user id and password that is associated with accessing the IoT device, then it can be determined either or both the user id and password for accessing the IoT device has changed. In another example, the IoT device probing engine 504 can send a packet for gaining access to an IoT device using either or both a default user id and password. Further in the example, if the IoT device probing engine 504 can gain access to the IoT device using either or both the default user id and password, it can be determined the IoT device is vulnerable to attacks and hacks. In various implementations, packets communicated between the IoT device probing engine 504 and an IoT device can be used to update event logs, system logs, and access logs, and subsequently IoT device historic data for the IoT device in real-time, for purposes of assessing a risk level of the IoT device.

In a specific implementation, the IoT device probing engine 504 functions to monitor ports of an IoT device to determine device vulnerability for purposes of assessing a risk level of the IoT device. The IoT device probing engine 504 can send packets to an IoT device and observe ports used by the IoT device to receive and transmit data in response to the packets to determine vulnerability of the IoT device. For example, the IoT device probing engine 504 can communicate with an IoT device over an incorrect or less secure port, signifying that the IoT device is vulnerable to attack. Additionally, the IoT device probing engine 504 can probe an IoT device to determine a number of active or inactive ports at the IoT device.

In a specific implementation, the IoT device probing engine 504 functions to communicate with an IoT device in simulating an attack on the IoT device for purposes of assessing a risk level of the IoT device. Manners in which an IoT device responds to a simulation of an attack can be used to determine a vulnerability of the IoT device. For example, if the IoT device probing engine 504 simulates a ping flood, and the IoT device continues to respond to the ping flood, it can be determined that the IoT device is vulnerable to attacks. Vulnerabilities determined based on the IoT device probing engine 504 simulating an attack on an IoT device can be used to assess a risk to an IoT device.

In a specific implementation, the IoT device probing engine 504 functions to actively monitor an IoT device for purposes of assessing a risk level of the IoT device. In actively monitoring an IoT device for purposes of assessing a risk level of the IoT device, the IoT device probing engine 504 functions to send packets to an IoT device to force the IoT device to respond. Traffic sent from an IoT device in response to forcing by the IoT device probing engine 504 can be studied to determine vulnerability of the IoT device. For example, if an IoT device responds with information relating to accessing the IoT device, as determined by an applicable method, such as deep packet inspection, then it can be determined that the IoT device is vulnerable.

In the example of FIG. 5, the IoT device history datastore 506 is intended to represent a datastore that functions to store IoT history data indicating historical records of IoT device operation, for use in assessing IoT device risk levels. IoT history data can be updated in real-time to include event logs, system logs, and access logs. For example, IoT history data stored in the IoT device history datastore 506 can include event logs for an IoT device that are updated in real-time as the IoT device continues to operate. Additionally, IoT history data stored in the IoT device history datastore 506 can be generated using packet analysis. For example, IoT history data stored in the IoT device history datastore 506 can be generated through analysis of headers of data packets sent to and from IoT devices. In another example, IoT history data stored in the IoT device history datastore 506 can be generated from transaction data identified through deep packet inspection of data packets sent to and from IoT devices. IoT history data stored in the IoT device history datastore 506 can also indicate determined vulnerabilities of IoT devices.

In the example of FIG. 5, the vulnerability determination engine 508 is intended to represent an engine that functions to determine vulnerabilities of IoT devices for use in assessing risk levels of the IoT devices. The vulnerability determination engine 508 determines a vulnerability of IoT devices based on analysis of data packets transmitted to and from IoT devices for use in assessing risk levels of the IoT devices. For example, if an IoT device is transmitting data packets including access credentials for accessing the IoT device, then the vulnerability determination engine 508 can determine the IoT device is vulnerable. Additionally, the vulnerability determination engine 508 can assign a vulnerability score to an IoT device indicating a vulnerability level of the IoT device for use assessing a risk level of the IoT device. The vulnerability determination engine 508 can assign a vulnerability score to an IoT device based on how well an IoT device performs according to vulnerability factors. Vulnerability factors include applicable operational factors for determining how vulnerable an IoT device actually is, e.g. how a device performs in response to an attack, or whether a device is transmitting sensitive data. For example, if an IoT device performs well against a simulated attack but is still transmitting sensitive data, then the vulnerability determination engine 508 can assign the IoT device a vulnerability score of fifty, which can subsequently be used to assess a risk level to the IoT device.

In a specific implementation, the vulnerability determination engine 508 functions to determine a vulnerability of an IoT device for purposes of assessing a risk level of the IoT device based on a response by the IoT device to a simulated attack. In determining a vulnerability of an IoT device based on a response to a simulated attack, the vulnerability determination engine 508 can determine a vulnerability of an IoT device based on a response to the simulated attack by analyzing either or both data packets sent from the IoT device and traffic flow patterns from the IoT device in response to the attack. For example, if an IoT device is subjected to a simulated ping flood attack, the vulnerability determination engine 508 can determine that the IoT device is failing to handle the attack if the IoT device is continually responding to the ping flood attack.

In a specific implementation, the vulnerability determination engine 508 functions to determine a vulnerability of an IoT device for purposes of assessing a risk level of the IoT device by analyzing data traffic forced from the IoT device. Forced traffic analyzed by the vulnerability determination engine 508 can be forced from an IoT device by sending an active packet to the IoT device, thereby forcing the IoT device to respond. The vulnerability determination engine 508 can analyze headers of forced data packets transmitted by an IoT device to determine vulnerability of the IoT device for use in assessing a risk level of the IoT device. Additionally, the vulnerability determination engine 508 can use deep packet inspection to analyze forced data packets transmitted by an IoT device to determine vulnerability of the IoT device for use in assessing a risk level of the IoT device. For example, the vulnerability determination engine 508 can use deep packet inspection to identify transaction data from forced data packets transmitted by an IoT device, and identify events from the transaction data to determine vulnerability of the IoT device for use in assessing a risk level for the IoT device.

In a specific implementation, the vulnerability determination engine 508 functions to determine a vulnerability of an IoT device for use in assessing a risk level for the IoT device based on historical records of IoT devices. Historical records used by the vulnerability determination engine 508 can be updated in real-time to reflect the real-time operation of IoT devices. The vulnerability determination engine 508 can determine vulnerability of an IoT device based on an identification of IoT devices being targeted, as indicated by historical records. For example, the vulnerability determination engine 508 can determine an IoT device is vulnerable if it is a subject of a random scan, as indicated by historical records. Further in the example, whether the IoT device is the subject of a random scan can be determined by the vulnerability determination engine 508 using event logs of IoT devices, as indicated by historical record of the IoT devices.

In a specific implementation, the vulnerability determination engine 508 functions to determine vulnerability of an IoT device for use in assessing a risk level for the IoT device based on determined access credentials of the IoT device. Access credentials of an IoT device can be determined by probing the IoT device with data packets. For example, it can be determined if an IoT device is using default access credentials, e.g. a default user id and password, for providing access to the IoT device by sending data packets utilizing the default access credentials to the IoT device to gain access. Further, the vulnerability determination engine 508 can determine that an IoT device is vulnerable for purposes of assessing a risk level of the IoT device if it determines the IoT device is granting access through default access credentials.

In an example of operation of the system shown in the example of FIG. 5, the IoT device probing engine 504 probes an IoT device by sending data packets to the IoT device. In the example of operation the vulnerability determination engine 508 determines a vulnerability of the IoT device based on a response of the IoT device to the probing by the IoT device probing engine 504. Further, in the example of operation of the example system shown in FIG. 5, the IoT device history datastore 506 stores IoT history data indicating historical records of a plurality of IoT devices including the IoT device. In the example of operation of the example system shown in FIG. 5, the vulnerability determination engine 508 determines vulnerability of the IoT device based on the historical records indicated by IoT history data stored in the IoT device history datastore 506. In the example of operation of the example system shown in FIG. 5, the vulnerability of the IoT device determined by the vulnerability determination engine is used to assess a risk level of the IoT device.

Figure 6:
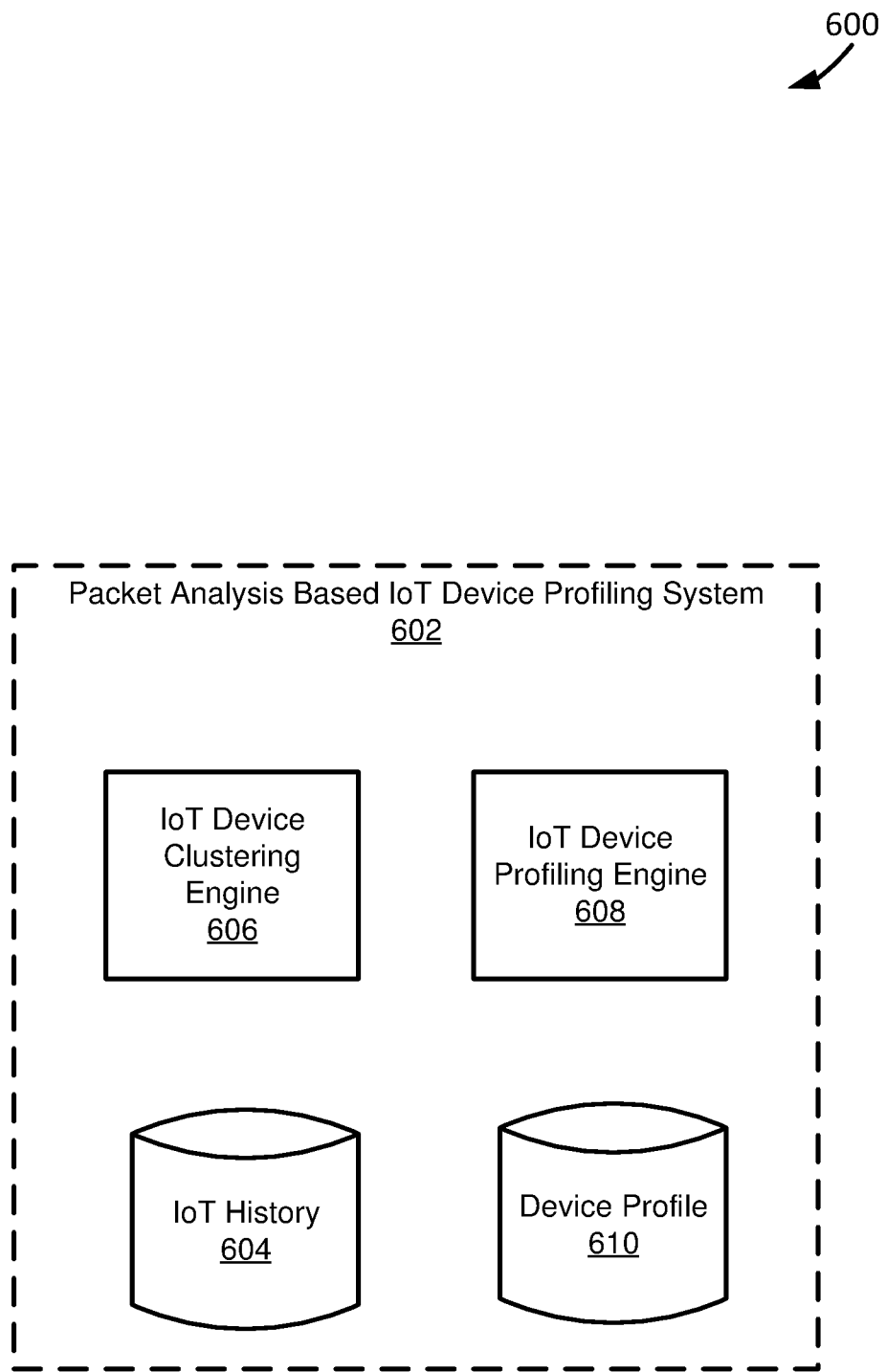
FIG. 6 depicts a diagram of an example of a packet analysis based IoT device profiling system.

FIG. 6 depicts a diagram 600 of an example of a packet analysis based IoT device profiling system 602. The packet analysis based IoT device profiling system 602 is intended to represent a system that functions to profile IoT devices based, at least in part, on packet inspection. Device profiles generated by the packet analysis based IoT device profiling system 602 can be used in assessing IoT device risk levels. The packet analysis based IoT device profiling system 602 can be implemented as part of an applicable system for assessing risk levels of IoT devices, such as the IoT device risk assessment systems described in this paper. Device profiles created by the packet analysis based IoT device profiling system 602 can be used in assessing risk levels of IoT devices. Device profiles of IoT devices created by the packet analysis based IoT device profiling system 602 can be used to assess risk levels of IoT devices by an outside/third party IoT management entity.

In a specific implementation, the packet analysis based IoT device profiling system 602 functions to be implemented, at least in part, at a location local with respect to IoT devices. The packet analysis based IoT device profiling system 602 can be implemented, at least in part, at a local location with respect to IoT devices profiled by the packet analysis based IoT device profiling system 602. For example, the packet analysis based IoT device profiling system 602 can be implemented, at least in part, at a local appliance coupled to IoT devices. Alternatively, in another implementation, the packet analysis based IoT device profiling system 602 can profile devices at a remote location with respect to IoT devices, e.g. the cloud.

The packet analysis based IoT device profiling system 602 shown in the example of FIG. 6 includes an IoT history datastore 604, an IoT device clustering engine 606, an IoT device profiling engine 608, and a device profile datastore 610. The IoT history datastore 604 is intended to represent a datastore that functions to store IoT history data, such as the IoT history datastores described in this paper. IoT history data stored in the IoT history datastore 604 can be updated in real-time to include event logs, system logs, and access logs. For example, IoT history data stored in the IoT history datastore 604 can include event logs for an IoT device that are updated in real-time as the IoT device continues to operate. In various implementations, IoT history data stored in the IoT history datastore 604 can be generated using packet analysis. For example, IoT history data stored in the IoT history datastore 604 can be generated through packet analysis, e.g. analyzing headers of data packets sent to and from IoT devices. Additionally, IoT history data stored in the IoT history datastore 604 can be generated through deep packet inspection of data packets sent to and from IoT devices. For example, IoT history data stored in the IoT history datastore 604 can be generated from transaction data identified through deep packet inspection of data packets sent to and from IoT devices. IoT history data stored in the IoT history datastore 604 can be used in assessing risk levels of IoT devices.

In the example of FIG. 6, the IoT device clustering engine 606 is intended to represent an engine that functions to cluster IoT devices for purposes of profiling the IoT devices for use in assessing risk levels of IoT devices. In clustering IoT devices, the IoT device clustering engine 606 can aid a profiling mechanism in creating a detailed profile for IoT devices. The IoT device clustering engine 606 can cluster IoT devices based on clustering factors. Clustering factors include applicable factors related to characteristics of IoT devices and characteristics of operation of IoT devices for use in grouping IoT devices. Example clustering factors include device types, attributes of IoT devices, functionalities of IoT device, operating systems and applications executing at or capable of being executed at IoT devices, entities associated with IoT devices, users who interact with IoT devices, and hosts and devices with which the IoT devices communicate. For example, the IoT device clustering engine 606 can cluster IoT devices accessing network services through a home LAN into a single cluster.

In a specific implementation, the IoT device clustering engine 606 functions to receive new clustering factors and subsequently cluster the devices according to the new clustering factors for use in assessing risk levels of IoT devices. For example, the IoT device clustering engine 606 can receive information indicating either or both a new IoT device and IoT device type and subsequently cluster IoT devices according to either or both the new IoT device and IoT device type. In clustering IoT devices according to new clustering factors, the IoT device clustering engine 606 can provide an interface through which an applicable entity, e.g. an administrator, can manually input the new clustering factors.

In the example of FIG. 6, the IoT device profiling engine 608 is intended to represent an engine that functions to generate device profiles for IoT devices for use in assessing risk levels of IoT devices. The IoT device profiling engine 608 can create profiles for a specific IoT device or for a cluster of IoT devices. For example, the IoT device profiling engine 608 can create a profile for a single IoT device accessing services through a specific LAN and for a plurality of IoT devices accessing network services through the LAN. A device profile generated by the IoT device profiling engine 608 can include a device map. A device map includes a map showing systems and devices with which an IoT device communicates. For example, a device map can include other IoT devices with which an IoT device communicates. In another example, a device map can include hosts an IoT device is communicating with through the Internet. Additionally, the IoT device profiling engine 608 can generate profiles for IoT devices that are specific to a time of year. For example, the IoT device profiling engine 608 can model profiles of a thermostat for summer and winter months based on changing operation of the thermostat during summer and winter months. The IoT device profiling engine 608 can use machine learning to improve its models used in profiling devices over time as it continues to profile IoT device.

In a specific implementation, the IoT device profiling engine 608 functions to generate device profiles for IoT devices that include instances of the IoT devices for use in assessing risk levels of IoT devices. For example, if at a specific time an IoT device is communicating externally with a remote host as part of an inbound communication session, then the IoT device profiling engine 608 can create an instance for the IoT device, included as part of a device profile, to indicate the IoT device was communicating externally with the remote host as part of the inbound communication session at the specific time. In another example, if at a specific time an IoT device is utilizing a specific number of ports in accessing network services, then the IoT device profiling engine 608 can create an instance for the IoT device, included as part of a device profile, to indicate the IoT device was utilizing the specific number of ports at the specific time to access network services.

In a specific implementation, the IoT device profiling engine 608 functions to generate IoT device profiles based, at least in part, on IoT historical records for use in assessing risk levels of IoT devices. In generating device profiles based on IoT historical records, the IoT device profiling engine 608 can generate an IoT device profile based, at least in part, on an event log included as part of IoT historical records. For example, the IoT device profiling engine 608 can generate an IoT device profile, using an event log, to indicate how an IoT device operates. Additionally, in generating device profiles based on IoT historical records, the IoT device profiling engine 608 can generate an IoT device profile based, at least in part, on an access log included as part of IoT historical records. For example, the IoT device profiling engine 608 can generate an IoT device profile, using an access log, to indicate how a specific user interacts with an IoT device as part of operation of the IoT device. Further, in generating device profiles based on IoT historical records, the IoT device profiling engine 608 can generate an IoT device profile based, at least in part, on a system log included as part of IoT historical records. For example, the IoT device profiling engine 608 can generate an IoT device profile, using a system log, to indicate an identification of an IoT device and applications executing at the IoT device.

In a specific implementation, the IoT device profiling engine 608 can generate IoT device profiles based, at least in part, on determined vulnerabilities of IoT devices for use in assessing risk levels of IoT devices. The IoT device profiling engine 608 can generate IoT device profiles based, at least in part, on vulnerabilities of IoT devices determined by an applicable system for determining IoT device vulnerabilities, such as the packet analysis based IoT device vulnerability determination systems described in this paper. In generating device profiles based on determined vulnerabilities of IoT devices, the IoT device profiling engine 608 can generate IoT device profiles based on vulnerabilities determined from active probing of IoT devices. For example, if an IoT device performs poorly in response to a simulated attack, then the IoT device profiling engine 608 can generate a device profile for the IoT device indicating that the IoT device is vulnerable to the attack. Additionally, the IoT device profiling engine 608 can generate IoT device profiles based on determined vulnerabilities of IoT devices using historical records of the IoT devices. For example, if historical records, e.g. event logs, indicate that an IoT device is the subject of a random scanning by a user, then the IoT device profiling engine 608 can generate an IoT device profile for the IoT device indicating that it has been the subject of random scanning, and thus vulnerable.

In a specific implementation, the IoT device profiling engine 608 can model regular IoT device behaviors, as included as part of device profiles of the IoT devices, for use in assessing risk levels of IoT devices. The IoT device profiling engine 608 can model regular IoT device behavior of IoT devices based on historical records of IoT devices. An example of the IoT device profiling engine 608 modeling regular IoT device behavior is if a thermostat raises the temperature at five in the evening every day, as indicated by an events log for the thermostat, then the IoT device profiling engine 608 can model regular IoT device behavior of the IoT device to indicate raising of the temperature at five in the evening every day. The IoT device profiling engine 608 can model regular IoT device behavior of an IoT device specific to a user. For example, if a user interacts with a device in a similar fashion repeatedly, then the IoT device profiling engine 608 can model a regular IoT device behavior specific to the user to indicate the repeated interactions between the user and the IoT device.

In a specific implementation, the IoT device profiling engine 608 functions to provide device profiles to an interface for presentation. The IoT device profiling engine 608 can provide the device profiles to an interface in a format that is readable to a human. For example, the IoT device profiling engine 608 can provide device maps illustrating hosts and devices an IoT device interacts with in a format a human is capable of reading or otherwise perceiving.

In a specific implementation, the IoT device profiling engine 608 functions to map an IoT device to a new device profile or otherwise create a new device profile for an IoT device. The IoT device profiling engine 608 can match an IoT device to a new device profile or otherwise create a new device profile for the IoT device based on deviations from regular device behavior in operation of the IoT device. For example, if an IoT device continues to deviate further away from regular device behavior, then the IoT device profiling engine can map the IoT device to a new device profile or otherwise create a new device profile for the IoT device.

In a specific implementation, the IoT device profiling engine 608 can match an IoT device to a new device profile or otherwise create a new device profile for the IoT device based on instances of the IoT device. In matching an IoT device to a new device profile based on instances of the IoT device, the IoT device profiling engine 608 can determine whether to actually match the IoT device to a new device profile using the instances of the IoT device. For example, if instances of an IoT device indicate the IoT device is continuing to deviate from regular IoT device behavior of the IoT device, then the IoT device profiling engine 608 can determine to match the IoT device to a new device profile or create a new device profile for the IoT device. Additionally, in matching an IoT device to a new device profile based on instances of the IoT device, the IoT device profiling engine 608 can determine a new device profile to match to the IoT device or otherwise create for the new IoT device. For example, if an instance of an IoT device indicates an IoT device is of a specific type, then the IoT device profiling engine 608 can match the IoT device to an IoT device profile of an IoT device of the same type. In another example, the IoT device profiling engine 608 can generate a new IoT device profile for an IoT device based on characteristics of the IoT device, as indicated by instances, before the IoT device began to deviate from regular IoT device behavior.

In the example of FIG. 6, the device profile datastore 610 is intended to represent a datastore that functions to store device profile data indicating device profiles of IoT devices for use in assessing risk levels of IoT devices. Device profiles indicated by device profile data stored in the device profile datastore 610 can be generated from historical records of IoT devices. Device profile data stored in the device profile datastore 610 can include device profiles indicating one or an applicable combination of instances of IoT devices, vulnerabilities of IoT devices, device maps of IoT devices, and regular IoT device behaviors.

In an example of operation of the system shown in the example of FIG. 6, the IoT history datastore 604 stores IoT history data indicating historical records of IoT devices. In the example of operation of the example system shown in FIG. 6, the IoT device clustering engine 606 clusters IoT devices into clusters based on the historical records of the IoT devices indicated by IoT history data stored in the IoT history datastore 604. Further, in the example of operation of the example system shown in FIG. 6, the IoT device profiling engine 608 profiles the IoT devices according to the clusters into device profiles using the historical records of the IoT devices indicated by IoT history data stored in the IoT history datastore 604. In the example of operation of the example system shown in FIG. 6, the device profile datastore stores device profile data indicating device profiles determined by the IoT device profiling engine 608. Additionally, in the example of operation of the example system shown in FIG. 6, device profiles indicated by device profile data stored in the device profile datastore 610 are used in assessing risk levels of IoT devices.

Figure 7:
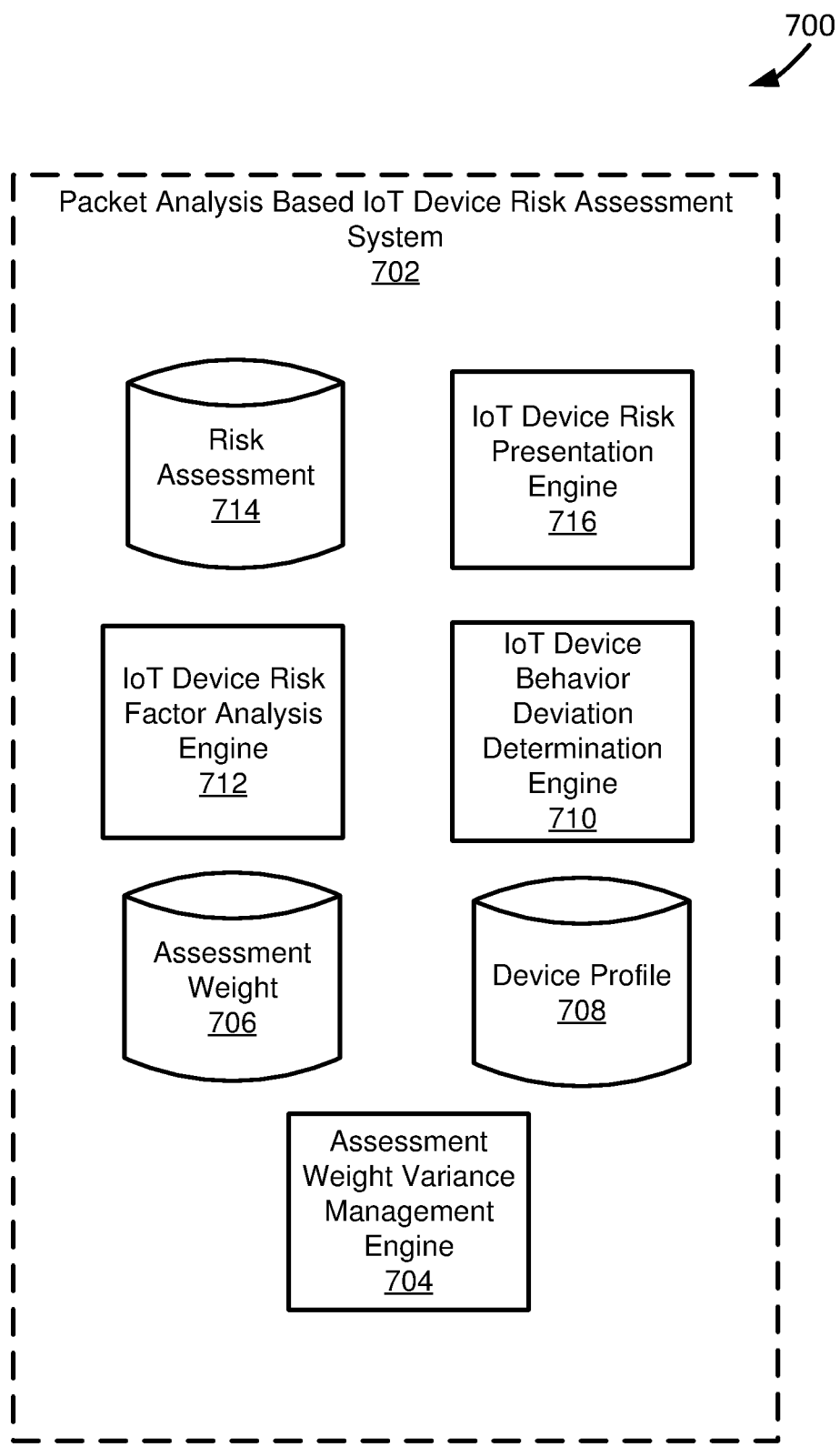
FIG. 7 depicts a diagram of a packet analysis based IoT device risk assessment system.

FIG. 7 depicts a diagram 700 of an example of a packet analysis based IoT device risk assessment system 702. The packet analysis based IoT device risk assessment system 702 can be implemented as part of an applicable system for assessing risk levels of IoT devices, such as the IoT device risk assessment systems described in this paper. The packet analysis based IoT device risk assessment system 702 is intended to represent a system that functions to assess risk levels of IoT devices. The packet analysis based IoT device risk assessment system 702 can determine risk levels of IoT devices based on characteristics of IoT devices, as indicated by IoT device profiles. Specifically, the packet analysis based IoT device risk assessment system 702 can determine risk levels of IoT devices based on characteristics of an IoT device itself and characteristics of an IoT device in operation. For example, the Packet analysis based IoT device risk assessment system 702 can determine a risk level of an IoT device based on a device type of the IoT device. In another example, the packet analysis based IoT device risk assessment system 702 can determine a risk level of an IoT device based on characteristics of the IoT device in accessing network services, as indicated through inspection of data packets transmitted to and from the IoT device as part of the IoT device accessing network services.

In a specific implementation, the packet analysis based IoT device risk assessment system 702 functions to analyze risk factors of IoT devices using device profiles to assess risk levels of IoT devices. In analyzing risk factors of IoT devices to using device profiles to assess risk levels of IoT devices, the packet analysis based IoT device risk assessment system 702 can apply assessment weights IoT device risk factors of IoT devices, as indicated by corresponding device profiles. For example, if an IoT device is of a specific type and is communicating using a specific number of ports, then the packet analysis based IoT device risk assessment system 702 can apply assessment weights to the factors indicating the IoT device is of a specific type and is communicating using a specific number of ports to determine a risk level of the IoT device. In another example, if an IoT device is communicating externally with a remote host through an inbound communication session, then the packet analysis based IoT device risk assessment system 702, can apply assessment weights to the factors that the device is communicating externally with a remote host through an inbound communication session to determine a risk level of the IoT device.

The example packet analysis based IoT device risk assessment system 702 shown in the example of FIG. 7 includes an assessment weight variance management engine 704, an assessment weight datastore 706, a device profile datastore 708, an IoT device behavior deviation determination engine 710, an IoT device risk factor analysis engine 712, a risk assessment datastore 714, and an IoT device risk presentation engine 716. The assessment weight variance management engine 704 is intended to represent an engine that functions to manage assessment weights for application to IoT device risk factors in assessing IoT device risk levels. In managing assessment weights, the assessment weight variance management engine 704 can assign specific assessment weights to specific risk factors. For example, the assessment weight variance management engine 704 can assign an assessment weight of 10% to IoT device risk factors related to protocols used by an IoT device in accessing network services. The assessment weight variance management engine 704 can assign specific assessment weights to specific risk factors at varying levels of granularity. Specifically, the assessment weight variance management engine 704 can assign specific assessment weights to specific risk factors on one or an applicable combination of a per-device basis, a per-device type basis, a per-network basis, or other applicable per-IoT device characteristic basis. For example, the assessment weight variance management engine 704 can assign the same specific assessment weights to specific risk factors for a single IoT device or for all IoT devices of the same type. In another example, the assessment weight variance management engine 704 can assign the same specific assessment weights to IoT devices accessing network services through a specific LAN.

In a specific implementation, the assessment weight variance management engine 704 functions to assign specific assessment weights to IoT device risk factors based on characteristics of a network. In assigning specific assessment weights to IoT device risk factors based on characteristics of a network, assessment weights assigned to specific risk factors can vary between IoT devices. Specifically, assessment weights assigned to specific risk factors by the assessment weight variance management engine 704 can vary between IoT device, IoT devices of different types, IoT devices accessing network services through different networks, and IoT devices distinguished from each other based on an applicable IoT device characteristic, e.g. a characteristic of the IoT device itself or a characteristics of the IoT device in operation. For example, an IoT device communicating externally with a remote host can have a different assessment weight assigned to risk related to network communication characteristics than another IoT device communicating internally with a local IoT device through a LAN.

In a specific implementation, the assessment weight variance management engine 704 functions to set assessment weights based on characteristics of a user associated with IoT devices or input from a user associated with IoT devices. In adjusting assessment weights based on input of a user, the assessment weight variance management engine 704 can set assessment weights according to the input received from the user. For example, a user can specify setting adjustment weights for IoT device risk factors related to network activeness to 50%, and the assessment weight variance management engine 704 can subsequently set adjustment weights applied to IoT device risk factors related to network activeness at 50%. Further, in adjusting assessment weights based on characteristics of a user, the assessment weight variance management engine 704 can set adjustment weights based on tolerances of a user; such tolerances of the user can be intentional or unintentional.

In the example of FIG. 7, the assessment weight datastore 706 is intended to represent a datastore that functions to store assessment weight data. Assessment weight data stored in the assessment weight datastore 706 includes applicable data used in applying assessment weights to IoT device risk factors of IoT devices for assessing risk levels of the IoT devices. Example assessment weight data stored in the assessment weight datastore 706 can indicate specific assessment weights to apply to specific risk factors of specific IoT devices. For example, assessment weight data stored in the assessment weight datastore 706 can indicate applying an assessment weight of 20% to IoT device risk factors related to network communication characteristics of IoT devices accessing network services through a specific LAN. In another example, assessment weight data stored in the assessment weight datastore 706 can indicate applying an assessment weight of 50% to IoT device risk factors related to operation performance deviations of IoT devices of a specific type.

In the example of FIG. 7, the device profile datastore 708 is intended to represent a datastore that functions to store data associated with device profiles. Device profile data stored in the device profile datastore 708 can be used to assess risk levels of IoT devices. For example, device profiles represented by device profile data stored in the device profile datastore 708 can include or otherwise be used to extract specific risk factors of IoT devices to which assessment weights can be applied for determining risk levels of IoT devices.

In the example of FIG. 7, the IoT device behavior deviation determination engine 710 is intended to represent an engine that functions to determine operational performance deviations of an IoT device with respect to regular IoT device behaviors. In determining operational performance deviations of an IoT device, the IoT device behavior deviation determination engine 710 can determine if an IoT device is deviating in operation with respect to a regular IoT device behaviors and how an IoT device is operating to deviate from the regular IoT device behaviors. For example, the IoT device behavior deviation determination engine 710 can determine an IoT device is actually deviating from regular IoT device behaviors if it begins communicating with a new external host. Further in the example, the IoT device behavior deviation determination engine 710 can determine how the IoT device is deviating from the regular IoT device behaviors by determining the IoT device is communicating with the new external host.

In a specific implementation, the IoT device behavior deviation determination engine 710 can determine operational performance deviations of an IoT device using device profiles. In determining operational performance deviations of an IoT device using device profiles, the IoT device behavior deviation determination engine 710 can determine the operational performance deviations of the IoT device by comparing or tracking instances of an IoT device, included as part of a device profile of the IoT device. For example, if previous instances of an IoT device indicate an IoT device was operating in a specific way, and current instances of the IoT device indicate the IoT device is continuing to operate in a different way, then the IoT device behavior deviation determination engine 710 can determine the IoT device is deviating in operation from regular IoT device behavior. Additionally, in determining operational performance deviations of an IoT device using device profiles, the IoT device behavior deviation determination engine 710 can determine the operational performance deviations based on device profiles of different devices. For example, if a device profiles of IoT devices within a LAN indicate the IoT devices are operating in a specific way, and a device profile of another IoT device within the LAN indicates the another IoT device is operating in a different way, then the IoT device behavior deviation determination engine 710 can determine the another device is deviating in operating according to regular IoT device behaviors.

In the example of FIG. 7, the IoT device risk factor analysis engine 712 is intended to represent an engine that functions to determine risk levels of IoT devices. In determining risk levels of IoT devices, the IoT device risk factor analysis engine 712 can apply assessment weights to IoT device risk factors. Further, in determining risk levels of IoT devices, the IoT device risk factor analysis engine 712 can apply assessment weights to IoT device risk factors to assess a risk score for the IoT devices and subsequently use the determined risk scores to categorize the IoT devices into different risk levels. For example the IoT device risk factor analysis engine 712 can apply an assessment weight of 20% to IoT device risk factors related to applications used by an IoT device in accessing network services to determine a risk score of 80 the IoT device. Further in the example, the IoT device risk factor analysis engine 712 can assess a risk level of high risk to the IoT device based on the determined risk score of 80.

In a specific implementation, the IoT device risk factor analysis engine 712 functions to select specific assessment weights to apply in determining risk levels of IoT devices. The IoT device risk factor analysis engine 712 can select specific assessment weights to apply using assessment weight data. For example if assessment weight data indicates to apply specific assessment weights to specific IoT device risk factors for use in determining risk levels of specific IoT devices, then the IoT device risk factor analysis engine 712 can specify the specific assessment weights for application to the specific IoT device risk factors.

In a specific implementation, the IoT device risk factor analysis engine 712 functions to extract or otherwise determine IoT device risk factors to apply assessment weights to in assessing risk levels of IoT devices. The IoT device risk factor analysis engine 712 can extract IoT device risk factors to apply assessment weights to using device profiles of IoT devices. For example, if an instance included in a device profile indicates an IoT device is communicating using four ports, then the IoT device risk factor analysis engine 712 can determine that the IoT device is communicating using four ports as part of extracting IoT device risk factors for the IoT device. Additionally, the IoT device risk factor analysis engine 712 can extract IoT device risk factors using determined operational performance deviations. For example, if operational performance deviations indicate an IoT device is greatly deviating from operating according to regular IoT device behavior, then the IoT device risk factor analysis engine 712 can determine that the IoT device is greatly deviating in operation as part of extracting IoT device risk factors related to operation performance deviation of the IoT device. As operational performance deviations can be determined from device profiles, in extracting IoT device risk factors from determined operational performance deviations, the IoT device risk factor analysis engine 712 can function to extract risk factors from device profiles when extracting risk factors from determined operational performance deviations. The IoT device risk factor analysis engine 712 can apply assessment weights to extracted IoT device risk factors for determining a risk score for the IoT device.

In the example of FIG. 7, the risk assessment datastore 714 is intended to represent a datastore that functions to store risk assessment data. Risk assessment data stored in the risk assessment datastore 714 can include one or an applicable combination of extracted IoT device risk factors of IoT devices, assessment weights used in generating risk scores of IoT devices, actual assessed risk scores of IoT devices, and actual assess risk levels of IoT devices. Risk assessment data stored in the risk assessment datastore 714 can be presented to a user associated with IoT devices for use in monitoring security in a network including IoT devices.

In the example of FIG. 7, the IoT device risk presentation engine 716 is intended to represent an engine that functions to present or otherwise facilitate presentation of risk assessment data to a user. In presenting risk assessment data to a user, the IoT device risk presentation engine 716 can determine specific risk assessment data to present to a user and subsequently present the specific risk assessment data to the user. For example, if user preferences indicate a user only wants to see assessed risk levels of their IoT devices, then the IoT device risk presentation engine 716 can only present the assessed risk levels of the IoT devices to the user. Further, in presenting risk assessment data to a user, the IoT device risk presentation engine 716, can determine when to present risk assessment data to a user. For example, the IoT device risk presentation engine 716 can determine to present risk assessment data to a user when a number of IoT devices greater than a threshold number have been assessed a high risk level.

In an example of operation of the system shown in the example of FIG. 7, the assessment weight variance management engine 704 updates assessment weight data stored in the assessment weight datastore 706 to indicate specific assessment weights to apply to specific IoT device risk factors based on a network. In the example of operation of the example system shown in FIG. 7, the device profile datastore 708 stores device profile data indicating device profiles of IoT devices. Further, in the example of operation of the example system shown in FIG. 7, the IoT device behavior deviation determination engine 710 determines operational performance deviations of the IoT devices from a regular IoT device behavior based on the device profile data stored in the device profile datastore 708.

In the example of operation of the system shown in the example of FIG. 7, the IoT device risk factor analysis engine extracts IoT device risk factors based on device profile data stored in the device profile datastore 708 and selects specific assessment weights to apply to the extracted IoT device risk factors using the assessment weight data stored in the assessment weight datastore 706. Additionally, in the example of operation of the example system shown in FIG. 7 the IoT device risk factor analysis engine 712 assess risk levels of the IoT devices by applying the specific assessment weights to the extracted IoT device risk factors. In the example of operation of the example system shown in FIG. 7, the IoT device risk factor analysis engine 712 updates risk assessment data stored in the risk assessment datastore 714 to indicate the assessed risk levels of the IoT devices. Additionally, in the example of operation of the example system shown in FIG. 7, the IoT device risk presentation engine 716 presents risk assessment data stored in the risk assessment datastore 714, including the assessed risk levels of the IoT devices to a user associated with the IoT devices.

Figure 8:
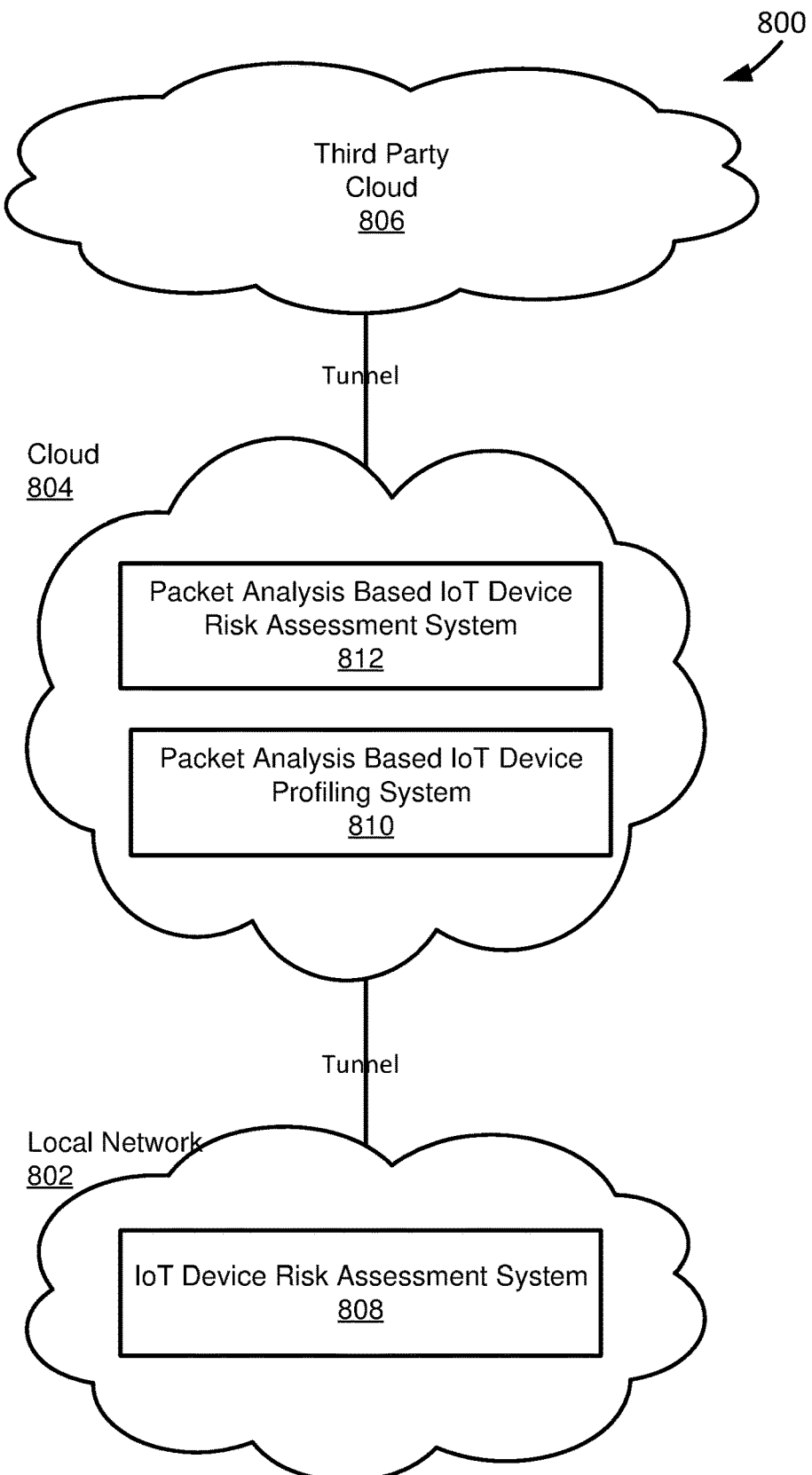
FIG. 8 depicts a diagram of an example of a system for assessing risk levels of IoT devices.

FIG. 8 depicts a diagram 800 of an example of a system for assessing risk levels of IoT devices. The system shown in the example of FIG. 8 includes a local network 802, a cloud 804, and a third party cloud 806. The local network 802 is intended to represent a network formed by at least one IoT device and a local appliance.

In the example of FIG. 8, the local network 802 includes an IoT device risk assessment system 808. The IoT device risk assessment system 808 is intended to represent a system that functions to analyze data packets for managing assessment of risk levels of IoT devices, such as the IoT device risk assessment systems described in this paper.

The IoT device risk assessment system 808 includes applicable systems for managing event logs, access logs, and system logs of IoT devices through packet analysis, such as the packet analysis based access log management systems, the packet analysis based system log management systems, and packet analysis based event log management systems described in this paper. In the example system shown in FIG. 8, the applicable systems of the IoT device risk assessment system 808 for managing event logs, access logs, and system logs of IoT devices through packet analysis are implemented at the local network 802 as part of a local appliance. In being implemented as part of a local appliance, the IoT device risk assessment system 808 can analyze packets locally for purposes of maintaining access logs, system logs, and event logs for use in assessing risk levels of IoT devices.

In the example system shown in FIG. 8, the cloud 804 includes a packet analysis based IoT device profiling system 810 and a packet analysis based IoT device risk assessment system 812. The packet analysis based IoT device profiling system 810 is intended to represent a system that functions to maintain IoT device profiles for use in assessing risk levels of IoT devices, such as the packet analysis based IoT device profiling systems described in this paper. The packet analysis based IoT device risk assessment system 812 is intended to represent a system that functions to apply assessment weights to IoT device risk factors extracted from device profiles for purposes of assessing risk levels of IoT devices, such as the packet analysis based IoT device risk assessment systems described in this paper. Additionally, the cloud 804 can include an applicable system for determining IoT device vulnerabilities, such as the packet based IoT device vulnerability determination systems described in this paper. The cloud 804 can be specific to a private entity. The packet analysis based IoT device profiling system 810 can receive one or an applicable combination of event logs, access logs, and system logs in real-time as they are updated, through VPN tunnels from the IoT device risk assessment system 808 implemented at the local network 802. The packet analysis based IoT device profiling system 810 can use one or an applicable combination of received event logs, access logs, and system logs to profile IoT device into device profiles.

In the example system shown in FIG. 8, the third party cloud 806 is intended to represent a cloud that receives device profile data indicating device profiles of IoT devices through VPN tunnels. The third party cloud 806 receives profile data indicating device profiles of IoT devices through VPN tunnels from the packet analysis based IoT device profiling system 810 implemented at the cloud 804. Additionally, the third party cloud 806 can receive risk assessment data through VPN tunnels from the packet analysis based IoT device risk assessment system 812. The third party cloud 806 can be associated with or used by a third party management system for managing IoT devices.

Figure 9:
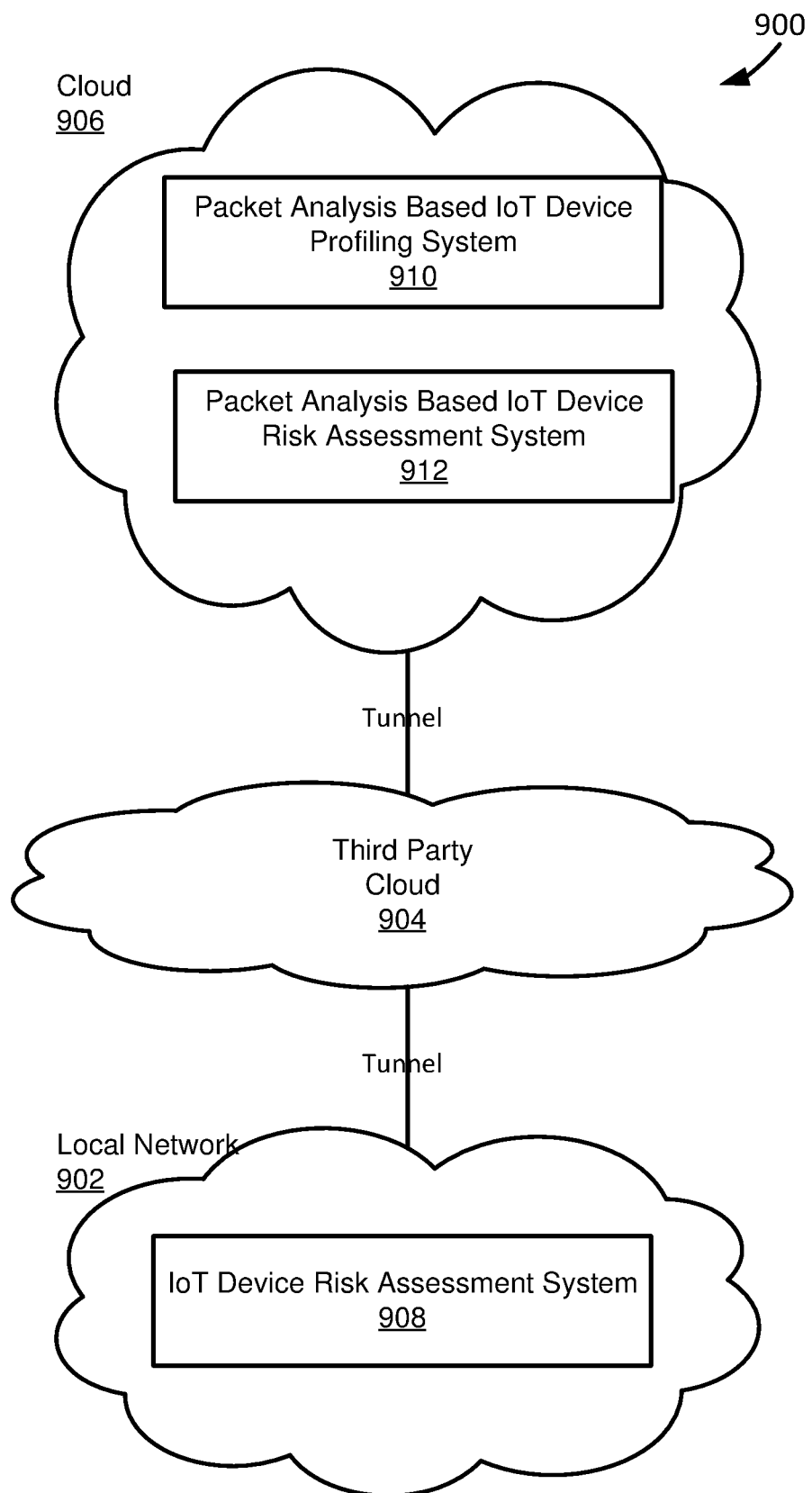
FIG. 9 depicts a diagram of another example of a system for assessing risk levels of IoT devices.

FIG. 9 depicts a diagram 900 of another example of a system for assessing risk levels of IoT devices. The system shown in the example of FIG. 9 includes a local network 902, a third party cloud 904, and a cloud 906. The local network 902 is intended to represent a network formed by at least one IoT device and a local appliance. The local network 902 includes an IoT device risk assessment system 908. The IoT device risk assessment system 908 is intended to represent a system that functions according to an applicable system for managing assessment of risk levels of IoT devices, such as the IoT device risk assessment systems described in this paper.

In a specific implementation, the IoT device risk assessment system 908 includes applicable systems for managing event logs, access logs, and system logs of IoT devices through packet analysis, such as the packet analysis based access log management systems, the packet analysis based system log management systems, and packet analysis based event log management systems described in this paper. In the example system shown in FIG. 9, the applicable systems of the IoT device risk assessment system 908 for managing event logs, access logs, and system logs of IoT devices through packet analysis are implemented at the local network 902 as part of a local appliance. In being implemented as part of a local appliance, the IoT device risk assessment system 908 can analyze packets locally for purposes of maintaining access logs, system logs, and event logs for use in assessing risk levels of IoT devices.

In the system shown in the example of FIG. 9, the third party cloud 904 receives applicable data for profiling IoT devices for use in assessing risk levels of IoT devices, such as one or an applicable combination of event logs, access logs, and system logs through VPN tunnels from the IoT device risk assessment system 908 implemented at the local network 902. The third party cloud 904 can be associated with or used by a third party management system for managing IoT devices.

In the example system shown in FIG. 9, the cloud 906 includes a packet analysis based IoT device profiling system 910 and a packet analysis based IoT device risk assessment system 912. The packet analysis based IoT device profiling system 910 is intended to represent a system that functions to maintain IoT device profiles for use in assessing risk levels of IoT devices, such as the packet analysis based IoT device profiling systems described in this paper. The packet analysis based IoT device risk assessment system 912 is intended to represent a system that functions to apply assessment weights to IoT device risk factors extracted from device profiles for purposes of assessing risk levels of IoT devices, such as the packet analysis based IoT device risk assessment systems described in this paper. Additionally, the cloud 906 can include an applicable system for determining IoT device vulnerabilities, such as the packet based IoT device vulnerability determination systems described in this paper. The packet analysis based IoT device profiling system 910 can receive one or an applicable combination of event logs, access logs, and system logs in real-time as they are updated, through VPN tunnels from the third party cloud 904, which are received at the third party cloud 904 from the IoT device risk assessment system 908 implemented at the local network 902.

In a specific implementation, the packet analysis based IoT device profiling system 910 uses one or an applicable combination of received event logs, access logs, and system logs to profile IoT device into device profiles. The packet analysis based IoT device risk assessment system 912 can use device profiles managed by the packet analysis based IoT device profiling system 910 to assess risk levels of IoT devices. The packet analysis based IoT device profiling system 910 can send generated device profiles back to the third party cloud 904 through VPN tunnels. The packet analysis based IoT device risk assessment system 912 can send generated risk assessment data back to the third party cloud 904 through VPN tunnels. The third party cloud 904 can use either or both device profiles received from the packet analysis based IoT device profiling system 910 and risk assessment data received from the packet analysis based IoT device risk assessment system 912 to manage IoT devices in the local network 902.

Figure 10:
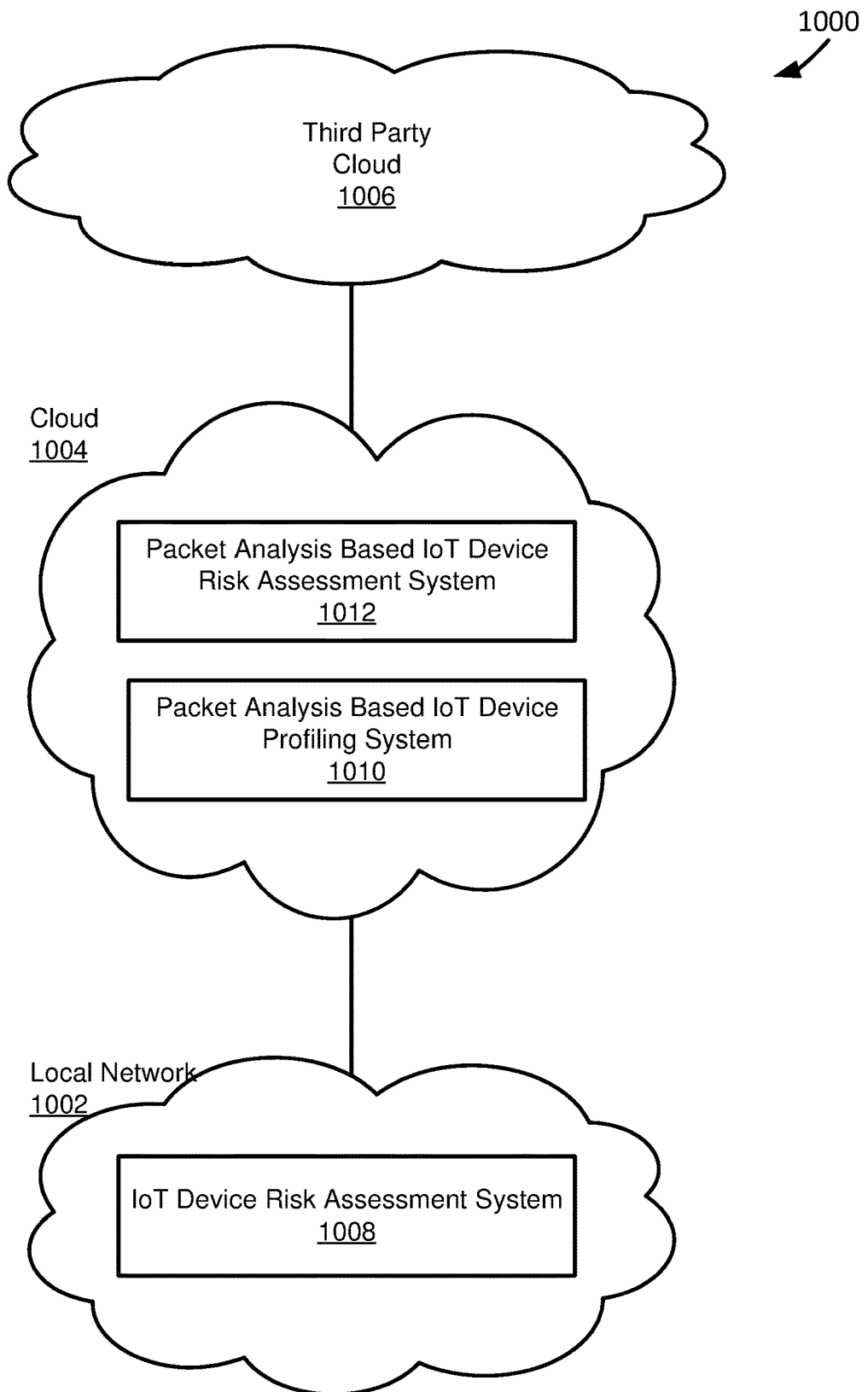
FIG. 10 depicts a diagram of an example of another system for assessing risk levels of IoT devices.

FIG. 10 depicts a diagram 1000 of an example of another system for assessing risk levels of IoT devices. The system shown in the example of FIG. 10 includes a local network 1002, a cloud 1004, and a third party cloud 1006. The local network 1002 is intended to represent a network formed by at least one IoT device and a local appliance. The local network 1002 includes an IoT device risk assessment system 1008. The IoT device risk assessment system 1008 is intended to represent a system that functions to analyze data packets for managing assessment of risk levels of IoT devices, such as the IoT device risk assessment systems described in this paper.

In a specific implementation, the IoT device risk assessment system 1008 includes applicable systems for managing event logs, access logs, and system logs of IoT devices through packet analysis, such as the packet analysis based access log management systems, the packet analysis based system log management systems, and packet analysis based event log management systems described in this paper. In the example system shown in FIG. 10, the applicable systems of the IoT device risk assessment system 1008 for managing event logs, access logs, and system logs of IoT devices through packet analysis are implemented at the local network 1002 as part of a local appliance. In being implemented as part of a local appliance, the IoT device risk assessment system 1008 can analyze packets locally for purposes of maintaining access logs, system logs, and event logs for use in assessing risk levels of IoT devices.

In the example system shown in FIG. 10, the cloud 1004 includes a packet analysis based IoT device profiling system 1010 and a packet analysis based IoT device risk assessment system 1012. The packet analysis based IoT device profiling system 1010 is intended to represent a system that functions to maintain IoT device profiles for use in assessing risk levels of IoT devices, such as the packet analysis based IoT device profiling systems described in this paper. The packet analysis based IoT device risk assessment system 1012 is intended to represent a system that functions to apply assessment weights to IoT device risk factors extracted from device profiles for purposes of assessing risk levels of IoT devices, such as the packet analysis based IoT device risk assessment systems described in this paper. Additionally, the cloud 1004 can include an applicable system for determining IoT device vulnerabilities, such as the packet based IoT device vulnerability determination systems described in this paper. The cloud 1004 can be specific to a private entity. The packet analysis based IoT device profiling system 1010 can receive one or an applicable combination of event logs, access logs, and system logs in real-time as they are updated, through traditional network channels, e.g. using protocols of a network through which the data is being transmitted without the use of VPN tunneling, from the IoT device risk assessment system 1008 implemented at the local network 1002. The packet analysis based IoT device profiling system 1010 can use one or an applicable combination of received event logs, access logs, and system logs to profile IoT device into device profiles.

In the system shown in the example of FIG. 10, the third party cloud 1006 is intended to represent a network that receives device profile data indicating device profiles of IoT devices without the use of VPN tunnels. The third party cloud 1006 receives profile data indicating device profiles of IoT devices, through traditional network channels, e.g. using protocols of a network through which the data is being transmitted without the use of VPN tunneling, from the packet analysis based IoT device profiling system 1010 implemented at the cloud 1004. Additionally, the third party cloud 1006 can receive risk assessment data, through traditional network channels, e.g. using protocols of a network through which the data is being transmitted without the use of VPN tunneling, from the packet analysis based IoT device risk assessment system 1012. The third party cloud 1006 can be associated with or used by a third party management system for managing IoT devices.

Figure 11:
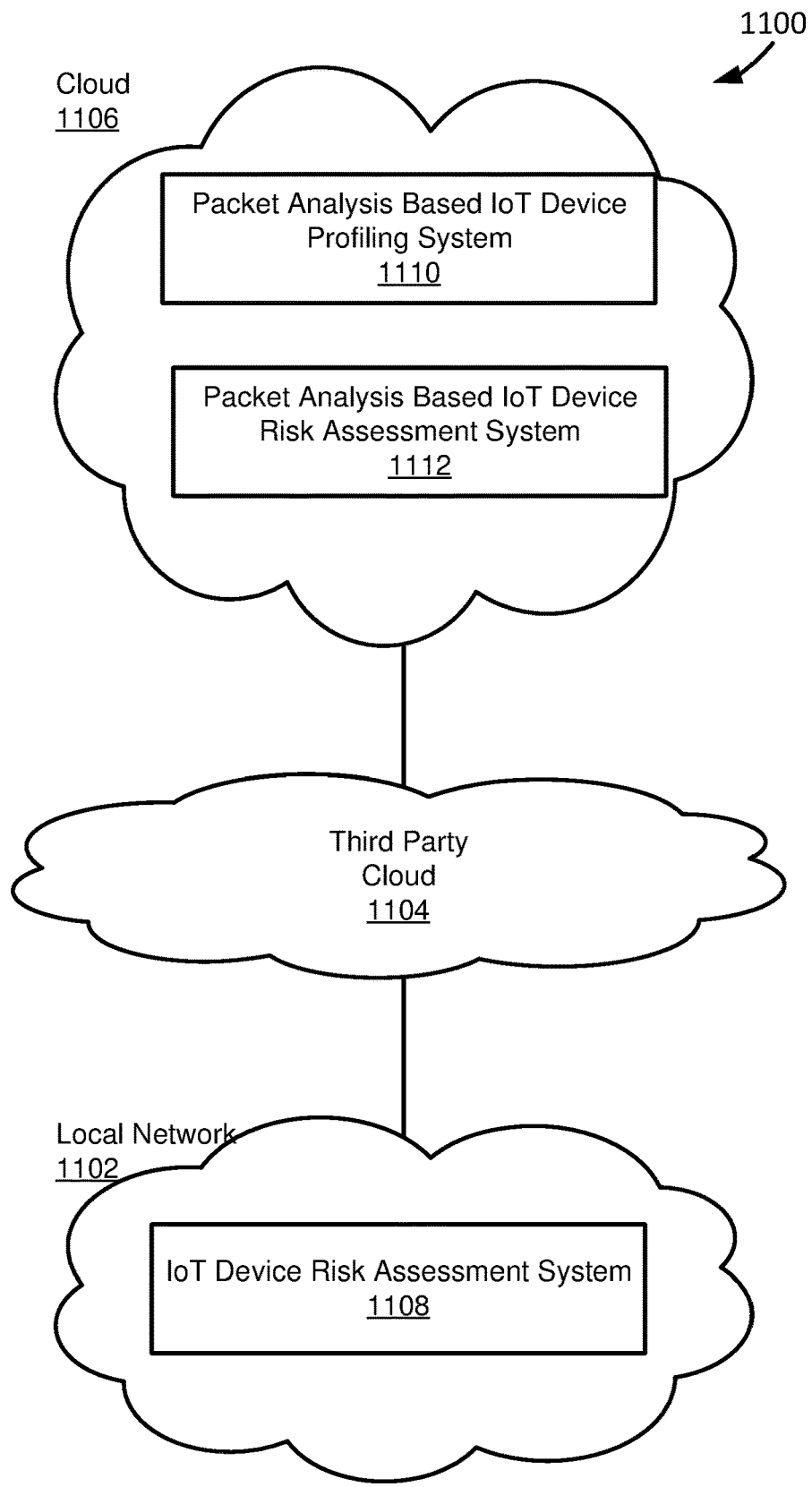
FIG. 11 depicts a diagram of another example of a system for assessing risk levels of IoT devices.

FIG. 11 depicts a diagram 1100 of another example of a system for assessing risk levels of IoT devices. The example system shown in FIG. 11 includes a local network 1102, a third party cloud 1104, and a cloud 1106. The local network 1102 is intended to represent a network that is formed by at least one IoT device and a local appliance. The local network 1102 includes an IoT device risk assessment system 1108.

In the example of FIG. 11, the IoT device risk assessment system 1108 is intended to represent a system that functions to manage assessment of risk levels of IoT devices. The IoT device risk assessment system 1108 includes applicable systems for managing event logs, access logs, and system logs of IoT devices through packet analysis, such as the packet analysis based access log management systems, the packet analysis based system log management systems, and packet analysis based event log management systems described in this paper. In the example system shown in FIG. 11, the applicable systems of the IoT device risk assessment system 1108 for managing event logs, access logs, and system logs of IoT devices through packet analysis are implemented at the local network 1102 as part of a local appliance. In being implemented as part of a local appliance, the IoT device risk assessment system 1108 can analyze packets locally for purposes of maintaining access logs, system logs, and event logs for use in assessing risk levels of IoT devices.

In the system shown in the example of FIG. 11, the third party cloud 1104 is intended to represent a network that receives applicable data for profiling IoT devices for use in assessing risk levels of IoT devices, such as one or an applicable combination of event logs, access logs, and system logs, through traditional network channels, e.g. using protocols of a network through which the data is being transmitted without the use of VPN tunneling, from the IoT device risk assessment system 1108 implemented at the local network 1102. The third party cloud 1104 can be associated with or used by a third party management system for managing IoT devices.

In the system shown in the example of FIG. 11, the cloud 1106 includes a packet analysis based IoT device profiling system 1110 and a packet analysis based IoT device risk assessment system 1112. The packet analysis based IoT device profiling system 1110 is intended to represent a system that functions to maintain IoT device profiles for use in assessing risk levels of IoT devices, such as the packet analysis based IoT device profiling systems described in this paper. The packet analysis based IoT device risk assessment system 1112 is intended to represent a system that functions to apply assessment weights to IoT device risk factors extracted from device profiles for purposes of assessing risk levels of IoT devices, such as the packet analysis based IoT device risk assessment systems described in this paper. Additionally, the cloud 1106 can include an applicable system for determining IoT device vulnerabilities, such as the packet based IoT device vulnerability determination systems described in this paper. The packet analysis based IoT device profiling system 1110 can receive an applicable combination of event logs, access logs, and system logs in real-time as they are updated, through traditional network channels, e.g. using protocols of a network through which the data is being transmitted without the use of VPN tunneling, from the third party cloud 1104, which are received at the third party cloud 1104 from the IoT device risk assessment system 1108 implemented at the local network 1102.

In a specific implementation, the packet analysis based IoT device profiling system 1110 uses one or an applicable combination of received event logs, access logs, and system logs to profile IoT device into device profiles. The packet analysis based IoT device risk assessment system 1112 can use device profiles managed by the packet analysis based IoT device profiling system 1110 to assess risk levels of IoT devices. The packet analysis based IoT device profiling system 1110 can send generated device profiles back to the third party cloud 1104, through traditional network channels, e.g. using protocols of a network through which the data is being transmitted without the use of VPN tunneling. The packet analysis based IoT device risk assessment system 1112 can send generated risk assessment data back to the third party cloud 1104 through, through traditional network channels, e.g. using protocols of a network through which the data is being transmitted without the use of VPN tunneling. The third party cloud 1104 can use either or both device profiles received from the packet analysis based IoT device profiling system 1110 and risk assessment data received from the packet analysis based IoT device risk assessment system 1112 to manage IoT devices in the local network 1104.

Figure 12:
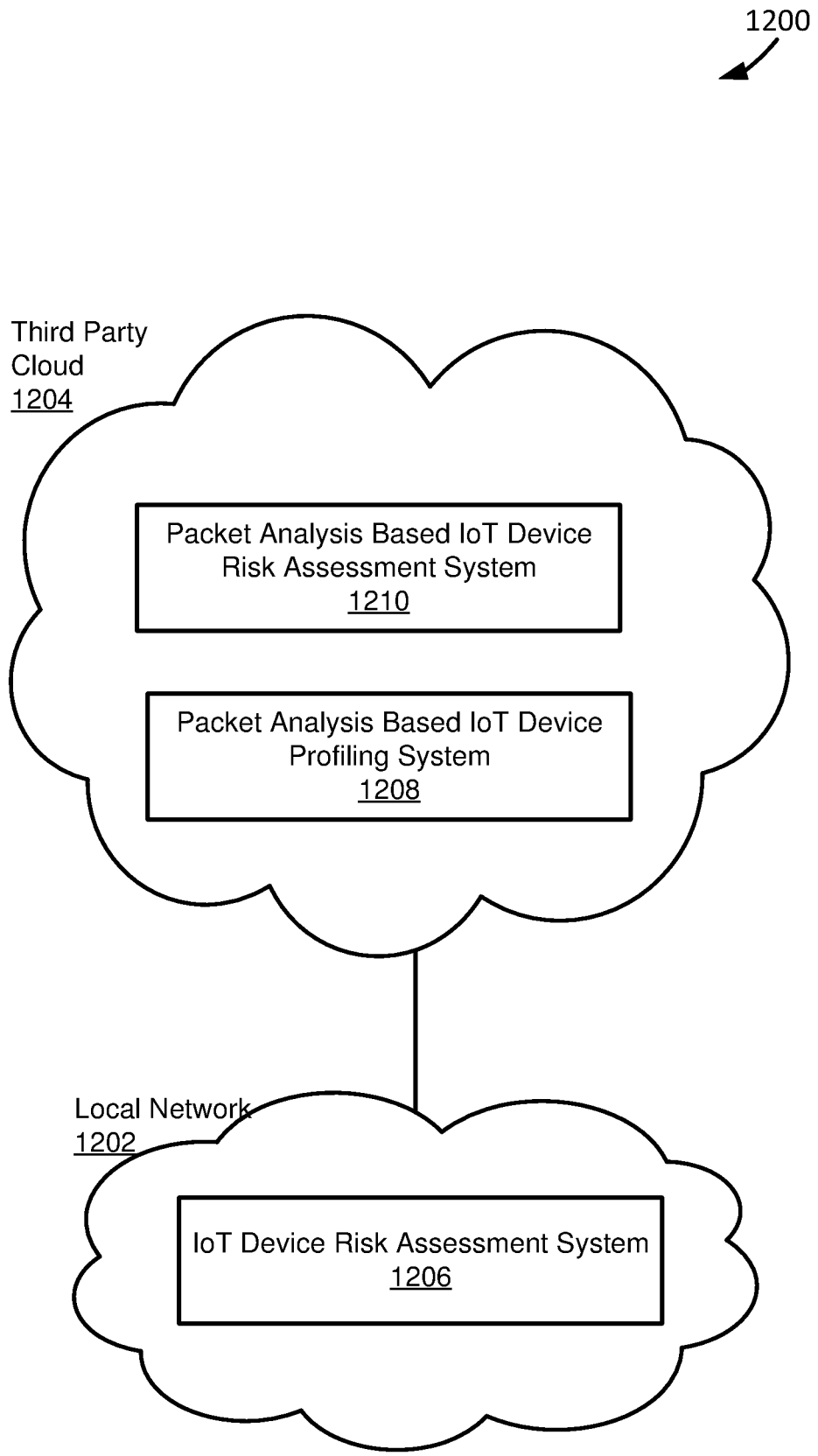
FIG. 12 depicts a diagram of another example of a system for assessing risk levels of IoT devices.

FIG. 12 depicts a diagram 1200 of another example of a system for assessing risk levels of IoT devices. The system shown in the example of FIG. 12 includes a local network 1202 and a third party cloud 1204. The local network 1202 includes an IoT device risk assessment system 1206. The IoT device risk assessment system 1206 is intended to represent a system that functions according to an applicable system for analyzing data packets for managing assessment of risk levels of IoT devices, such as the IoT device risk assessment systems described in this paper.

In a specific implementation, the IoT device risk assessment system 1206 includes applicable systems for managing event logs, access logs, and system logs of IoT devices through packet analysis, such as the packet analysis based access log management systems, the packet analysis based log management systems, and packet analysis based event log management systems described in this paper. In the system shown in the example of FIG. 12, the applicable systems of the IoT device risk assessment system 1206 for managing event logs, access logs, and system logs of IoT devices through packet analysis are implemented at the local network 1202 as part of a local appliance. In being implemented as part of a local appliance, the IoT device risk assessment system 1206 can analyze packets locally for purposes of maintaining access logs, system logs, and event logs.

In the system shown in the example of FIG. 12, the third party cloud 1204 includes a packet analysis based IoT device profiling system 1208 and a packet analysis based IoT device risk assessment system 1210. Depending upon implementation-specific or other considerations, the third party cloud 1204 can include an applicable system for determining IoT device vulnerabilities, such as the packet based IoT device vulnerability determination systems described in this paper. The third party cloud 1204 can be associated with or used by a third party management system for managing IoT devices. The packet analysis based IoT device profiling system 1208 is intended to represent a system that functions to profile IoT devices for purposes of assessing risk levels of the IoT devices, such as the packet analysis based IoT device management systems described in this paper. The packet analysis based IoT device risk assessment system 1210 is intended to represent a system that functions to apply assessment weights to IoT device risk factors extracted from device profiles for purposes of assessing risk levels of IoT devices, such as the packet analysis based IoT device risk assessment systems described in this paper. The packet analysis based IoT device profiling system 1208 can receive event logs, access logs, and/or system logs in real-time as they are updated, through VPN tunnels or traditional network channels from the IoT device risk assessment system 1206 implemented at the local network 1202. The packet analysis based IoT device profiling system 1208 can use received event logs, access logs, and/or system logs to profile IoT device into device profiles.

Figure 13:
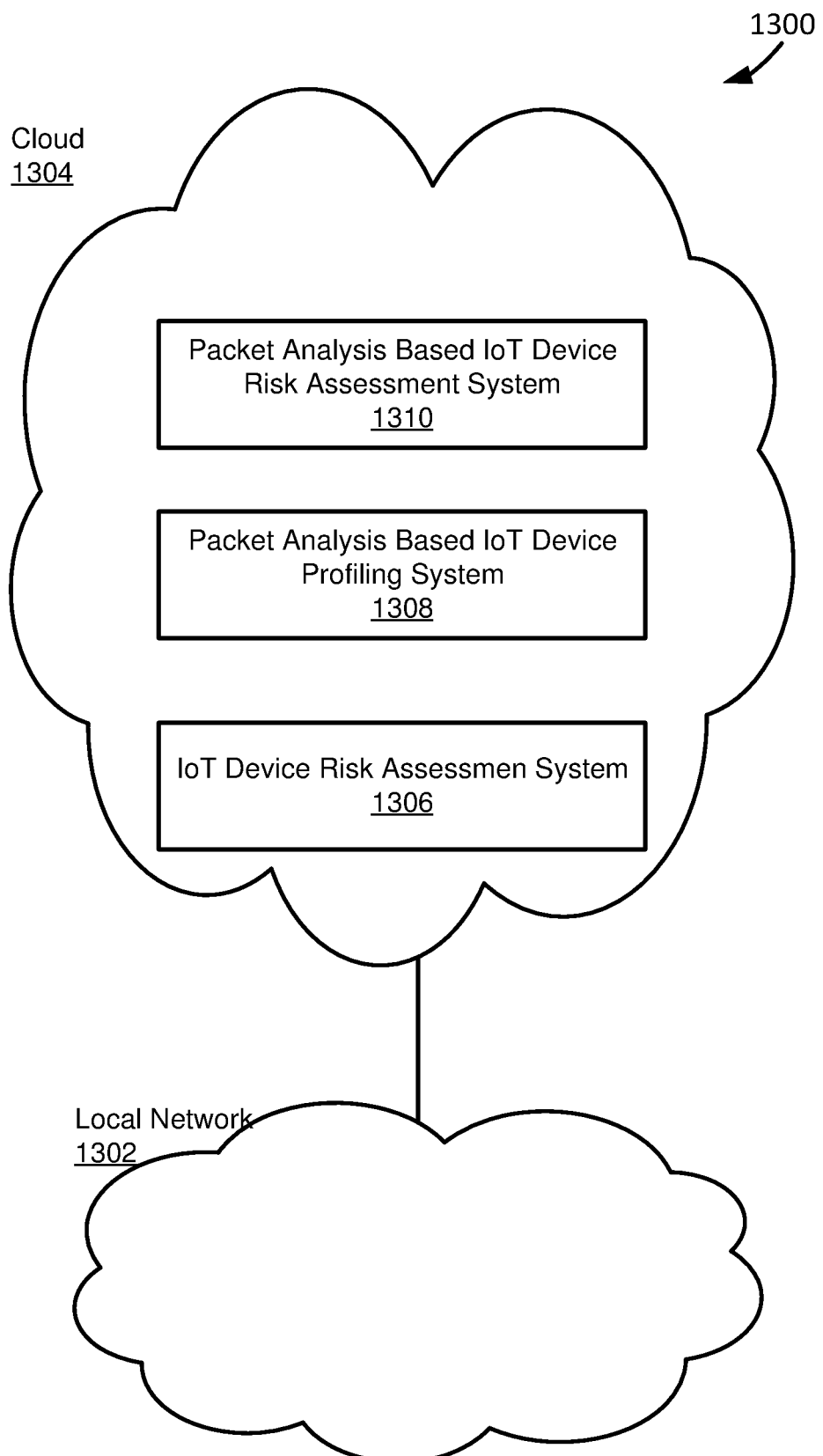
FIG. 13 depicts a diagram of another example of a system for assessing risk levels of IoT devices.

FIG. 13 depicts a diagram 1300 of another example of a system for assessing risk levels of IoT devices. The system shown in the example of FIG. 13 includes a local network 1302 and a cloud 1304. The local network 1302 is intended to represent a network that includes at least one IoT device coupled to a local appliance. In the example of FIG. 13, the cloud 1304 is intended to represent a third party cloud, e.g. a cloud of a third party IoT device management entity. The local appliance can transmit data packets from the IoT device through the cloud 1304.

In the example of FIG. 13, the cloud 1304 includes an IoT device risk assessment system 1306, a packet analysis based IoT device profiling system 1308, and a packet analysis based IoT device risk assessment system 1310. The IoT device risk assessment system 1306 is intended to represent a system that obtains packets transmitted to and from IoT devices in the local network 1302 through the local appliance. The IoT device risk assessment system 1306 can use obtained packets to build historical records of IoT devices by building event logs, system logs, and access logs through packet analysis of the obtained packets. The packet analysis based IoT device profiling system 1308 is intended to represent a system that uses historical records of IoT devices to profile the IoT devices into device profiles. The packet analysis based IoT device risk assessment system 1310 is intended to represent a system that uses device profiles of IoT devices to assess risk levels of the IoT devices.

Figure 14:
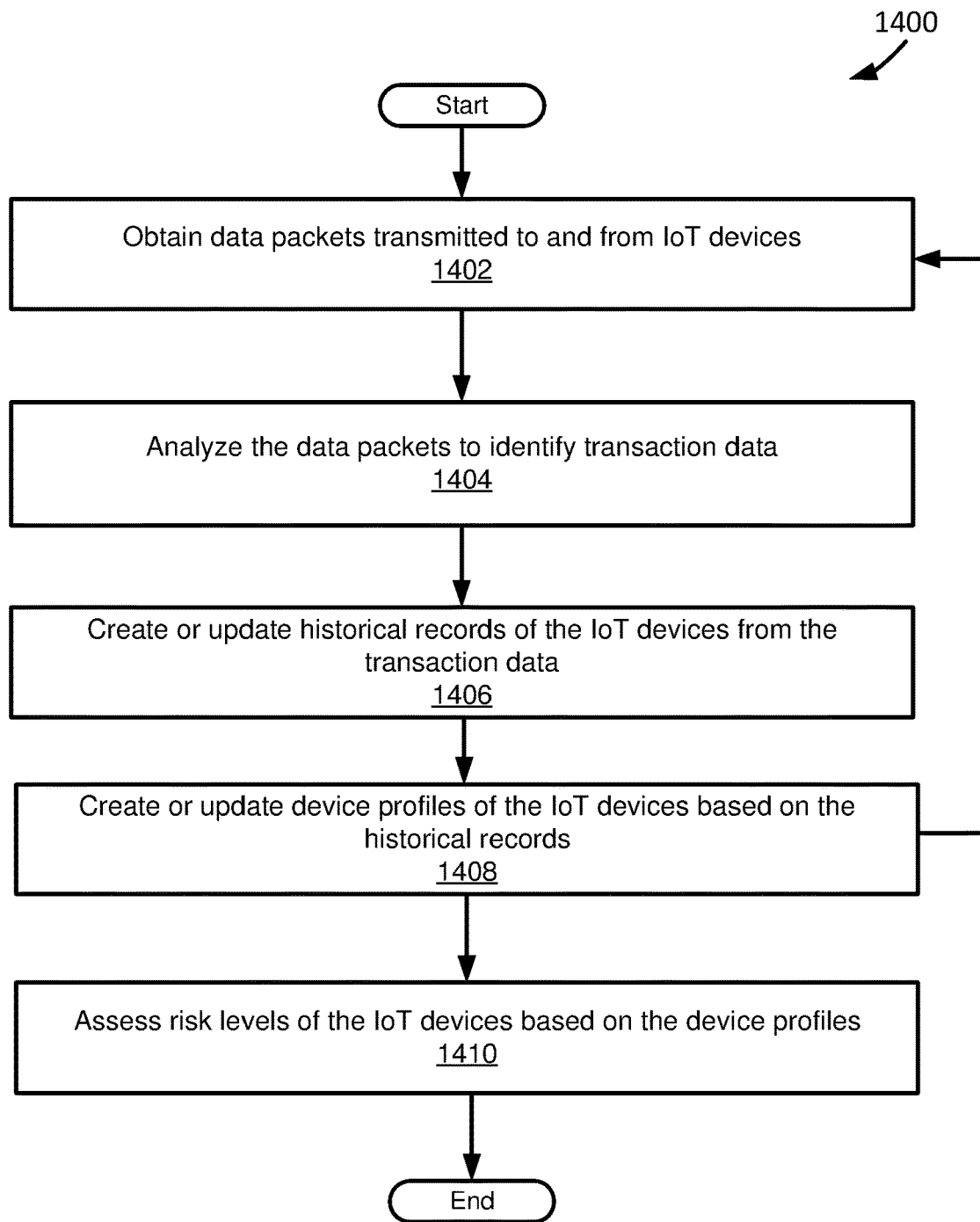
FIG. 14 depicts a flowchart of an example of a method for generating device profiles of IoT devices through packet inspection for use in assessing risk levels of the IoT devices.

FIG. 14 depicts a flowchart 1400 of an example of a method for generating device profiles of IoT devices through packet inspection for use in assessing risk levels of the IoT devices. The flowchart 1400 begins at module 1402, where data packets transmitted to and from IoT devices are obtained. An applicable engine for controlling the flow of data to and from IoT devices, such as the data flow management engines described in this paper, can obtain data packets transmitted to and from IoT devices. Data packets can be obtained at a local appliance with respect to the IoT devices. Alternatively, data packets can be obtained at a location remote from IoT devices after they have been transmitted to the remote location by a local appliance or before they are transmitted through a local network to the IoT devices. Further depending upon implementation-specific or other considerations, data packets can be obtained based on a source, a destination, a data packet type, and data within a data packet. For example, all data packets from a particular source can be obtained. In various implementations, data packets can be transmitted using VPN tunnels.

The flowchart 1400 continues to module 1404, where the data packets are analyzed to identify transaction data. An applicable engine for analyzing the data packets, such as the packet inspector engines described in this paper, can analyze the data packets to identify transaction data. Data packets can be analyzed using deep packet inspection. For example, deep packet inspection can be used to identify transaction data from payloads of the data packets. Additionally, specific data packets to perform deep packet inspection on can be selected based on at least one of a source of data packets, a destination of data packets, a data packet type of data packets, and data within data packets. For example, all data packets from a particular source can have deep packet inspection performed on them.

The flowchart 1400 continues to module 1406, where historical records of the IoT devices are created or updated. An applicable engine for managing logs, such as one or a combination of the event log, system log, and access log management engines described in this paper, can create/update historical records for the IoT devices using the transaction data. A historical record can include one or a combination of access logs, system logs, and event logs of the IoT devices.

The flowchart 1400 continues to module 1408, where device profiles of the IoT devices are create or updated based on the historical records. An applicable engine for profiling the IoT devices, such as the IoT device profiling engines described in this paper, can function to create/update device profiles of the IoT devices based on the historical records. IoT devices can be clustered before they are profiled into device profiles. Additionally, determined vulnerabilities of IoT devices can be included in device profiles of the IoT devices. In generating device profiles of the IoT devices, regular IoT device behavior of the IoT device can be determined from the historical records and included as part of the device profiles.

The flowchart 1400 continues to module 1410, where risk levels of the IoT devices are assessed based on the device profiles. Risk levels of the IoT devices can be assessed by an applicable engine for assessing risk levels of IoT devices, such as the IoT device risk factor analysis engines described in this paper. In assessing risk levels of the IoT device using the device profiles, IoT device risk factors can be extracted from the device profiles. Additionally, in assessing risk levels of the IoT devices, assessment weights can be applied to extracted IoT device risk factors to determine risk scores for the IoT devices. Risk scores of the IoT devices can be used to assess risk levels to the IoT devices based on the risk scores.

Figure 15:
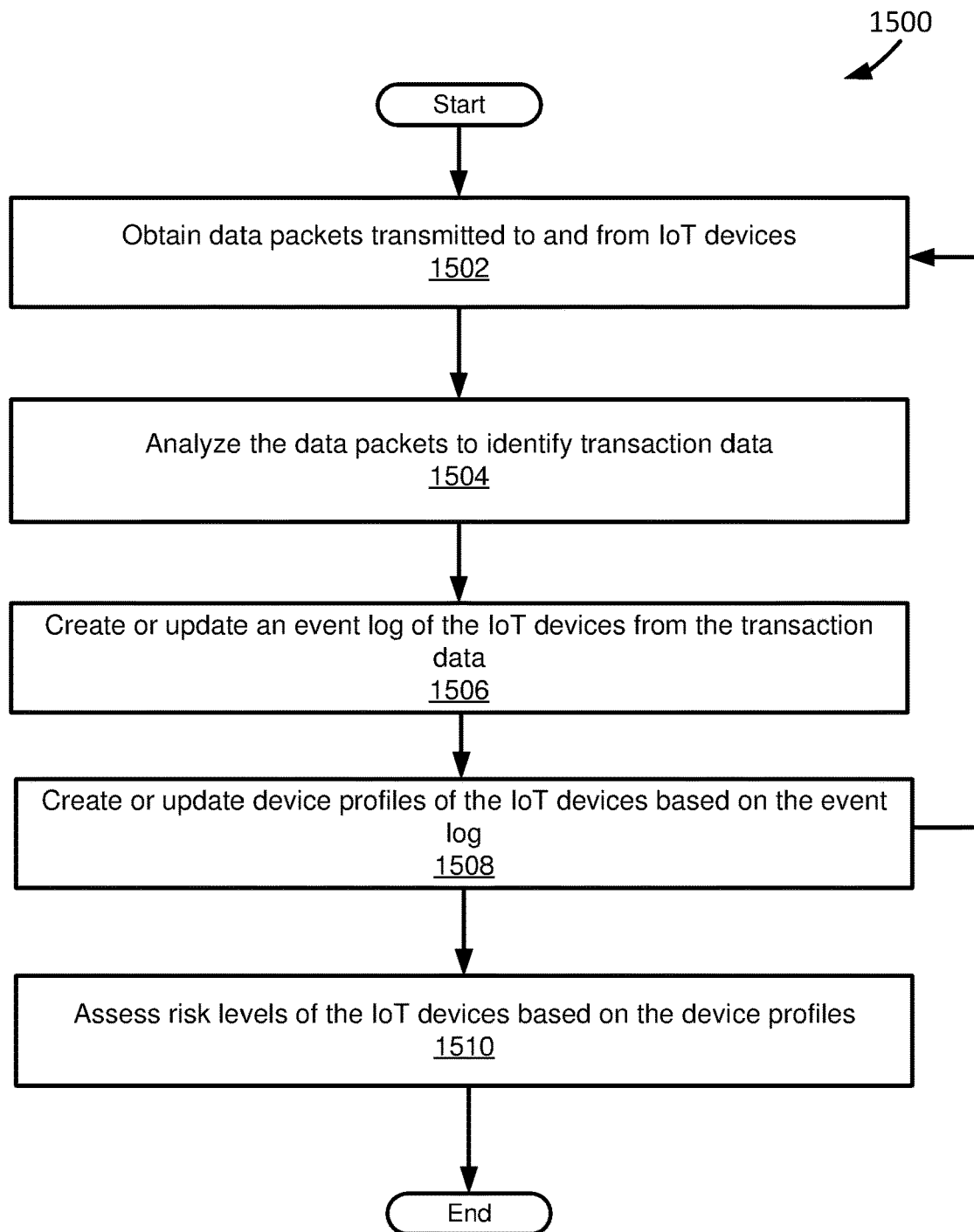
FIG. 15 depicts a flowchart of another example of a method for generating device profiles of IoT devices through packet inspection for use in assessing risk levels of the IoT devices.

FIG. 15 depicts a flowchart 1500 of another example of a method for generating device profiles of IoT devices through packet inspection for use in assessing risk levels of the IoT devices. The flowchart 1500 begins at module 1502, where data packets transmitted to and from IoT devices are obtained. An applicable engine for controlling the flow of data to and from IoT devices, such as the data flow management engines described in this paper, can obtain data packets transmitted to and from IoT devices. Data packets can be obtained at a local appliance with respect to the IoT devices. Additionally, data packets can be obtained at a location remote from IoT devices after they have been transmitted to the remote location by a local appliance or before they are transmitted through a local network to the IoT devices. Data packets can be obtained based on a source, a destination, a data packet type, and data within a data packet. For example, all data packets from a particular source can be obtained. In various implementations, data packets can be transmitted using VPN tunnels.

The flowchart 1500 continues to module 1504, where the data packets are analyzed to identify transaction data. An applicable engine for analyzing data packets, such as the packet inspector engines described in this paper, can analyzed the data packets to identify transaction data. Data packets can be analyzed using deep packet inspection. For example, deep packet inspection can be used to identify transaction data from payloads of the data packets. Additionally, specific data packets to perform deep packet inspection on can be selected based on at least one of a source of data packets, a destination of data packets, a data packet type of data packets, and data within data packets. For example, all data packets from a particular source can have deep packet inspection performed on them.

The flowchart 1500 continues to module 1506, where event logs of the IoT devices are created or updated. An applicable engine for managing event logs, such as the event log management engines described in this paper, can create/update event logs for the IoT devices using the transaction data. An event log can be updated in real-time using the transaction data as it is identified in real-time as the IoT devices operate.

The flowchart 1500 continues to module 1508, where device profiles of the IoT devices are created or updated based on the event logs. An applicable engine for profiling the IoT devices, such as the IoT device profiling engines described in this paper, can function to create/update device profiles of the IoT devices based on the event logs. In profiling the IoT devices, the IoT devices can be clustered before they are profiled into device profiles. Additionally, in profiling the IoT devices, determined vulnerabilities of IoT devices can be included in device profiles of the IoT devices. In generating device profiles of the IoT devices, regular IoT device behavior of the IoT device can be determined from the event logs and included as part of the device profiles.

The flowchart 1500 continues to module 1510, where risk levels of the IoT devices are assessed based on the device profiles. Risk levels of the IoT devices can be assessed by an applicable engine for assessing risk levels of IoT devices, such as the IoT device risk factor analysis engines described in this paper. In assessing risk levels of the IoT device using the device profiles, IoT device risk factors can be extracted from the device profiles. Additionally, in assessing risk levels of the IoT devices, assessment weights can be applied to extracted IoT device risk factors to determine risk scores for the IoT devices. Risk scores of the IoT devices can be used to assess risk levels to the IoT devices based on the risk scores.

Figure 16:
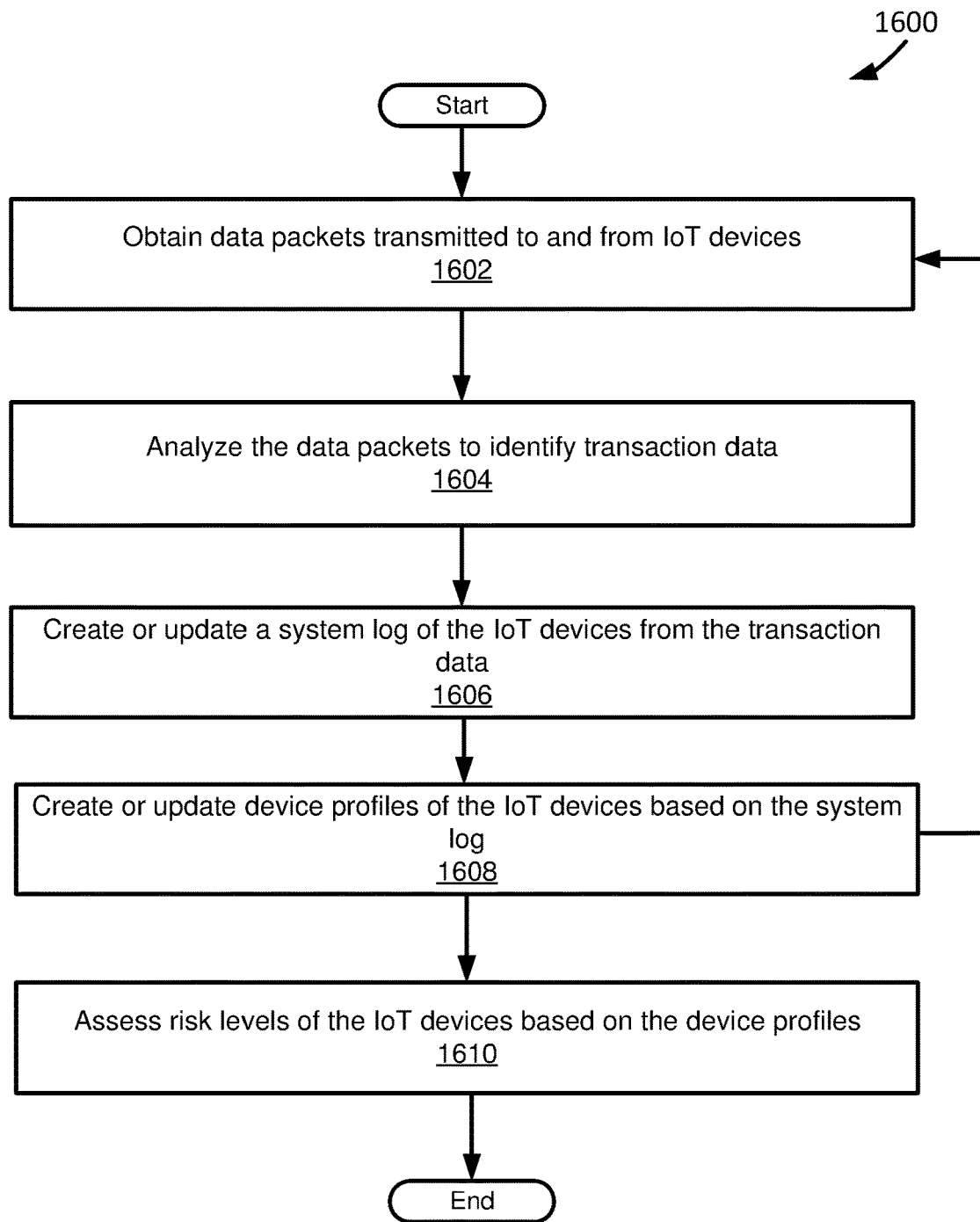
FIG. 16 depicts a flowchart of another example of a method for generating device profiles of IoT devices through packet inspection for use in assessing risk levels of the IoT devices.

FIG. 16 depicts a flowchart 1600 of another example of a method for generating device profiles of IoT devices through packet inspection for use in assessing risk levels of the IoT devices. The flowchart 1600 begins at module 1602, where data packets transmitted to and from IoT devices are obtained. An applicable engine for controlling the flow of data to and from IoT devices, such as the data flow management engines described in this paper, can obtain data packets transmitted to and from IoT devices. Data packets can be obtained at a local appliance with respect to the IoT devices. Additionally, data packets can be obtained at a location remote from IoT devices after they have been transmitted to the remote location by a local appliance or before they are transmitted through a local network to the IoT devices. Data packets can be obtained based on a source, a destination, a data packet type, and data within a data packet. For example, all data packets from a particular source can be obtained. In various implementations, data packets can be transmitted using VPN tunnels.

The flowchart 1600 continues to module 1604, where the data packets are analyzed to identify transaction data. An applicable engine for analyzing data packets, such as the packet inspector engines described in this paper, can analyze the data packets to identify transaction data. Data packets can be analyzed using deep packet inspection. For example, deep packet inspection can be used to identify transaction data from payloads of the data packets. Specific data packets to perform deep packet inspection on can be selected based on at least one of a source of data packets, a destination of data packets, a data packet type of data packets, and data within data packets. For example, all data packets from a particular source can have deep packet inspection performed on them.

The flowchart 1600 continues to module 1606, where system logs of the IoT devices are created or updated. An applicable engine for managing system logs, such as the system log management engines described in this paper, can create or update system logs for the IoT devices using the transaction data. A system log can be updated in real-time using the transaction data as it is identified in real-time as the IoT devices operate.

The flowchart 1600 continues to module 1608, where device profiles of the IoT devices are created or updated based on the system logs. An applicable engine for profiling the IoT devices, such as the IoT device profiling engines described in this paper, can function to create/update device profiles of the IoT devices based on the system logs. In profiling the IoT devices, the IoT devices can be clustered before they are profiled into device profiles. Additionally, in profiling the IoT devices, determined vulnerabilities of IoT devices can be included in device profiles of the IoT devices. In generating device profiles of the IoT devices, regular IoT device behavior of the IoT device can be determined from the system logs and included as part of the device profiles.

The flowchart 1600 continues to module 1610, where risk levels of the IoT devices are assessed based on the device profiles. Risk levels of the IoT devices can be assessed by an applicable engine for assessing risk levels of IoT devices, such as the IoT device risk factor analysis engines described in this paper. In assessing risk levels of the IoT device using the device profiles, IoT device risk factors can be extracted from the device profiles. Additionally, in assessing risk levels of the IoT devices, assessment weights can be applied to extracted IoT device risk factors to determine risk scores for the IoT devices. Risk scores of the IoT devices can be used to assess risk levels to the IoT devices based on the risk scores.

Figure 17:
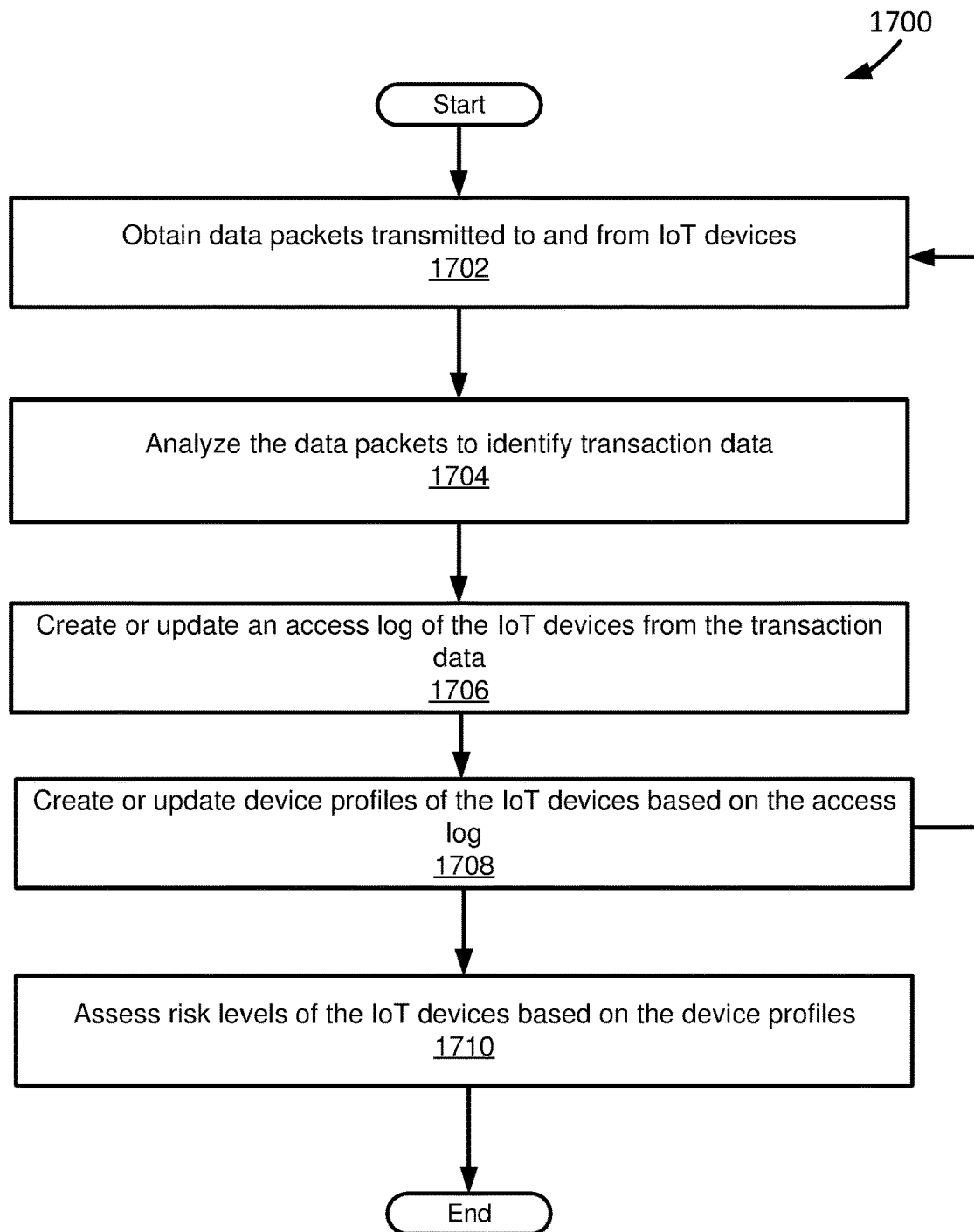
FIG. 17 depicts a flowchart of another example of a method for generating device profiles of IoT devices through packet inspection for use in assessing risk levels of the IoT devices.

FIG. 17 depicts a flowchart 1700 of another example of a method for generating device profiles of IoT devices through packet inspection for use in assessing risk levels of the IoT devices. The flowchart 1700 begins at module 1702, where data packets transmitted to and from IoT devices are obtained. An applicable engine for controlling the flow of data to and from IoT devices, such as the data flow management engines described in this paper, can obtain data packets transmitted to and from IoT devices. Data packets can be obtained at a local appliance with respect to the IoT devices. Additionally, data packets can be obtained at a location remote from IoT devices after they have been transmitted to the remote location by a local appliance or before they are transmitted through a local network to the IoT devices. Data packets can be obtained based on a source, a destination, a data packet type, and data within a data packet. For example, all data packets from a particular source can be obtained. In various implementations, data packets can be transmitted using VPN tunnels.

The flowchart 1700 continues to module 1704, where the data packets are analyzed to identify transaction data. An applicable engine for analyzing data packets, such as the packet inspector engines described in this paper, can analyze the data packets to identify transaction data. Data packets can be analyzed using deep packet inspection. For example, deep packet inspection can be used to identify transaction data from payloads of the data packets. Additionally, specific data packets to perform deep packet inspection on can be selected based on at least one of a source of data packets, a destination of data packets, a data packet type of data packets, and data within data packets. For example, all data packets from a particular source can have deep packet inspection performed on them.

The flowchart 1700 continues to module 1706, where access logs of the IoT devices are created or updated. An applicable engine for managing access logs, such as the access log management engines described in this paper, can create/update access logs for the IoT devices using the transaction data. An access log can be updated in real-time using the transaction data as it is identified in real-time as the IoT devices operate.

The flowchart 1700 continues to module 1708, where device profiles of the IoT devices are created or updated based on the access logs. An applicable engine for profiling the IoT devices, such as the IoT device profiling engines described in this paper, can function to create/update device profiles of the IoT devices based on the access logs. In profiling the IoT devices, the IoT devices can be clustered before they are profiled into device profiles. Additionally, in profiling the IoT devices, determined vulnerabilities of IoT devices can be included in device profiles of the IoT devices. In generating device profiles of the IoT devices, regular IoT device behavior of the IoT device can be determined from the system logs and included as part of the device profiles.

The flowchart 1700 continues to module 1710, where risk levels of the IoT devices are assessed based on the device profiles. Risk levels of the IoT devices can be assessed by an applicable engine for assessing risk levels of IoT devices, such as the IoT device risk factor analysis engines described in this paper. In assessing risk levels of the IoT device using the device profiles, IoT device risk factors can be extracted from the device profiles. Additionally, in assessing risk levels of the IoT devices, assessment weights can be applied to extracted IoT device risk factors to determine risk scores for the IoT devices. Risk scores of the IoT devices can be used to assess risk levels to the IoT devices based on the risk scores.

Figure 18:
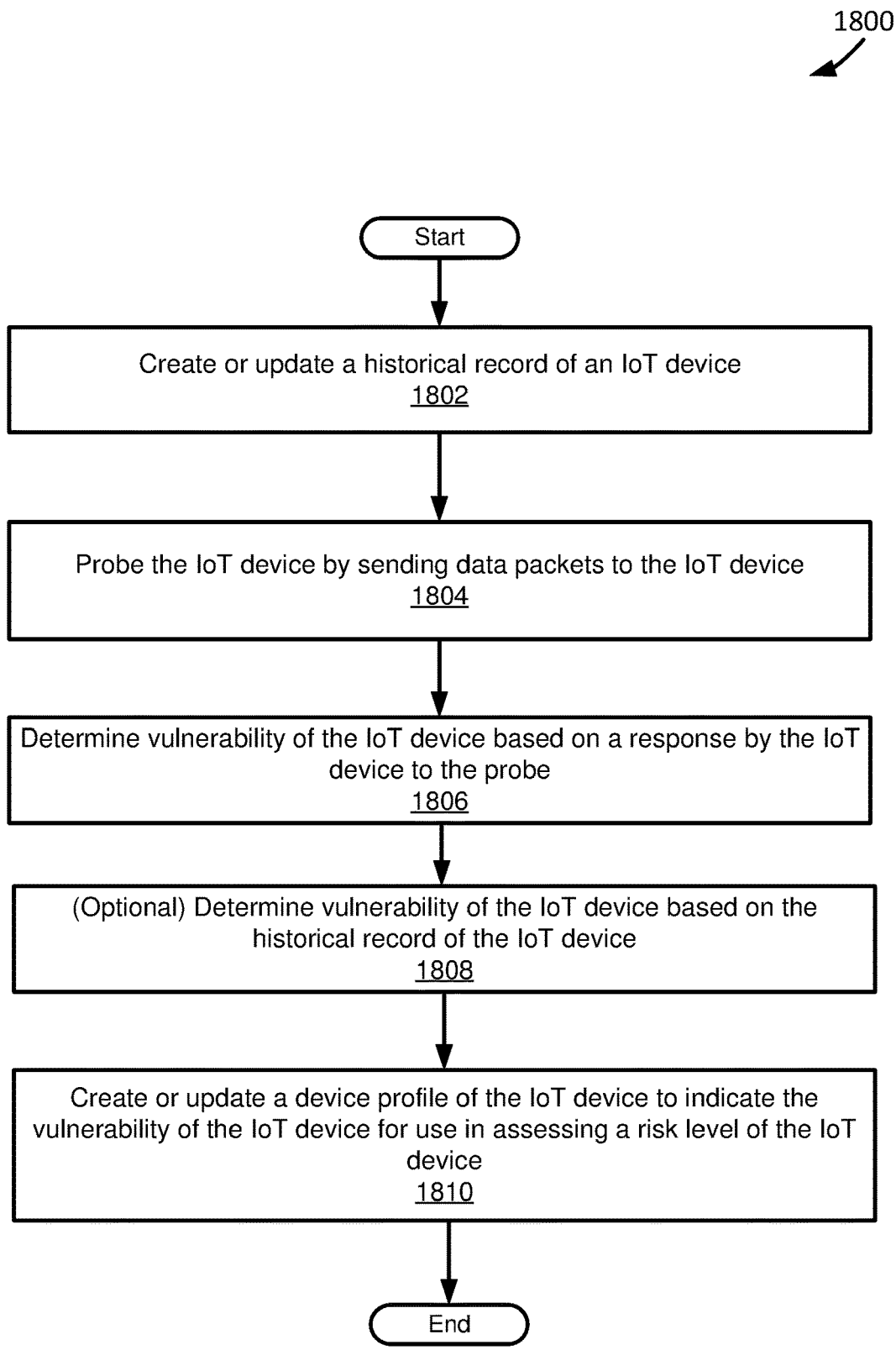
FIG. 18 depicts a flowchart of an example of a method for generating device profiles of IoT devices by determining vulnerabilities of IoT devices for use in assessing risk levels of IoT devices.

FIG. 18 depicts a flowchart 1800 of an example of a method for generating device profiles of IoT devices by determining vulnerabilities of IoT devices for use in assessing risk levels of IoT devices. The flowchart 1800 begins at module 1802, where a historical record of an IoT device is created or updated. A historical record of an IoT device can be created from one or an applicable combination of an event log, a system log, and an access log of the IoT device. An event log, a system log, and an access log can be created using packet analysis of data packets transmitted to and from an IoT device. An event log, a system log, and an access log can be created from transaction data identified from deep packet inspection of data packets transmitted to and from an IoT device.

The flowchart 1800 continues to module 1804, where the IoT device is probed by sending data packets to the IoT device. An applicable engine for probing an IoT device, such as the IoT device probing engines described in this paper, can prove the IoT device by sending data packets to the IoT device. The IoT device can be probed by sending data packets to the IoT device to simulate an attack on the IoT device. Additionally, the IoT device can be probed by sending data packets to the IoT device to force the IoT device to respond.

The flowchart 1800 continues to module 1806, where vulnerability of the IoT device is determined based on the response by the IoT device to the probe. An applicable engine for determining IoT device vulnerability, such as the vulnerability determination engines described in this paper, can determine a vulnerability of the IoT device based on the response by the IoT device to the probe. Vulnerability of the IoT device can be determined based on an analysis of data packets transmitted from the IoT device in response to the probe. Additionally, vulnerability of the IoT device can be determined based on an analysis of how the IoT device actually responds, e.g. whether it does not respond, to the probe.'

The flowchart 1800 continues to module 1808, where optionally a vulnerability of the IoT device is determined based on the historical record of the IoT device. An applicable engine for determining IoT device vulnerability, such as the vulnerability determination engines described in this paper, can determine a vulnerability of the IoT device based on the historical record of the IoT device. For example, a historical record can be checked to see if the IoT device is the subject of a random scan by a user and subsequently determined vulnerability of the IoT device.

The flowchart 1800 continues to module 1810, where a device profile of the IoT device is created or updated to indicate the vulnerability of the IoT device for use in assessing a risk level of the IoT device. An applicable engine for profiling IoT devices, such as the IoT device profiling engines described in this paper, can create/update a device profile of the IoT device to indicate the determined vulnerability of the IoT device. For example, IoT device risk factors related to the IoT device can be extracted from a device profile of the IoT device based on the determined vulnerability and used in assessing a risk level of the IoT device.

Figure 19:
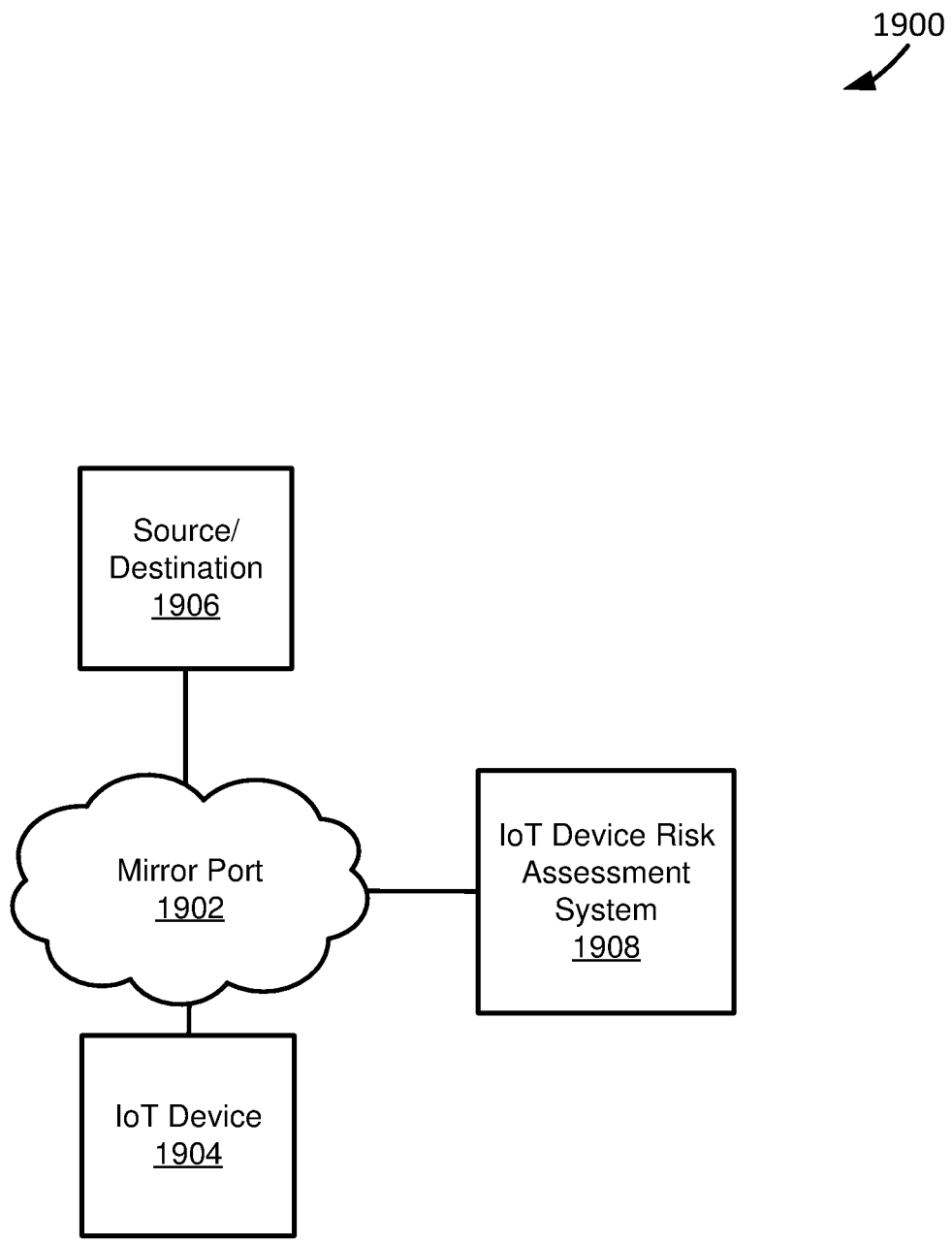
FIG. 19 depicts a diagram of an example of a system for providing IoT device risk assessment through a mirror point.

FIG. 19 depicts a diagram 1900 of an example of a system for providing IoT device risk assessment through a mirror point. The system shown in the example of FIG. 19 includes a mirror port 1902, an IoT device 1904, a source/destination 1906, and a packet analysis based IoT device risk assessment system 1908. The mirror port 1902 is intended to represent a device that functions to perform port mirroring on another port. The mirror port 1902 can be used to obtain data packets transmitted to and from IoT devices without disrupting the flow of the data packets. The mirror port 1902 can be implemented as part of switches or other applicable networking devices. Additionally, the mirror port 1902 can be implemented on network devices in a LAN of IoT devices, or on network devices in a WAN of IoT devices. For example, the mirror port 1902 can be implemented as part of a local router in an enterprise network of IoT devices. Further in the example, in being implemented as part of the local router in an enterprise network, the mirror port 1902 can be used to obtain data packets transmitted between IoT devices in the enterprise network, e.g. intranetwork traffic.

In the example of FIG. 19, the IoT device 1904 is intended to represent a device that includes wired or wireless interfaces through which the IoT device 1904 can send and receive data over wired and wireless connections. The IoT device 1904 can include unique identifiers which can be used in the transmission of data through a network. Unique identifiers of the IoT device 1904 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference.

In the example of FIG. 19, the source/destination 1906 is intended to represent a system accessible by IoT devices through, e.g., a WAN. For example, the source/destination 1906 can be a system that an IoT device communicates with over the Internet. Alternatively, the source/destination 1906 can be a system or device within a LAN of an IoT device. For example, the source/destination 1906 can be another IoT device in a LAN over which an IoT device communicates.

In the example of FIG. 19, the IoT device risk assessment system 1908 is intended to represent a system that functions to assess IoT device risks through packet analysis, such as the IoT device risk assessment systems described in this paper. The IoT device risk assessment system 1908 functions to assess risks of IoT devices using packet analysis of data packets transmitted to and from the IoT devices. The IoT device risk assessment system 1908 can obtain data packets through a mirror port, without interrupting the flow of the data packets between sources and destinations.

In an example of operation of the example system shown in FIG. 19, the IoT device 1904 sends and receives data packets that the mirror port 1902 mirrors for purposes of assess a risk level of the IoT device 1904. In the example of operation of the example system shown in FIG. 19, the source/destination 1906 transmits and receives data in response to data received from the IoT device 1904. In the example of operation of the example system shown in FIG. 19 the packet analysis based IoT device risk assessment system 1908 obtains data packets through the mirror port 1902 for use in assessing a risk level of the IoT device 1904 using packet analysis.

Figure 20:
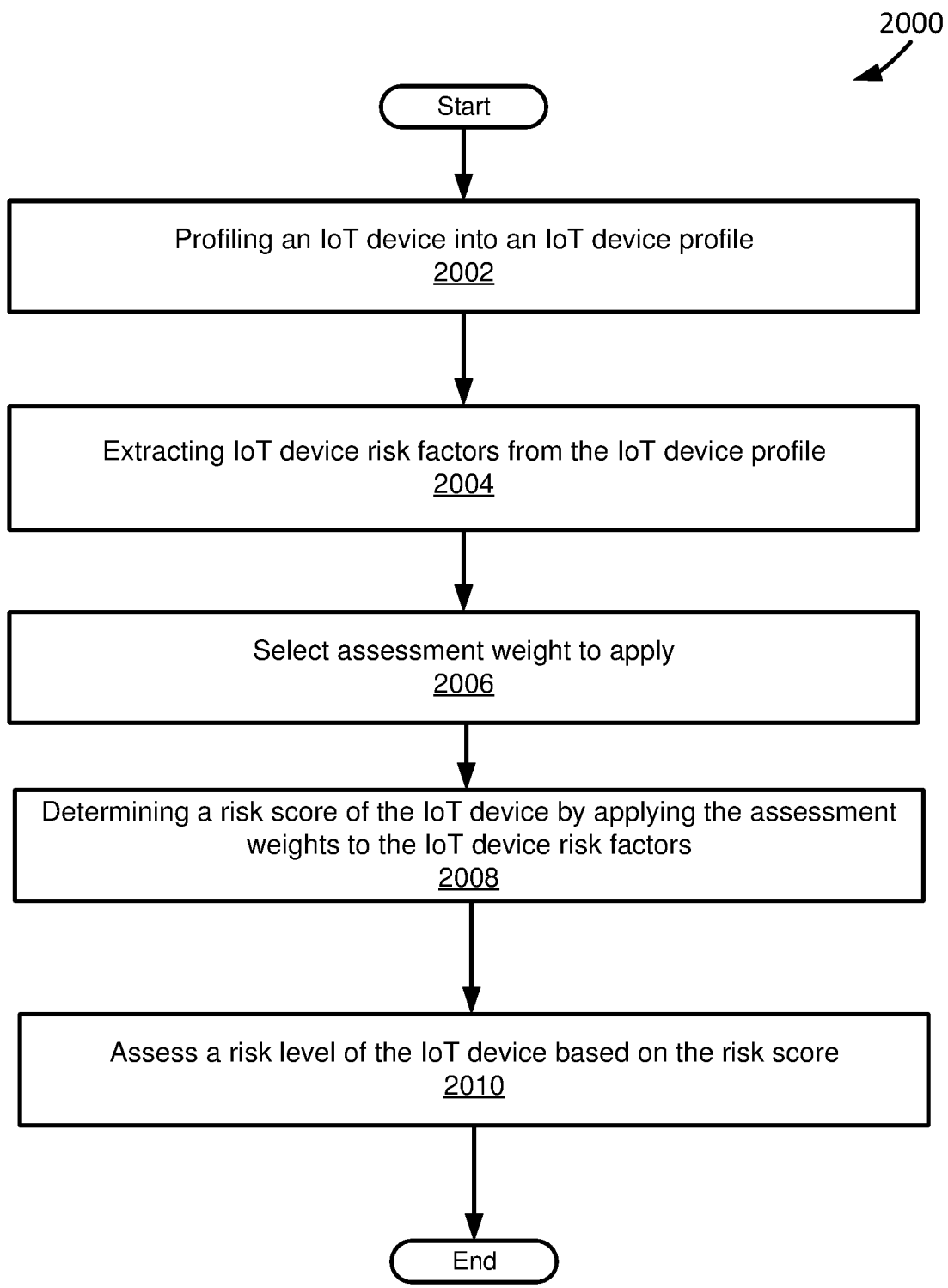
FIG. 20 depicts a diagram of an example of a method of assessing risk levels of IoT devices.

FIG. 20 depicts a flowchart 2000 of an example of a method of assessing risk levels of IoT devices. The flowchart 2000 begins at module 2002, where an IoT device is profiled into an IoT device profile. An applicable engine for profiling an IoT device into an IoT device profile, such as the IoT device profiling engines described in this paper, can profile an IoT device into an IoT device profile. An IoT device can be profiled based on analysis of data traffic to and from an IoT device as the IoT device accesses network services through a network. In profiling an IoT device based on analysis of data traffic to and from an IoT device, an IoT device can be profiled through passive monitoring by analyzing data packets sent to and from the IoT device. For example, the IoT device can be profiled based on one or a combination of event logs, system logs, and access logs maintained based on an analysis of data packets transmitted to and from the IoT device. Additionally, in profiling an IoT device based on analysis of data traffic to and from the IoT device, the IoT device can be actively probed to determine vulnerability of the IoT device. Determined vulnerabilities of an IoT device can be included as part of a device profile of the IoT device.

The flowchart 2000 continues to module 2004, where IoT device risk factors are extracted from the IoT device profile. An applicable engine for analyzing IoT device risk factors, such as the IoT device risk factor analysis engines described in this paper, can extract IoT device risk factors from the IoT device profile. IoT device risk factors extracted from the IoT device profile can include one or an applicable combination of risk factors related to applications used by the IoT device in accessing the network services through the network, protocols used by the IoT device in accessing the network services through the network, network activeness of the IoT device in accessing the network services through the network, network communication characteristics of the IoT device in accessing the network services through the network, security characteristics of data traffic associated with the IoT device in accessing the network services through the network, and operational performance deviations of the IoT device in accessing the network services through the network.

The flowchart 2000 continues to module 2006, where assessment weights to apply to the IoT device risk factors are selected. An applicable engine for managing assessment weights to apply in assessing risk levels of IoT devices, such as the assessment weight variance management engines described in this paper, can select assessment weights to apply to the IoT device risk factors extracted from the IoT device profile. Assessment weights can be selected for specific IoT device risk factors. Additionally, assessment weights can be selected on one or an applicable combination of a per-device basis, a per-device type basis, a per-network basis, or other applicable per-IoT device characteristic basis. Assessment weights can be selected based on one or an applicable combination of characteristics of a network through which the IoT device is accessing network services, input of a user associated with the IoT device, and characteristics of the user associated with the IoT device.

The flowchart 2000 continues to module 2008, where a risk score of the IoT device is determined by applying the assessment weights to the IoT device risk factors. An applicable engine for analyzing IoT device risk factors, such as the IoT device risk factor analysis engines described in this paper, can determine a risk score of the IoT device by applying the assessment weights to the extracted IoT device risk factors. For example, if assessment weights for IoT device risk factors related to operational performance deviations of IoT devices are 20%, then an assessment weight of 20% can be applied to extracted IoT device factors related to operational performance deviations of the IoT device in determining a risk score for the IoT device.

The flowchart 2000 continues to module 2010, where a risk level of the IoT device is assessed based on the risk score. An applicable engine for analyzing IoT device risk factors, such as the IoT device risk factor analysis engines described in this paper, can assess a risk level of the IoT device based on the risk score. A risk level of the IoT device can be assessed based on where the risk score falls within a range of risk scores. For example, if the risk score is above a threshold risk score for a high risk level, then the IoT device can be assess a risk level of high risk.

FIG. 21 depicts a screenshot 2100 of a presentation of risk assessment data to a user. In the screenshot 2100, IoT devices assessed high risk levels are shown, along with identifiers of the IoT devices, and a number of applications executing at the IoT devices.

FIG. 22 depicts a screenshot 2200 of another presentation of risk assessment data to a user. In the screenshot 2200, risk levels of IoT devices along with types of communicating and amount of data actually communicated are shown.

Figure 23:
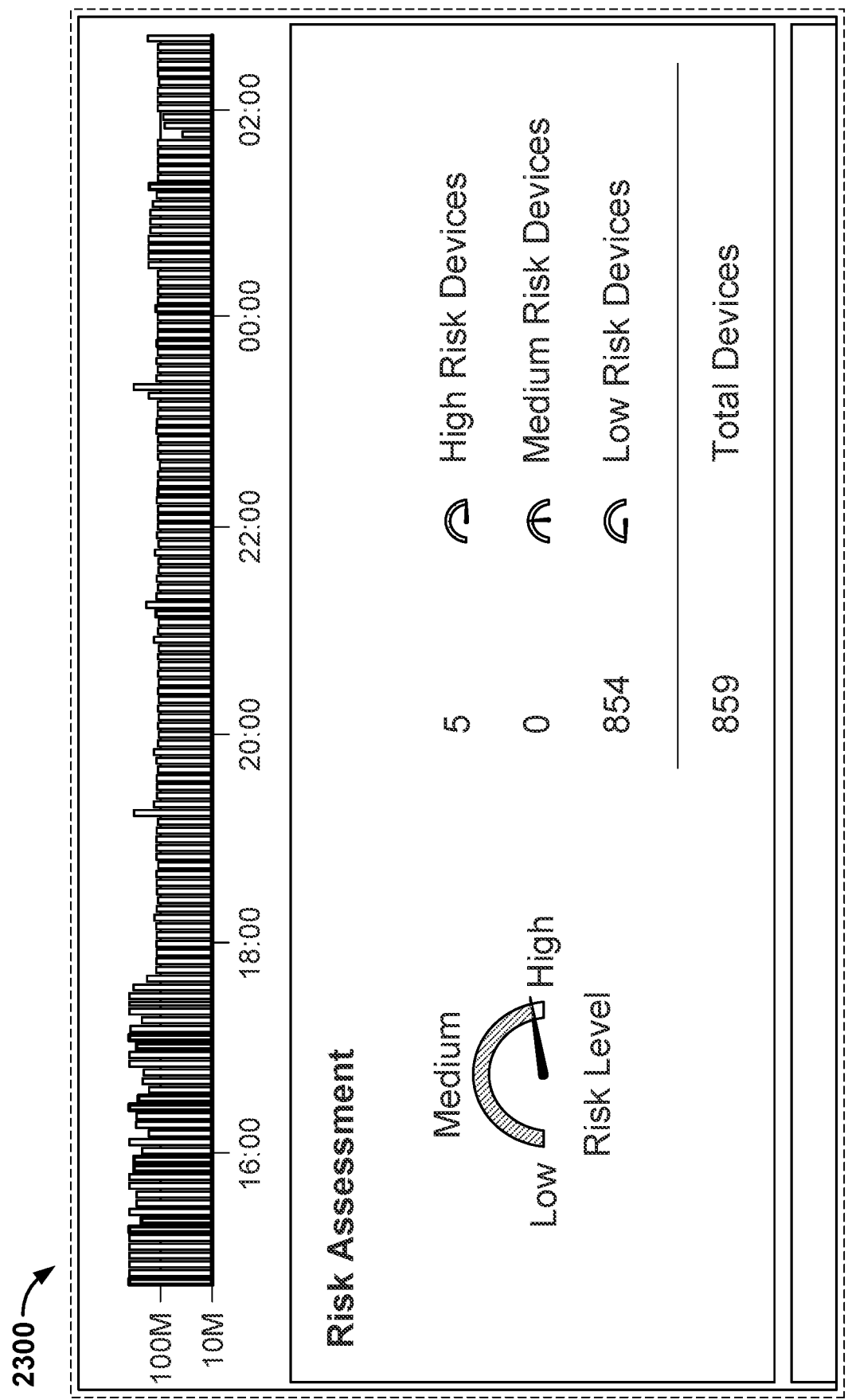
FIG. 23 depicts a screenshot of another presentation of risk assessment data to a use.

FIG. 23 depicts a screenshot 2300 of another presentation of risk assessment data to a use. In the screenshot 2300, the number of IoT devices assessed at different risk levels are displayed to a user.

Figure 24:
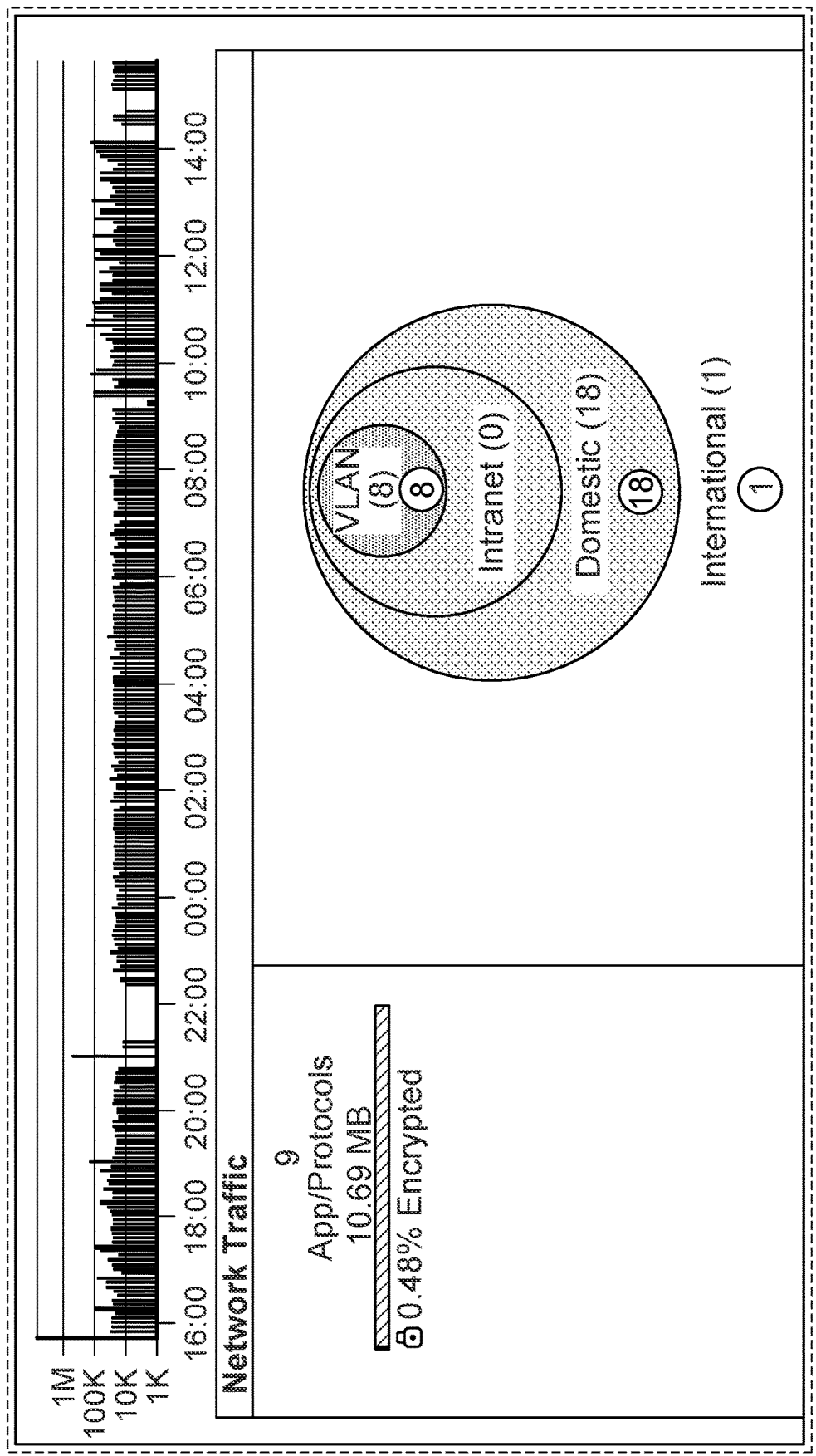
FIG. 24 depicts a screenshot of a device map. In the screenshot, the device map includes hosts and devices an IoT device communicates with in accessing network services.

FIG. 24 depicts a screenshot of a device map. In the screenshot 2400, the device map includes hosts and devices an IoT device communicates with in accessing network services.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A system, comprising:
  a processor configured to:
    perform a match, from a set of previously defined device profiles, of an Internet of Things (IOT) device profile applicable to an IoT device, at least in part by analyzing one or more characteristics of how the IoT device functions in accessing a network service, and in response determine that a new profile should be generated for the IoT device, wherein the IoT device profile applicable to the IOT device is associated with a plurality of individual IoT devices clustered using a plurality of clustering factors related, collectively, to characteristics of the plurality of individual IOT devices and characteristics of operation of the plurality of individual IoT devices;
    analyze data packets transmitted to or from the IoT device;
    determine a risk level of the IoT device based at least in part on the data packets analysis and the matched IoT device profile, including by evaluating a set of risk factors; and
    determine that the risk level of the IoT device exceeds a threshold and take a remedial action in response, including by preventing the IOT device from further transmitting data packets; and
  a memory coupled to the processor and configured to provide the processor with instructions.

2. The system of claim 1, wherein the IoT device profile includes one or more characteristics of the IoT device.

3. The system of claim 1, wherein the IoT device profile includes one or more characteristics of how the IoT device functions in operation.

4. The system of claim 1, wherein the processor is further configured to cluster a plurality of IoT devices together.

5. The system of claim 4, wherein the processor is further configured to associate a plurality of IoT device profiles together based at least in part on the cluster.

6. The system of claim 1, wherein the processor is further configured to determine an operational performance deviation of a particular instance of the IoT device at least in part by using a plurality of other instances of the IoT device.

7. The system of claim 1, wherein matching the IoT device profile includes passively observing the IoT device.

8. The system of claim 1, wherein matching the IoT device profile includes actively probing the IoT device.

9. The system of claim 1, wherein the set of risk factors have one or more associated assessment weights.

10. The system of claim 1, wherein at least one risk factor comprises a risk posed by the IoT device using an application in accessing the network service.

11. The system of claim 9, wherein at least one assessment weight is based at least in part on a network characteristic.

12. The system of claim 9, wherein at least one assessment weight is based at least in part on an operational performance deviation of the IoT device.

13. The system of claim 1, wherein taking the remedial action includes generating an alert that a single IoT device has the risk level that exceeds the threshold.

14. The system of claim 1, wherein determining that the risk level exceeds the threshold includes determining that a plurality of IoT devices have respective risk levels above respective thresholds.

15. The system of claim 1, wherein taking the remedial action further includes presenting the risk level of the IoT device to a user.

16. A method, comprising:
  performing a match, from a set of previously defined device profiles, of an Internet of Things (IOT) device profile applicable to an IoT device, at least in part by analyzing one or more characteristics of how the IoT device functions in accessing a network service, and in response determining that a new profile should be generated for the IoT device, wherein the IoT device profile applicable to the IoT device is associated with a plurality of individual IoT devices clustered using a plurality of clustering factors related, collectively, to characteristics of the plurality of individual IoT devices and characteristics of operation of the plurality of IoT devices;
  analyzing data packets transmitted to or from the IoT device;
  determining a risk level of the IoT device based at least in part on the data packets analysis and the matched IoT device profile, including by evaluating a set of risk factors; and
  determining that the risk level of the IOT device exceeds a threshold and taking a remedial action in response, including by preventing the IoT device from further transmitting data packets.

17. The method of claim 16, wherein the IoT device profile includes one or more characteristics of how the IoT device functions in operation.

18. The method of claim 16, further comprising clustering a plurality of IoT devices together.

19. The method of claim 18, further comprising associating a plurality of IoT device profiles together based at least in part on the cluster.

20. The method of claim 16, further comprising determining an operational performance deviation of a particular instance of the IoT device at least in part by using a plurality of other instances of the IoT device.

21. The method of claim 16, wherein the set of risk factors have one or more associated assessment weights.

22. The method of claim 21, wherein at least one assessment weight is based at least in part on a network characteristic.

23. The method of claim 21, wherein at least one assessment weight is based at least in part on an operational performance deviation of the IoT device.

* * * * *